United States Patent
Park et al.

(10) Patent No.: US 12,132,926 B2
(45) Date of Patent: *Oct. 29, 2024

(54) DMVR AND BDOF BASED INTER PREDICTION METHOD AND APPARATUS THEREOF

(71) Applicant: Rosedale Dynamics LLC, Wilmington, DE (US)

(72) Inventors: Naeri Park, Seoul (KR); Junghak Nam, Seoul (KR); Hyeongmoon Jang, Seoul (KR)

(73) Assignee: Rosedale Dynamics LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,985

(22) Filed: Feb. 9, 2023

(65) Prior Publication Data
US 2023/0269392 A1  Aug. 24, 2023

Related U.S. Application Data

(63) Continuation of application No. 17/411,688, filed on Aug. 25, 2021, now Pat. No. 11,589,072, which is a
(Continued)

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/176* (2014.11); *H04N 19/577* (2014.11);
(Continued)

(58) Field of Classification Search
CPC ...... H04N 19/176; H04N 19/52; H04N 19/70; H04N 19/513; H04N 19/56; H04N 19/139
See application file for complete search history.

(56) References Cited

U.S. PATENT DOCUMENTS 11,140,409 B2   10/2021   Jang et al.
11,589,072 B2   2/2023    Park et al.
(Continued)

FOREIGN PATENT DOCUMENTS

CN   108541375   9/2018
CN   109155863   1/2019
(Continued)

OTHER PUBLICATIONS

Bross et al., "Versatile Video Coding (Draft 4)," Joint Video Experts Team Document, JVET-M1001, Marrakesh, Jan. 2019.
(Continued)

*Primary Examiner* — Daniel Chang
(74) *Attorney, Agent, or Firm* — Fish & Richardson P.C.

(57) ABSTRACT

A video decoding method includes: deriving an L0 motion vector and an L1 motion vector for a current block; deriving a refined L0 motion vector and a refined L1 motion vector, by applying DMVR to the current block based on DMVR flag information; deriving L0 prediction samples of the current block based on the refined L0 motion vector and L1 prediction samples of the current block based on the refined L1 motion vector; deriving prediction samples for the current block based on the L0 prediction samples and the L1 prediction samples, by applying BDOF to the current block based on BDOF flag information; and generating reconstruction samples for the current block based on the prediction samples, in which the DMVR flag information is derived based on a predetermined DMVR application condition, and the BDOF flag information is derived based on a predetermined BDOF application condition.

20 Claims, 22 Drawing Sheets

Related U.S. Application Data continuation of application No. 16/861,579, filed on Apr. 29, 2020, now Pat. No. 11,140,409, which is a continuation of application No. PCT/KR2020/001862, filed on Feb. 11, 2020.

(60) Provisional application No. 62/822,724, filed on Mar. 22, 2019.

(51) Int. Cl.
*H04N 19/577* (2014.01)
*H04N 19/139* (2014.01)
*H04N 19/56* (2014.01)
*H04N 19/70* (2014.01)

(52) U.S. Cl.
CPC ............ *H04N 19/139* (2014.11); *H04N 19/56* (2014.11); *H04N 19/70* (2014.11)

(56) References Cited

U.S. PATENT DOCUMENTS

| | | | |
|---|---|---|---|
| 2018/0199057 A1 | 7/2018 | Chuang et al. | |
| 2019/0089958 A1 | 3/2019 | Nishi et al. | |
| 2019/0297325 A1 | 9/2019 | Lim et al. | |
| 2020/0186820 A1* | 6/2020 | Park | H04N 19/513 |
| 2020/0186821 A1* | 6/2020 | Park | H04N 19/176 |
| 2020/0228815 A1* | 7/2020 | Xu | H04N 19/52 |
| 2020/0236391 A1* | 7/2020 | Lee | H04N 19/52 |
| 2020/0260072 A1* | 8/2020 | Park | H04N 19/132 |
| 2020/0275112 A1* | 8/2020 | Chiang | H04N 19/107 |
| 2020/0288173 A1* | 9/2020 | Ye | H04N 19/98 |
| 2020/0296416 A1* | 9/2020 | Liao | H04N 19/139 |
| 2020/0304805 A1* | 9/2020 | Li | H04N 19/80 |
| 2020/0314445 A1 | 10/2020 | Jang et al. | |
| 2020/0336749 A1 | 10/2020 | Li et al. | |
| 2021/0084330 A1 | 3/2021 | Ikai et al. | |
| 2022/0030266 A1 | 1/2022 | Park et al. | |
| 2022/0078440 A1 | 3/2022 | Park et al. | |
| 2023/0217040 A1 | 7/2023 | Abe et al. | |

FOREIGN PATENT DOCUMENTS

| | | |
|---|---|---|
| CN | 109417629 | 3/2019 |
| KR | 10-2018-0107761 | 10/2018 |
| KR | 10-2019-0008224 | 1/2019 |
| RU | 2538317 | 1/2015 |
| RU | 2659733 | 7/2018 |
| WO | WO 2018092868 | 5/2018 |
| WO | WO 2018212111 | 11/2018 |
| WO | WO 2018231700 | 12/2018 |
| WO | WO 2019010156 | 1/2019 |
| WO | WO 2019039322 | 2/2019 |
| WO | WO 2017199800 | 3/2019 |

OTHER PUBLICATIONS

Chen et al., "Non-CE9: Modified enabling condition for DMVR and BDOF," Joint Video Experts Team Document, JVET-N0162, Geneva, Mar. 13, 2019, 4 pages.

Chujoh et al., "Non-CE9: On conditions for DMVR and BDOF," Joint Video Experts Team Document, JVET-N0146, Geneva, Mar. 12, 2019, 5 pages.

Extended European Search Report in European Appln. No. 20720894, dated Oct. 14, 2020, 11 pages.

International Preliminary Report on Patentability in International Appln. No. PCT/KR2020/001862, mailed Oct. 7, 2021, 11 pages (with Machine Translation).

International Search Report and Written Opinion in International Appln. No. PCT/KR2020/001862, mailed May 25, 2020, 13 pages (with Machine Translation).

JVET-O0108: Joint Video Experts Team (JVET) of ITU-T SG 16 WP 3 and ISO/IEC JTC 1 /SC 29/WG 11, 15th Meeting: Gothenburg, SE Jul. 3-12, 2019, Kwai Inc. "CE9-2.2: Disabled decoder-side motion refinement (DMVR) and bidirectional optical flow (BDOF) for combined inter and intra prediction," 3 Pages.

JVET-O0681:Joint Video Experts Team (JVET) of ITU-T SG 16 WP 3 and ISO/IEC JTC 1 /SC 29/WG 11, 15th Meeting: Gothenburg, SE Jul. 3-12, 2019, Qualcomm Incorporated, "CE9-related: Disabled DMVR, BDOF and BCW or CIIP," 7 Pages.

Liu et al., "CE9-2.3: Modifications on Bi-Directional Optical Flow (BDOF)," Joint Video Experts Team Document, JVET-N0270, Geneva, Mar. 13, 2019.

Liu et al., "CE9-related: Disabling DMVR and BDOF when underlying assumptions are false," Joint Video Experts Team Document, JVET-N0440, Geneva, Mar. 13, 2019, 4 pages.

Xiu et al., "CE10-related: Simplification on combined inter and intra prediction (CIIP)," Joint Video Experts Team Document, JVET-N0327, Geneva, Mar. 13, 2019.

Bross et al., "Versatile Video Coding (Draft 8)," Joint Video Experts Team (JVET) of ITU-T SG 16 WP 3 and ISO/IEC JTC 1/SC 29/WG 11, JVET-Q2001vE, 17th Meeting: Brussels, Belgium, Jan. 7-17, 2020, 512 pages.

Chujoh et al., "On clarification of applicable conditions of DMVR and BDOF," Joint Video Experts Team (JVET) of ITU-T SG 16 WP 3 and ISO/IEC JTC 1/SC 29/WG 11, JVET-Q0128-v3, 17th Meeting: Brussels, Belgium, Jan. 7-17, 2020, 4 pages.

Park et al., "Non-CE9: Conditions fix for DMVR and BDOF," Joint Video Experts Team (JVET) of ITU-T SG 16 WP 3 and ISO/IEC JTC 1/SC 29/WG 11, JVET-N0442, 14th Meeting: Geneva, Switzerland, Mar. 19-27, 2019, 4 pages.

* cited by examiner

DMVR AND BDOF BASED INTER PREDICTION METHOD AND APPARATUS THEREOF

CROSS-REFERENCE TO RELATED APPLICATIONS

This is a Continuation Application of U.S. patent application Ser. No. 17/411,688, filed Aug. 25, 2021, which is a Continuation Application of U.S. patent application Ser. No. 16/861,579, filed Apr. 29, 2020, now U.S. Pat. No. 11,140,409, which is a Bypass of PCT Application No. PCT/KR2020/001862, with an international filing date of Feb. 11, 2020, which claims the benefit of U.S. Provisional Application No. 62/822,724, filed on Mar. 22, 2019, all of which are incorporated by reference in their entirety herein.

BACKGROUND OF THE DISCLOSURE

Field of the Disclosure

This disclosure relates to image coding technology, and more particularly, to a method and an apparatus for performing an inter prediction based on a Decoder-side Motion Vector Refinement (DMVR) and/or Bi-directional optical flow (BDOF).

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY OF THE DISCLOSURE

This disclosure provides a method and an apparatus for increasing image coding efficiency.

This disclosure also provides a method and an apparatus of an efficient inter prediction.

This disclosure also provides a method and an apparatus for performing an inter prediction based on a Decoder-side Motion Vector Refinement (DMVR).

This disclosure also provides a method and an apparatus for performing an inter prediction based on a Bi-directional optical flow (BDOF).

This disclosure also provides a method and an apparatus for enhancing prediction performance by providing a condition for determining whether to apply a DMVR for enhancing image coding efficiency and/or a condition for determining whether to apply a BDOF.

In an aspect, a video decoding method performed by a decoding apparatus is provided. The method includes: deriving an L0 motion vector and an L1 motion vector for a current block; deriving a refined L0 motion vector and a refined L1 motion vector based on the L0 motion vector and the L1 motion vector, by applying DMVR (Decoder-side Motion Vector Refinement) to the current block based on DMVR flag information for representing whether to apply DMVR to the current block; deriving L0 prediction samples of the current block based on the refined L0 motion vector and L1 prediction samples of the current block based on the refined L1 motion vector; deriving prediction samples for the current block based on the L0 prediction samples and the L1 prediction samples, by applying BDOF (Bi-directional optical flow) to the current block based on BDOF flag information for representing whether to apply BDOF to the current block; and generating reconstruction samples for the current block based on the prediction samples, in which the DMVR flag information is derived based on a predetermined DMVR application condition, and the BDOF flag information is derived based on a predetermined BDOF application condition.

In another aspect, a video encoding method performed by an encoding apparatus is provided. The method includes: deriving an L0 motion vector and an L1 motion vector for a current block; deriving a refined L0 motion vector and a refined L1 motion vector based on the L0 motion vector and the L1 motion vector, by applying DMVR (Decoder-side Motion Vector Refinement) to the current block based on DMVR flag information for representing whether to apply DMVR to the current block; deriving L0 prediction samples of the current block based on the refined L0 motion vector and L1 prediction samples of the current block based on the refined L1 motion vector; deriving prediction samples for the current block based on the L0 prediction samples and the L1 prediction samples, by applying BDOF (Bi-directional optical flow) to the current block based on BDOF flag information for representing whether to apply BDOF to the current block; deriving residual samples based on the prediction samples; and encoding video information including information on the residual samples, in which the DMVR flag information is derived based on a predetermined DMVR application condition, and the BDOF flag information is derived based on a predetermined BDOF application condition.

According to this disclosure, overall image/video compression efficiency can be increased.

According to this disclosure, calculation complexity can be reduced and overall coding efficiency can be enhanced through an efficient inter prediction.

According to this disclosure, various application conditions are proposed in applying a DMVR and/or BDOF of refining motion information during a motion compensation process to enhance efficiency in terms of complexity and performance.

DESCRIPTION OF EXEMPLARY EMBODIMENTS

Figure 1:
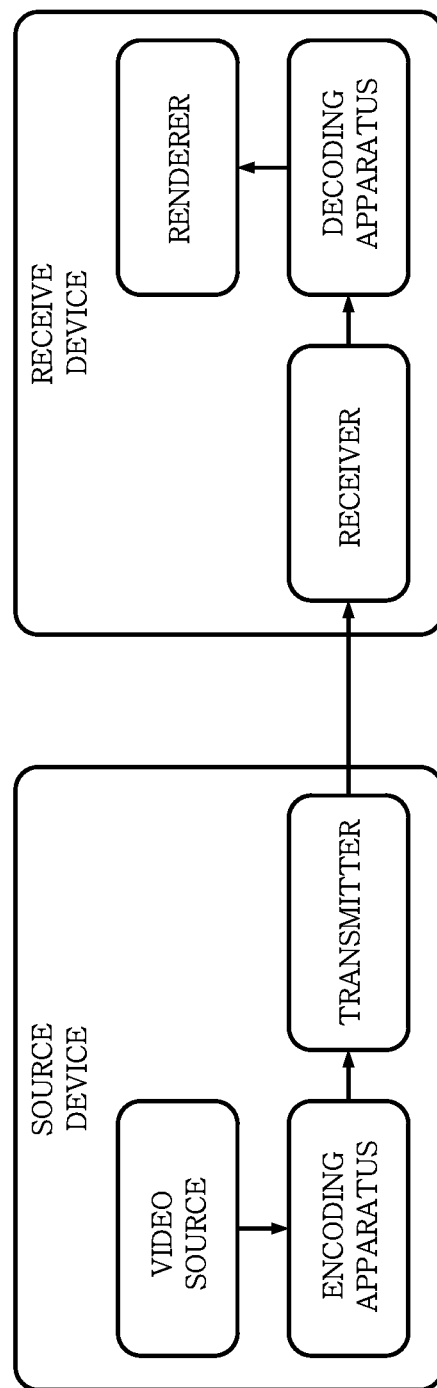
FIG. 1 schematically illustrates a video/image coding system which may be applied to embodiments of the present disclosure.

The present disclosure may be modified in various ways and may have various embodiments, and specific embodiments will be illustrated in the drawings and described in detail. However, this does not intend to limit the present disclosure to the specific embodiments. Terms commonly used in this specification are used to describe a specific embodiment and is not used to limit the technical spirit of the present disclosure. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in the present disclosure are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of the present disclosure unless it deviates from the essence of the present disclosure.

In the present disclosure, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the present disclosure, the term "or" should be interpreted to indicate "and/or". For instance, the expression "A or B" may comprise 1) only A, 2) only B, and/or 3) both A and B. In other words, the term "or" in the present disclosure should be interpreted to indicate "additionally or alternatively".

The present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

The present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may mean a pixel value in a spatial domain and when the pixel value is transformed to a frequency domain, the sample may mean a transform coefficient in the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Hereinafter, preferred embodiments of the present disclosure are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of the present disclosure may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
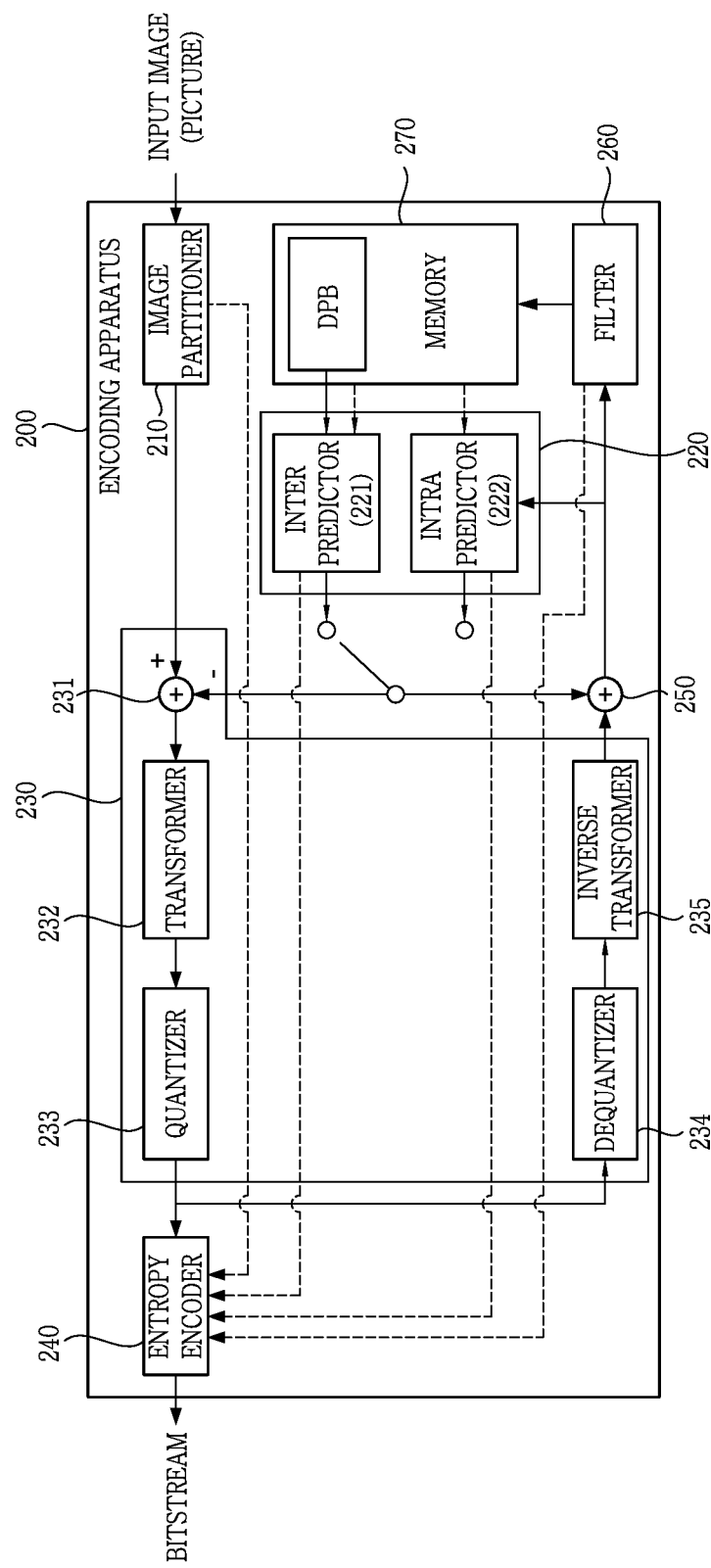
FIG. 2 is a diagram for schematically describing a video/image coding apparatus which may be applied to embodiments of the present disclosure.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
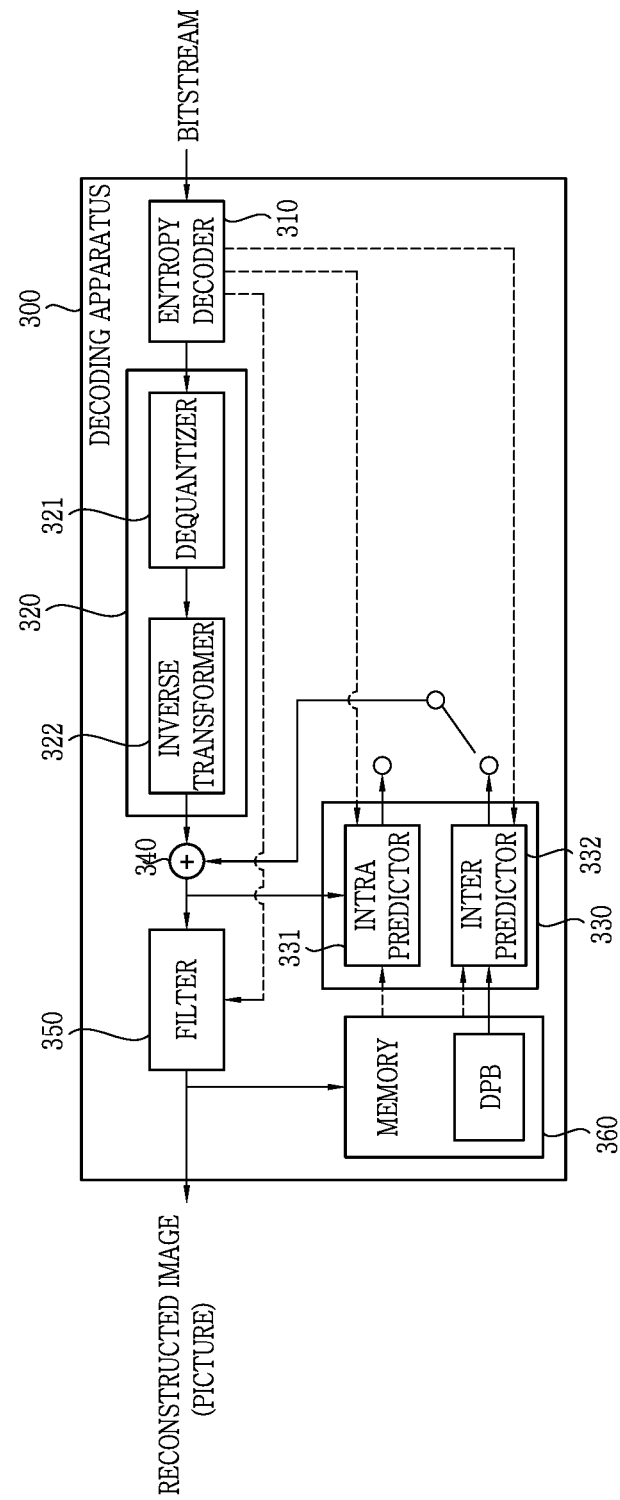
FIG. 3 is a diagram for schematically describing a configuration of a video/image coding apparatus which may be applied to embodiments of the present disclosure.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, as described above, the intra prediction or inter prediction may be applied when performing the prediction on the current block. Hereinafter, a case of applying the inter prediction to the current block will be described.

The predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Information indicating whether the list0 (L0) prediction, list1 (L1) prediction, or bi-prediction is used in the current block (current coding unit) may be signaled. The information may be referred to as motion prediction direction information, inter prediction direction information, or inter prediction indication information and may be configured/encoded/signaled in the form of a syntax element inter_pred_idc, for example. In other words, the inter_pred_idc syntax element may indicate whether the list0 (L0), prediction, list1 (L1) prediction, or bi-prediction is used in the current block (current coding unit). In the present disclosure, for convenience of description, the inter-prediction type (L0 prediction, L1 prediction, or BI prediction) indicated by the inter_pred_idc syntax element may be expressed as a motion prediction direction. The L0 prediction may be represented by pred_L0, the L1 prediction may be represented by pred_L1, and the bi-prediction may be represented by pred_BI. For example, the prediction type shown in Table 1 below may be represented according to the value of the inter_pred_idc syntax element.

TABLE 1

| | Name of inter_pred_idc | |
| --- | --- | --- |
| inter_pred_idc | ( cbWidth + cbHeight ) != 8 | ( cbWidth + cbHeight ) == 8 |
| 0 | PRED_L0 | PRED_L0 |
| 1 | PRED_L1 | PRED_L1 |
| 2 | PRED_BI | n.a. |

Further, various inter prediction modes may be used in applying the inter prediction to the current block. For example, various modes including a merge mode, a skip mode, a motion vector prediction (MVP) mode, an affine mode, a historical motion vector prediction (HMVP) mode, and the like may be used. A decoder side motion vector refinement (DMVR) mode, an adaptive motion vector resolution (AMVR) mode, a bi-directional optical flow (BDOF) etc., may be further used as an ancillary mode. The affine mode may be referred to as an affine motion prediction mode. The MVP mode may be referred to as an advanced motion vector prediction (AMVP) mode. In the present disclosure, some modes and/or motion information candidates derived by some modes may be included in one of motion information related candidates of other modes.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, the motion information of the current block may be used in applying the inter prediction to the current block. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average of prediction samples derived based on the L0 prediction (i.e., a prediction using a reference picture in the reference picture list L0 and MVL0) and prediction samples (according to a phase) derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Figure 4:
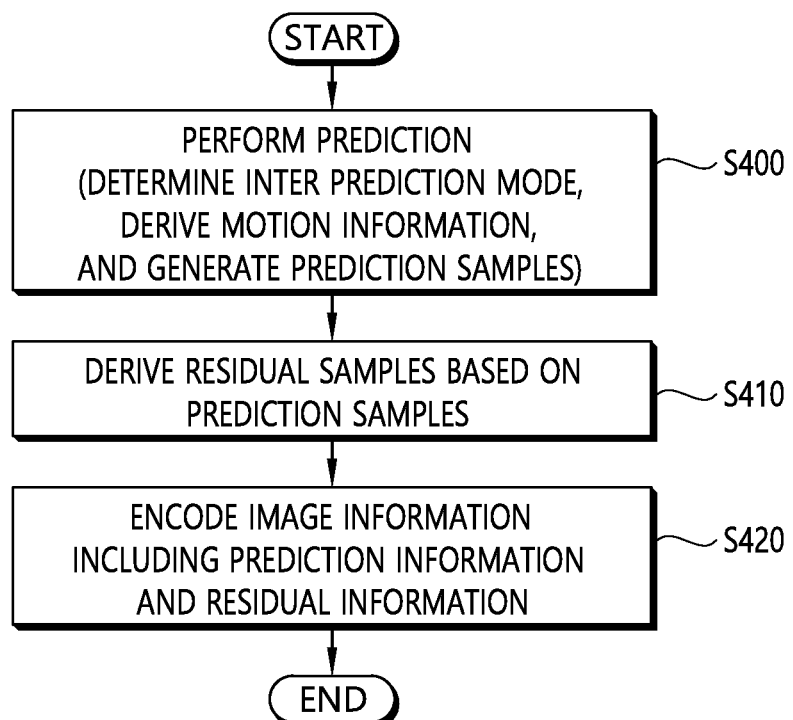
FIG. 4 illustrates one example of a video/image encoding method based on an inter prediction and FIG. 5 illustrates one example schematically illustrating an inter-prediction unit in an encoding apparatus.
Figure 5:
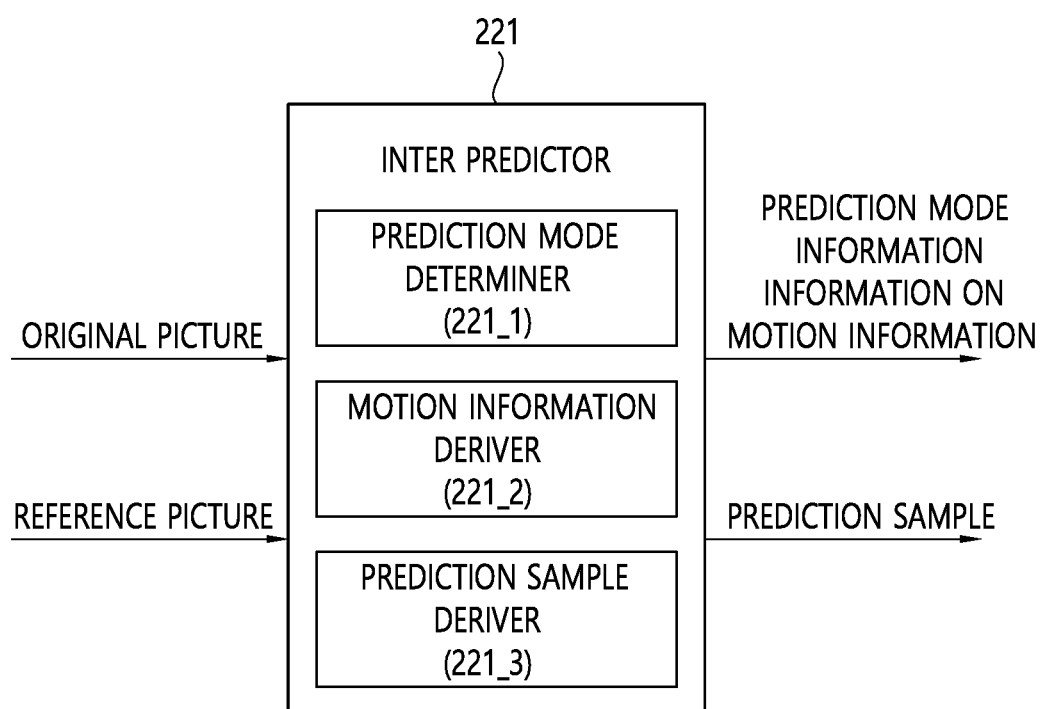

FIG. 4 illustrates one example of a video/image encoding method based on an inter prediction and FIG. 5 illustrates one example schematically illustrating an inter-prediction unit in an encoding apparatus. The inter-prediction unit in the encoding apparatus of FIG. 5 may also be applied to be the same as or correspond to the inter-prediction unit 221 of the encoding apparatus 200 of FIG. 2.

Referring to the FIGS. 4 and 5, the encoding apparatus performs the inter prediction for the current block (S400). The encoding apparatus may derive the inter prediction mode and the motion information of the current block and generate the prediction samples of the current block. Here, an inter prediction mode determining procedure, a motion information deriving procedure, and a generation procedure of the prediction samples may be simultaneously performed and any one procedure may be performed earlier than other procedures.

For example, the inter-prediction unit 221 of the encoding apparatus may include a prediction mode determination unit 2211, a motion information derivation unit 221_2, and a prediction sample derivation unit 2213, and the prediction mode determination unit 221_1 may determine the prediction mode for the current block, the motion information derivation unit 221_2 may derive the motion information of the current block, and the prediction sample derivation unit 221_3 may derive the prediction samples of the current block. For example, the inter-prediction unit 221 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding device may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding device. The motion information of the current block may be derived by using the motion information of the selected merge candidate.

As another example, when an (A)MVP mode is applied to the current block, the encoding device may configure an (A)MVP candidate list and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding device or transferred to the decoding device via the network.

Meanwhile, as described above, the encoding device may generate a reconstructed picture (including reconstructed samples and reconstructed blocks) based on the reference samples and the residual samples. This is to derive the same prediction result as that performed by the decoding device, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering procedure may be further applied to the reconstruction picture as described above.

Figure 6:
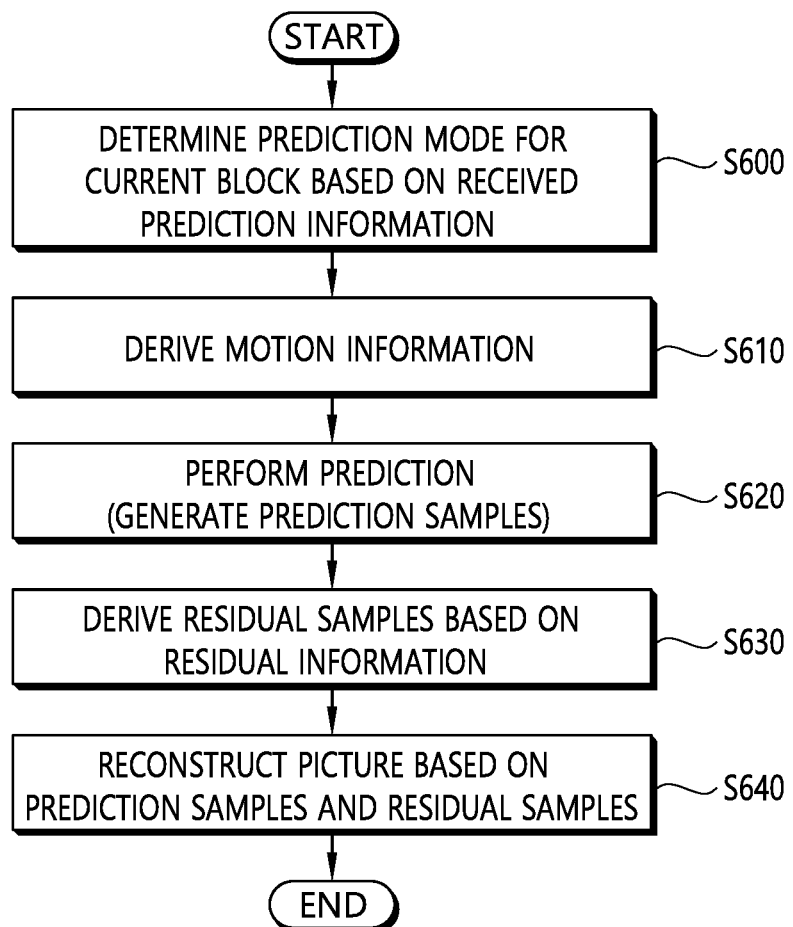
FIG. 6 illustrates one example of a video/image decoding method based on an inter prediction and FIG. 7 illustrates one example schematically illustrating an inter-prediction unit in a decoding apparatus.
Figure 7:
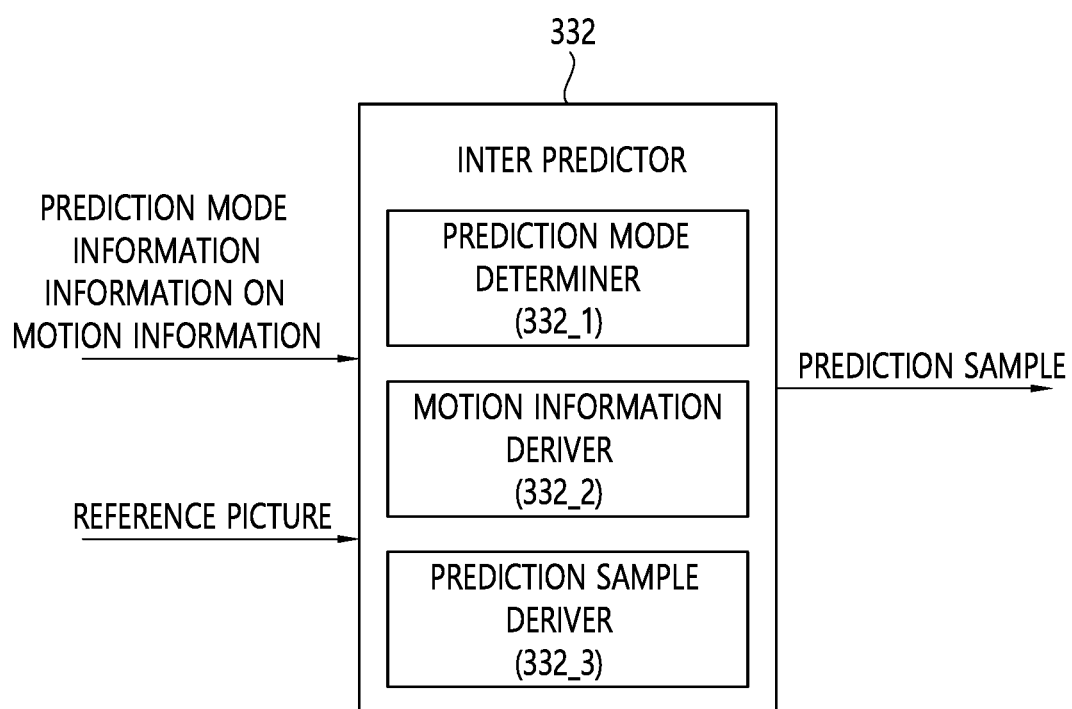

FIG. 6 illustrates one example of a video/image decoding method based on an inter prediction and FIG. 7 illustrates one example schematically illustrating an inter-prediction unit in a decoding apparatus. The inter-prediction unit in the decoding apparatus of FIG. 7 may also be applied to be the same as or correspond to the inter-prediction unit 332 of the decoding apparatus 300 of FIG. 3.

Referring to FIGS. 6 and 7, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S600). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes described above.

The decoding apparatus derives the motion information of the current block based on the determined inter prediction mode (S610). For example, when the skip mode or the merge mode is applied to the current block, the decoding device may configure the merge candidate list and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S620). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit 332 of the decoding apparatus may include a prediction mode determination unit 332_1, a motion information derivation unit 332_2, and a prediction sample derivation unit 3323, and the prediction mode determination unit 332_1 may determine the prediction mode for the current block based on the received prediction mode information, the motion information derivation unit 3322 may derive the motion information (the motion vector and/or reference picture index) of the current block based on the information on the received motion information, and the prediction sample derivation unit 332_3 may derive the predicted samples of the current block.

The decoding apparatus generates the residual samples for the current block based on the received residual information (S630). The decoding apparatus may generate the reconstruction samples for the current block based on the prediction samples and the residual samples and generate the reconstruction picture based on the generated reconstruction samples (S640). Thereafter, the in-loop filtering procedure may be further applied to the reconstruction picture as described above.

As described above, the inter prediction procedure may include an inter prediction mode determining step, a motion information deriving step depending on the determined prediction mode, and a prediction performing (predicted sample generating) step based on the derived motion information. The inter prediction procedure may be performed by the encoding apparatus and the decoding apparatus as described above.

Meanwhile, since the motion of the current block is predicted based on the motion vector of the neighboring block without a motion vector difference (MVD) in the skip mode and/or the merge mode, the skip mode and/or the merge mode shows a limitation in a motion prediction. In order to improve the limitation of the skip mode and/or the merge mode, the motion vector may be refined by applying a Decoder-side Motion Vector Refinement (DMVR) mode, a Bi-directional optical flow (BDOF) mode, etc. The DMVR and BDOF modes may be used when the true bi-prediction is applied to the current block.

Figure 8:
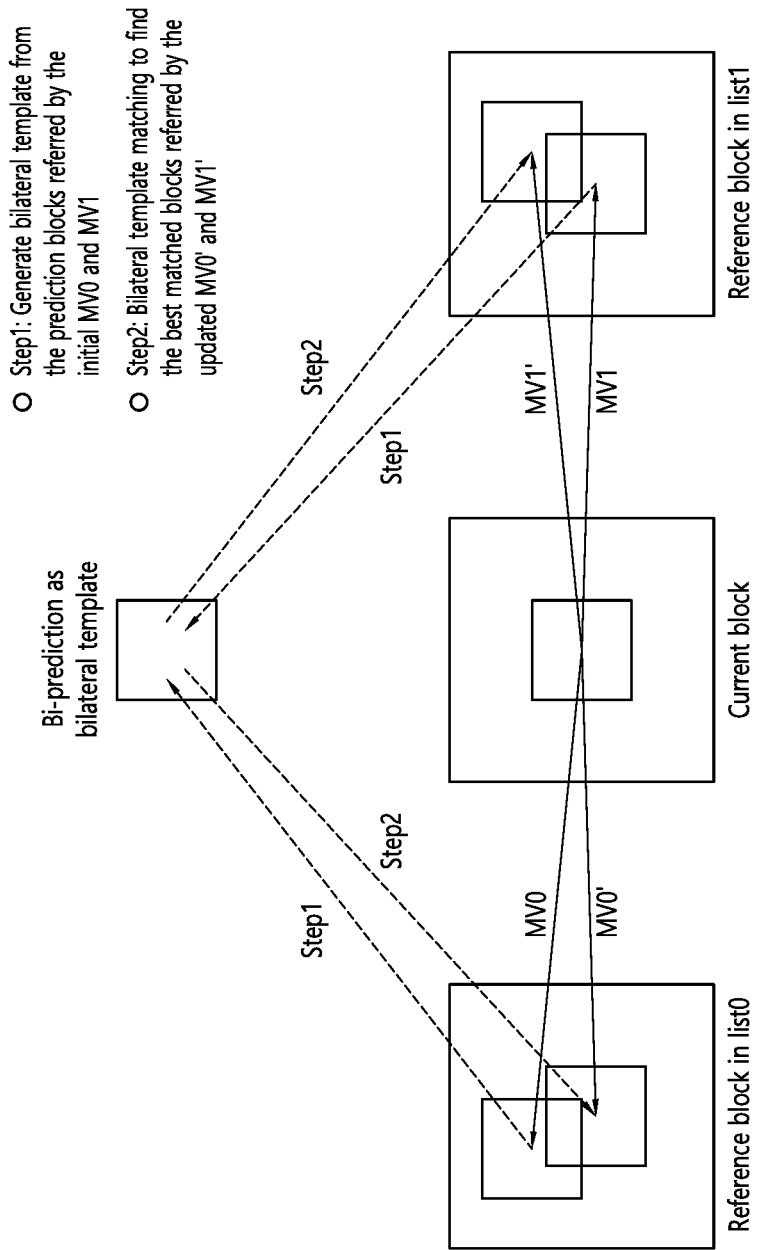
FIG. 8 is a diagram for describing an embodiment of a process of performing a Decoder-side Motion Vector Refinement (DMVR) in a true bi-prediction.

FIG. 8 is a diagram for describing an embodiment of a process of performing a Decoder-side Motion Vector Refinement (DMVR) in a true pair prediction.

The DMVR is a method in which the decoder performs the motion prediction by refining the motion information of the neighboring block. When the DMVR is applied, the decoder may derive the refined motion information through cost comparison based on a template generated by using the motion information of the neighboring block in the merge/skip mode. In this case, precision of the motion prediction may be increased and compression performance may be enhanced without additional signaling information.

In the present disclosure, for convenience of description, the decoding apparatus is mainly described, but the DMVR according to the embodiment of the present disclosure may be performed in the same method even in the encoding apparatus.

Referring to FIG. 8, the decoding apparatus may derive prediction blocks (i.e., reference blocks) identified by list0 and list1-direction initial motion vectors (or motion information) (e.g., MV0 and MV1) and generate a template (or a bilateral template) by a weighted sum (e.g., averaging) of the derived prediction samples (step 1). Here, the initial motion vectors (MV0 and MV1) may represent motion vectors derived by using the motion information of the neighboring block in the merge/skip mode.

In addition, the decoding apparatus may derive motion vectors (e.g., MV0' and MV1') for minimizing a difference between the template and the sample area of the reference picture through a template matching operation (step 2). Here, the sample area may indicate a neighboring area of an initial prediction block in the reference picture and the sample area may be referred to as the neighboring area, a reference area, a search area, a search range, a search space, etc. The template matching operation may include an operation of calculating a cost measurement value between the template and the sample area of the reference picture. For example, the sum of absolute differences (SAD) may be used for the cost measurement. As one example, as a cost function, the normalized SAD may be used. In this case, matching cost may be given as SAD(T−mean(T), 2*P[x]−2*mean(P[x])). Here, T represents the template and P[x] represents the block in the search area. In addition, a motion vector for calculating minimum template cost for each of two reference pictures may be considered as an updated motion vector (replacing the initial motion vector). As illustrated in FIG. 8, the decoding apparatus may generate a final bilateral prediction result (i.e. a final bilateral prediction block) by using the updated motion vectors MV0' and MV1'. As an embodiment, multi-iteration for deriving the updated (or new) motion vector may e used for acquiring the final bilateral prediction result.

In an embodiment, the decoding apparatus may call a DMVR process in order to enhance accuracy of an initial motion compensation prediction (i.e., the motion compensation prediction through the conventional merge/skip mode). For example, the decoding apparatus may perform the DMVR process when the prediction mode of the current block is the merge mode or the skip mode and the bilateral bi-prediction in which the bilateral reference pictures are located at opposite directions based on the current picture in a display order is applied to the current block.

Figure 9:
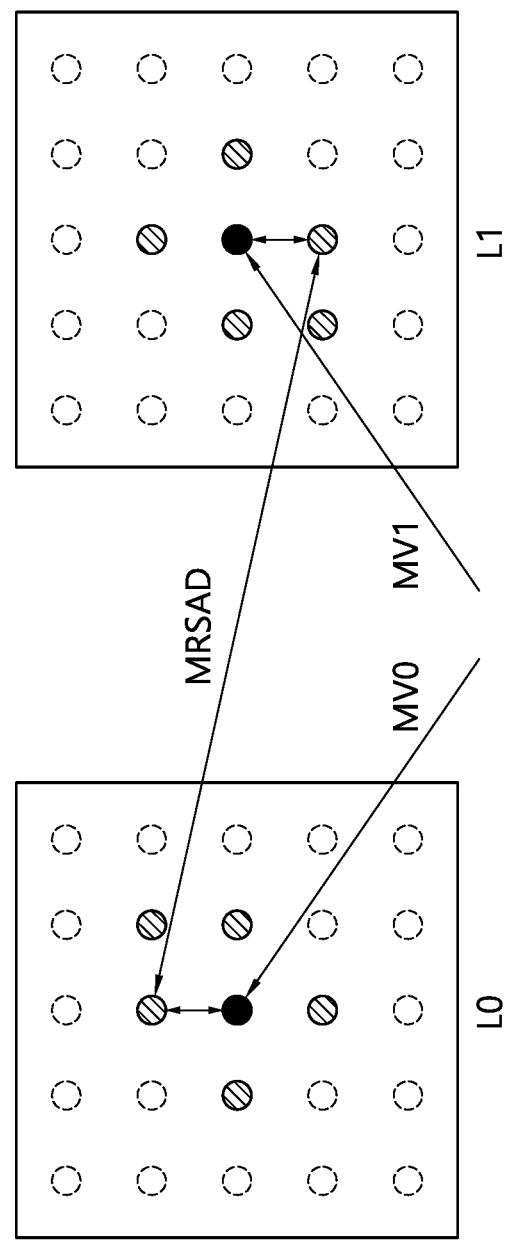
FIG. 9 is a diagram for describing an embodiment of a process of performing a Decoder-side Motion Vector Refinement (DMVR) by using sum of absolute differences (SAD).

FIG. 9 is a diagram for describing an embodiment of a process of performing a Decoder-side Motion Vector Refinement (DMVR) by using sum of absolute differences (SAD).

As described above, the decoding apparatus may measure matching cost by using the SAD in performing the DMVR. As an embodiment, in FIG. 9, a method for refining the motion vector by calculating a mean sum of absolute difference (MRSAD) between the prediction samples in two reference pictures without generating the template will be described. In other words, the method of FIG. 9 shows an embodiment of bilateral matching using the MRSAD.

Referring to FIG. 9, the decoding apparatus may derive an adjacent pixel of a pixel (sample) indicated by the list0 (L0) direction motion vector MV0 on the L0 reference picture and derive an adjacent pixel of a pixel (sample) indicated by the list1 (L1) direction motion vector MV1 on the L1 reference picture. In addition, the decoding apparatus may measure the matching cost by calculating the MRSAD between the L0 prediction block (i.e., L0 reference block) identified by the motion vector indicating the adjacent pixel derived on the L0 reference picture and the L1 prediction block (i.e., L1 reference block) identified by the motion vector indicating the adjacent pixel derived on the L1 reference picture. In this case, the decoding apparatus may select a search point (i.e., a search area having the minimum SAD between the L0 prediction block and the L1 prediction block) having minimum cost as a refined motion vector pair. In other words, the refined motion vector pair may include a refined L0 motion vector indicating a pixel position (L0 prediction block) having the minimum cost in the L0 reference picture and a refined L1 motion vector indicating a pixel position (L1 prediction block) having the minimum cost in the L1 reference picture.

As the embodiment, in calculating the matching cost, after the search area of the reference picture is set, a unilateral prediction may be performed by using a regular 8 tap DCTIF interpolation filter. Further, as one example, 16-bit precision may be used for calculation of the MRSAD and clipping and/or rounding operations may not be applied before the calculation of the MRSAD by considering an internal buffer.

When the true bi-prediction is applied to the current block as described above, the BDOF may be used in order to refine a bi-prediction signal. When the bi-prediction is applied to the current block, the bi-directional optical flow (BDOF) may be used to calculate improved motion information and generate the prediction samples based on the calculated motion information. For example, the BDOF may be applied at a 4×4 subblock level. In other words, the BDOF may be performed in units of 4×4 subblocks in the current block. Alternatively, the BDOF may be applied only to a luma component. Alternatively, the BDOF may be applied only to a chroma component and applied to the luma component and the chroma component.

The BDOF mode is based on an optical flow concept assuming that an object motion is smooth as indicated by a name of the BDOF mode. A motion refinement ($v_x$, $v_y$) may be calculated by minimizing a difference value between the L0 and L1 prediction samples for each of 4×4 subblocks. In addition, the motion refinement may be used for adjusting the bi-prediction sample values in 4×4 subblocks.

More specifically, in refining a prediction signal by applying the BDOF, horizontal and vertical gradients of the L0 prediction samples and the L1 prediction samples may be first calculated. In this case, the horizontal and vertical gradients may be calculated based on a difference two adjacent samples positioned adjacent the prediction sample (i, j) and calculated as shown in Equation 1 below.

$$\frac{\partial I^{(k)}}{\partial x}(i, j) = (I^{(k)}(i+1, j) - I^{(k)}(i-1, j)) \gg 4 \quad \text{[Equation 1]}$$

$$\frac{\partial I^{(k)}}{\partial y}(i, j) = (I^{(k)}(i, j+1) - I^{(k)}(i, j-1)) \gg 4$$

Here, $$\frac{\partial I^{(k)}}{\partial x}(i, j)$$

represents the horizontal gradient and $$\frac{\partial I^{(k)}}{\partial y}(i, j)$$

represents the vertical gradient. Further, $I^{(k)}(i,j)$ represents a prediction value in coordinate (i, j) of the prediction sample in list k (k=0, 1).

Next, an auto-correlation and a cross-correlation of the horizontal and vertical gradients may be calculated as shown in Equations 2 and 3 below.

$$S_1 = \sum_{(i,j)\in\Omega} \psi_x(i,j) \cdot \psi_x(i,j), \quad S_3 = \sum_{(i,j)\in\Omega} \theta(i,j) \cdot \psi_x(i,j) \quad \text{[Equation 2]}$$

$$S_2 = \sum_{(i,j)\in\Omega} \psi_x(i,j) \cdot \psi_y(i,j)$$

$$S_5 = \sum_{(i,j)\in\Omega} \psi_y(i,j) \cdot \psi_y(i,j) \quad S_6 = \sum_{(i,j)\in\Omega} \theta(i,j) \cdot \psi_y(i,j)$$

$$\psi_x(i,j) = \left(\frac{\partial I^{(1)}}{\partial x}(i,j) + \frac{\partial I^{(0)}}{\partial x}(i,j)\right) \gg n_a \quad \text{[Equation 3]}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

Here, Ω represents a 6×6 window adjacent to 4×4 sub-blocks.

Next, the motion refinement ($v_x$, $v_y$) may be calculated by using the auto-correlation and the cross-correlation and calculated as shown in Equation 4 below.

$$v_x = \quad \text{[Equation 4]}$$

$$S_1 > 0?\ \text{clip3}\left(-th'_{BIO},\ th'_{BIO},\ -\left((S_3 \cdot 2^{n_b-n_a}) \gg \lfloor \log_2 S_1 \rfloor\right)\right) : 0$$

$$v_y = S_5 > 0?\ \text{clip3}$$

$$\left(-th'_{BIO},\ th'_{BIO},\ -\left((S_6 \cdot 2^{n_b-n_a} - ((v_x, S_{2,m}) \ll n_{S_2} + v_x S_{2,s})/2\right)\right.$$

$$\left. \gg \lfloor \log_2 S_5 \rfloor\right) : 0$$

Here $$S_{2,m} = S_2 \gg n_{S_2},\ S_{2,s} = S_2\ \&(2^{n_{S_2}} - 1),\ th'_{BIO} = 2^{13-BD},$$

and $\lfloor \cdot \rfloor$ represents a floor function.

Next, b(x, y) for refinement of the BDOF prediction sample may be calculated as shown in Equation 5 below based on the gradient and the motion refinement.

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + \quad \text{[Equation 5]}$$

$$rnd\left(\left(v_y\left(\frac{\partial I^{(1)}(x,y)}{\partial y} - \frac{\partial I^{(0)}(x,y)}{\partial y}\right)\right)/2\right)$$

In addition, last, the BDOF prediction samples (i.e., prediction sample values refined by applying the BDOF) may be calculated as shown in Equation 6 below.

$$\text{pred}_{BDOF}(x,y) = (I^{(0)}(x,y) + I^{1}(x,y) + b(x,y) + o_{\textit{offset}}) \gg \text{shift} \quad \text{[Equation 6]}$$

Meanwhile, it can be seen that the DMVR and the BDOF as techniques that perform the prediction by refining the motion information (in this case, the true bi-prediction represents a case of performing the motion prediction/compensation in a reference picture of the other direction based on the picture of the current block) at the time of applying the true bi-prediction is a refinement technique having a similar concept in that it is assumed that the motion of an object in the picture is made at a predetermined speed and in a predetermined direction. However, when the true bi-prediction is performed, since a condition for applying the DMVR and a condition for applying the BDOF are different from each other, a process of checking the conditions repeatedly multiple times for each technique should be performed. Therefore, the present disclosure proposes a method that may enhance efficiency in terms of decoder complexity and performance by improving the process of checking the condition in determining the prediction mode applied to the current block.

Table 2 below shows a condition for applying the DMVR during the conventional true bi-prediction. When all conditions listed below are satisfied, the DMVR may be applied.

TABLE 2

- sps_dmvr_enabled_flag is set to 1. : Signaling in SPS
- merge_flag[ xCb ][ yCb ] is equal to 1. : Applied in MERGE/SKIP
- mmvd_flag[ xCb ][ yCb ] is equal to 0. : Applied in not MMVD
- predFlagL0[0][0]=1 and predFlagL0[1][1]=1. : Bilateral prediction
- DiffPicOrderCnt (currPic, RefPicList0 [refIdxL0])-DiffPicOrderCnt currPic, RefPicList1 [ refIdxL1 ] ) is equal to 0. : TrueBi and distances between the current picture and bilateral reference pictures are the same as each other (even hereinafter, a 'reference picture distance' may represent the meaning)
- CbHeight is greater than or equal to 8. : When the length (or size) of the block is larger than a threshold (e.g., 8) (here, the example of the threshold may be diversified)
- CbHeight*CbWidth is greater than or equal to 64. : When the length (or size) of the block is larger than a threshold (e.g., 64) (here, the example of the threshold may be diversified)

Referring to Table 2, 1) whether to apply the DMVR may be determined based on flag information (e.g., sps_dmvr_enabled_flag) signaled in a sequence parameter set (SPS) syntax. Here, the flag information (e.g., sps_dmvr_enabled_flag) may represent whether the true bi-prediction based DMVR is enabled. For example, when sps_dmvr_enabled_flag is 1 (i.e., when the true bi-prediction based DMVR is enabled), it may be determined that a condition for whether the DMVR is enabled is satisfied.

2) Whether to apply the DMVR may be determined based on flag information (e.g., merge_flag) representing whether the inter prediction is performed by using the merge mode/skip mode. For example, when merge_flag is 1 (i.e., when the inter prediction is performed by using the merge mode/skip mode), it may be determined that a condition for whether to apply the merge mode/skip mode is satisfied.

3) Whether to apply the DMVR may be determined based on flag information (e.g., mmvd_flag) representing whether the inter prediction is performed by using the merge mode with motion vector difference (MMVD) mode. For example, when mmvd_flag is 0 (i.e., when the MMVD mode is not used), it may be determined that a condition for whether to apply the MMVD mode is satisfied.

4) Whether to apply the DMVR may be determined based on whether the bilateral prediction (bi-prediction) is used. Here, the bilateral prediction may represent an inter prediction performed based on reference pictures which exist in different directions based on the current picture. For example, when predFlagL0 [0][0]=1 and predFlagL0 [1][1] =1, it may be determined that the bilateral prediction is applied and it may be determined that a condition for whether to perform the bilateral prediction is satisfied.

5) Whether to apply the DMVR may be determined based on whether the true bi-prediction is performed and the distances between the current picture and the bilateral reference pictures are the same as each other. In other words, it may be determined whether a distance between the current picture and an L0 reference picture (i.e., a reference picture in the reference picture list L0) and a distance between the current picture and an L1 reference picture (i.e., a reference picture in the reference picture list L1) are the same as each other. For example, when DiffPicOrderCnt(currPic, RefPicList0 [refIdxL0])−DiffPicOrderCnt(currPic, RefPicList1 [refIdxL1])=0, it is determined that the true bi-prediction is performed and the distances between the current picture and the bilateral reference pictures are the same as each other to determine that a condition for whether the distances of the bilateral reference pictures are the same as each other is satisfied.

6) Whether to apply the DMVR may be determined based on whether a height of a current block is larger than a threshold. For example, when the height of the current block is equal to or larger than 8, it may be determined that a current block size (height) condition is satisfied.

7) Whether to apply the DMVR may be determined based on whether the size of the current block is larger than the threshold. For example, when the size of the current block, height*width is equal to or larger than 64, it may be determined that the current block size (height*width) condition is satisfied.

The decoding apparatus may determine whether to apply the DMVR according to whether conditions 1) to 7) of Table 2 above are satisfied. In other words, when conditions 1) to 7) of Table 2 above are satisfied, the decoding apparatus may perform the true bi-prediction by applying the DMVR and when even any one of the conditions of Table 2 above is not satisfied, the decoding apparatus does not apply the DMVR.

Table 3 below shows a condition for applying the BDOF during the conventional true bi-prediction. When all conditions listed below are satisfied, the BDOF may be applied.

TABLE 3

- sps_bdof_enabled_flag is equal to 1. : signaling in SPS
- predFlagL0[ xSbIdx ][ ySbIdx ] and predFlagL1[ xSbIdx ][ ySbIdx ] are both equal to 1. : Bilateral prediction
- DiffPicOrderCnt( currPic, refPicList0[ refIdxL0 ] ) * DiffPicOrderCnt ( currPic, refPicList1[ refIdxL1 ] ) is less than 0. : TrueBi
- MotionModelIdc[ xCb ][ yCb ] is equal to 0. : When not Affine
- merge_subblock_flag[ xCb ][ yCb ] is equal to 0. : subblock && w >=8 && h>=8
- GbiIdx[ xCb ][ yCb ] is equal to 0. : When GBi index is default
- cIdx is equal to 0. : Applied only to luma Referring to Table 3 above, 1) whether to apply the BDOF may be determined based on flag information (e.g., sps_bdof_enabled_flag) signaled in the sequence parameter set (SPS) syntax. Here, the flag information (e.g., sps_dmvr_enabled_flag) may represent whether the true bi-prediction based BDOF is enabled. For example, when sps_bdof_enabled_flag is 1 (i.e., when the true bi-prediction based BDOF is enabled), it may be determined that a condition for whether the BDOF is enabled is satisfied.

2) Whether to apply the BDOF may be determined based on whether the bilateral prediction is used. Here, the bilateral prediction may represent an inter prediction performed based on reference pictures which exist in different directions based on the current picture. For example, when both predFlagL0] and predFlagL1 are 1, it may be determined that the bilateral prediction is applied and it may be determined that a condition for whether to perform the bilateral prediction is satisfied.

3) Whether to apply the BDOF may be determined based on whether the true bi-prediction is performed. In other words, it may be determined whether the L0 reference picture (i.e., the reference picture in the reference picture list L0) and the L1 reference picture (i.e., the reference picture in the reference picture list L1) are located in temporally different directions based on the current picture. For example, when DiffPicOrderCnt(currPic, refPicList0[refIdxL0])*DiffPicOrderCnt(currPic, refPicList1[refIdxL1]) is smaller 0, it is determined that the bilateral reference pictures are located in different directions based on the current picture to determine that the condition for whether the true vi-prediction is performed is satisfied.

4) Whether to apply the BDOF may be determined based on whether the affine mode is used. Here, whether the affine mode is used may be determined by deriving MotionModelIdc. For example, when the derived MotionModelIdc is 0, it may be determined that the affine mode is not used and in this case, it may be determined that a condition for whether to apply the affine mode is satisfied.

5) Whether to apply the BDOF may be determined based on flag information (e.g., merge_subblock_flag) representing whether the inter prediction is performed in units of the subblocks. For example, when merge_subblock_flag is 0 (i.e., when the merge mode is not applied in units of the subblocks), it may be determined that a condition for whether to apply the merge mode in units of the subblocks is satisfied.

6) Whether to apply the BDOF may be determined based on whether GBi exists. Here, whether the GBi exists may be determined based on GBi index information (e.g., GbiIdx). For example, when GbiIdx is 0 (i.e., when the GbiIdx is default), it may be determined that a condition for whether the GBi exists is satisfied.

7) Whether to apply the BDOF may be determined based on whether the current block is a luma block including the luma component. For example, when an index (e.g., cIdx) indicating whether the current block is the luma block (i.e., when the current block is the luma block), it may be determined that a condition for whether the current block is the luma block is satisfied.

The decoding apparatus may determine whether to apply the DMVR according to whether conditions 1) to 7) of Table 3 above are satisfied. In other words, when conditions 1) to 7) of Table 3 above are satisfied, the decoding apparatus may perform the true bi-prediction by applying the BDOF and when even any one of the conditions of Table 3 above is not satisfied, the decoding apparatus does not apply the BDOF.

Here, the GBi may represent a generalized bi-prediction in which different weights may be applied to the L0 prediction and the L1 prediction and may be represented by using GbiIdx, for example. The GbiIdx may exist in the case of the bi-prediction and represent a bi-prediction weight index. In the present disclosure, the motion information may further include GbiIdx. For example, GbiIdx may be derived from the neighboring block in the case of the merge mode or signaled from the encoding apparatus to the decoding apparatus through a GbiIdx syntax element (e.g., gbi_idx) in the case of the MVP mode. As one example, GbiIdx may indicate a weight w applied to the L1 prediction and in this case, a weight of (1−w) may be applied to the L0 prediction. As another example, GbiIdx may indicate the weight w applied to the L0 prediction and in this case, the weight 1−w may be applied to the L1 prediction. The weight indicated by GbiIdx may be variously configured and may be configured as shown in Tables 4 and 5 below, for example.

TABLE 4

| GBi Index | Weight value of $w_1$ |
|---|---|
| 0 | ½ |
| 1 | −¼ |
| 2 | ⅜ |

TABLE 4-continued

| GBi Index | Weight value of $w_1$ |
|---|---|
| 3 | 5/8 |
| 4 | 5/4 |

TABLE 5

| GBi Index | Weight value of $w_1$ |
|---|---|
| 0 | −1/4 |
| 1 | 3/8 |
| 2 | 1/2 |
| 3 | 5/8 |
| 4 | 5/4 |

Referring to Tables 4 and 5 above, a weight of $w_1$ may represent a weight applied to the L1 prediction and the GbiIdx value may indicate the weight $w_1$ applied to the L1 prediction. For example, according to the embodiment of Table 4, when the value of GbiIdx represents 0, a ½ weight may be applied to the L1 prediction and the ½ weight which is a value of $(1-w_1)$ may be applied to the L0 prediction. According to the embodiment, the weight of $w_1$ may represent the weight applied to the L0 prediction and in this case, the GbiIdx value may indicate the weight $w_1$ applied to the L0 prediction.

As described above, some of the application conditions of the DMVR and the BDOF are the same and some are similar or different. In the conventional scheme, since condition check is performed for each technique even when the condition is the same, complexity for performing the bi-prediction increases. Therefore, the present disclosure proposes an efficient condition for applying the DMVR and the BDOF during the bi-prediction.

When the merge/skip mode is compared with the AMVP mode, the merge/skip mode has relatively lower accuracy than the AMVP mode, and as a result, refining the motion information by using the DMVR method is effective in terms of the performance. However, the BDOF mode may be applied even in the AMVP mode in addition to the merge/skip mode unlike the DMVR and as such, complexity for performing the BDOF compared with the performance may increase when applying the BDOF in the AMVP mode. Accordingly, the embodiment proposes a method for applying even the BDOF in the merge/skip mode similarly to the DMVR.

In this case, as an embodiment proposed in the present disclosure, the application condition of the BDOF may include conditions presented in Table 6 below.

TABLE 6

- sps_bdof_enabled_flag is equal to 1.
- merge_flag[ xCb ][ yCb ] is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt ( currPic, refPicList1[ refIdxL1 ] ) is less than 0.
- MotionModelIdc[ xCb ][ yCb ] is equal to 0.
- merge_subblock_flag[ xCb ][ yCb ] is equal to 0.
- GbiIdx[ xCb ][ yCb ] is equal to 0.
- cIdx is equal to 0.

Referring to Table 6 above, whether to apply the BDOF may be determined based on flag information (e.g., merge_flag) representing whether the inter prediction is performed by using the merge mode/skip mode. For example, when merge_flag is 1 (i.e., when the inter prediction is performed by using the merge mode/skip mode), it may be determined that a condition for whether to apply the merge mode/skip mode is satisfied. Accordingly, the BDOF may also be applied in the merge/skip mode similarly to the DMVR.

In other words, in the embodiment, together with a condition applied in the case of the merge/skip mode, whether to apply the BDOF may be determined based on a condition applied when the BDOF is enabled, a condition applied in the case of the bilateral prediction, a condition applied when the true bi-prediction is performed, a condition applied when the affine prediction is used, a condition applied when the subblock based merge mode is not applied, a condition applied when the GBi index is default, and a condition applied when the current block is the luma block.

Accordingly, the decoding apparatus may determine whether all conditions listed in Table 6 above are satisfied and when all conditions are satisfied, the decoding apparatus may perform the true bi-prediction by applying the BDOF. When even any of the conditions listed in Table 6 above is not satisfied, the decoding apparatus may not apply the BDOF. The encoding apparatus may also apply the conditions of Table 6 above and the encoding apparatus may perform the true bi-prediction by a corresponding method in the decoding apparatus.

The method for performing the true bi-prediction based on the conditions listed in Table 6 above may be independently applied to the DMVR and the BDOF or may be applied under the same condition for the DMVR and the BDOF.

Meanwhile, when the conditions listed in the embodiment are the same as the conditions described in Tables 2 and 3 above, a detailed operation or meaning is similarly applied, and as a result, a detailed description for each condition will be omitted. Further, duplicated contents even in embodiments to be described below will be omitted.

The encoding/decoding apparatus may be configured by various hardware and a preference of a ratio of complexity to performance may be different. Therefore, the embodiment proposes a method that may refine the motion information by applying the DMVR even in the AMVP mode in addition to the merge/skip mode.

In this case, as an embodiment proposed in the present disclosure, the application condition of the DMVR may include conditions presented in Table 7 below.

TABLE 7

- sps_dmvr_enabled_flag is set to 1.
- mmvd_flag[xCb][yCb] is equal to 0.
- predFlagL0[0][0]=1 and predFlagL0[1][1]=1.
- DiffPicOrderCnt (currPic, RefPicList0 [refIdxL0])-DiffPicOrderCnt (currPic, RefPicList1 [ refIdxL1 ] ) is equal to 0.
- CbHeight is greater than or equal to 8.
- CbHeight*CbWidth is greater than or equal to 64.

Referring to Table 7 above, a process of determining whether to apply the DMVR may be omitted based on the flag information (e.g., merge_flag) representing whether the inter prediction is performed by using the merge mode/skip mode. As such, by omitting a condition for whether to apply the merge mode/skip mode, the DMVR may be applied even in the AMVP mode in addition to the merge mode/skip mode.

According to Table 7 above, whether to apply the DMVR may be determined based on a condition applied when the DMVR is enabled, a condition applied when the MMVD mode is not used, a condition applied in the case of the bilateral prediction, a condition applied in the case of the true bi-prediction in which the distances between the current picture and the bilateral reference pictures are the same as each other, a condition applied when the height of the current block is equal to or larger than 8, and a condition applied when the size (height*width) of the current block is equal to or larger than 64.

In other words, the decoding apparatus may determine whether all conditions listed in Table 7 above are satisfied and when all conditions are satisfied, the decoding apparatus may perform the true bi-prediction by applying the DMVR. When even any of the conditions listed in Table 7 above is not satisfied, the decoding apparatus may not apply the DMVR. The encoding apparatus may also apply the conditions of Table 7 above and the encoding apparatus may perform the true bi-prediction by a corresponding method in the decoding apparatus.

The method for performing the true bi-prediction based on the conditions listed in Table 7 above may be independently applied to the DMVR and the BDOF or may be applied under the same condition for the DMVR and the BDOF.

Meanwhile, as an embodiment of the present disclosure, both the DMVR and the BDOF may be applied to a normal merge mode. In other words, the DMVR and the BDOF may be applied when the advanced temporal motion vector prediction (ATMVP) mode is not used, the affine mode is not used, and the CPR is not used. In this case, the application condition of the DMVR may include conditions presented in Table 8 below.

TABLE 8

- sps_dmvr_enabled_flag is set to 1.
- merge_flag[ xCb ][ yCb ] is equal to 1.
- mmvd_flag[ xCb ][ yCb ] is equal to 0.
- predFlagL0[0][0]=1 and predFlagL0[1][1]=1.
- DiffPicOrderCnt (currPic, RefPicList0 [refIdxL0])-DiffPicOrderCnt (currPic, RefPicList1 [ refIdxL1 ]) is equal to 0.
- CbHeight is greater than or equal to 8.
- CbHeight*CbWidth is greater than or equal to 64.
- MotionModelIdc[ xCb ][ yCb ] is equal to 0. : !Affine
- merge_subblock_flag[ xCb ][ yCb ] is equal to 0. : subblock && w >=8 && h>=8

Referring to Table 8 above, whether the condition applied when the affine mode is not used (e.g., when MotionModelIdc is 0) and the condition applied when the subblock based merge mode is not used (e.g., when merge_subblock_flag is 0) are satisfied is determined to apply the DMVR only in the normal merge mode.

Further, in the embodiment, together with the condition for whether the affine mode is used and the condition for whether the subblock based merge mode is used, whether to apply the DMVR may be determined based on the condition applied when the DMVR is enabled, the condition applied when the merge mode/skip mode is used, the condition applied when the MMVD mode is not used, the condition applied in the case of the bilateral prediction, the condition applied in the case of the true bi-prediction in which the distances between the current picture and the bilateral reference pictures are the same as each other, the condition applied when the height of the current block is equal to or larger than 8, and the condition applied when the size (height*width) of the current block is equal to or larger than 64.

In other words, the decoding apparatus may determine whether all conditions listed in Table 8 above are satisfied and when all conditions are satisfied, the decoding apparatus may perform the true bi-prediction by applying the DMVR. When even any of the conditions listed in Table 8 above is not satisfied, the decoding apparatus may not apply the DMVR. The encoding apparatus may also apply the conditions of Table 8 above and the encoding apparatus may perform the true bi-prediction by a corresponding method in the decoding apparatus.

The condition for whether to apply the subblock based merge mode (e.g., merge_subblock_flag) among the application conditions of Table 8 above includes a duplicated condition among the conventional DMVR application conditions. Accordingly, as an embodiment of the present disclosure, a condition duplicated with the condition (e.g., merge_subblock_flag) for whether to apply the subblock based merge mode may be removed. In this case, the corresponding condition may be removed as proposed in Table 9 below.

TABLE 9

- sps_dmvr_enabled_flag is set to 1.
- merge_flag[ xCb ][ yCb ] is equal to 1.
- mmvd_flag[ xCb ][ yCb ] is equal to 0.
- predFlagL0[0][0]=1 and predFlagL0[1][1]=1.
- DiffPicOrderCnt (currPic, RefPicList0 [refIdxL0]) − DiffPicOrderCnt (currPic, RefPicList1 [ refIdxL1 ] ) is equal to 0.
- MotionModelIdc[ xCb ][ yCb ] is equal to 0. : !Affine
- merge_subblock_flag[ xCb ][ yCb ] is equal to 0. : subblock && w >=8 && h>=8

Referring to Table 9 above, the subblock based merge mode may be applied when the size of the current block is equal to or larger than 8×8. Accordingly, since the condition (e.g., merge_subblock_flag=0) for whether to apply the subblock based merge mode includes a condition related to the size of the current block, conditions (e.g., CbHeight and CbHeight*CbWidth) related to the size of the current block among the application conditions of the conventional DMVR may be excluded. For example, the condition for whether the height of the current block is equal to or larger than 8 and the condition for whether the height*width of the current block is equal to or larger than 64 may be omitted and whether to apply the DMVR may be determined by using the remaining conditions listed in Table 9 above.

In other words, the decoding apparatus may determine whether all conditions listed in Table 9 above are satisfied and when all conditions are satisfied, the decoding apparatus may perform the true bi-prediction by applying the DMVR. When even any of the conditions listed in Table 9 above is not satisfied, the decoding apparatus may not apply the DMVR. The encoding apparatus may also apply the conditions of Table 9 above and the encoding apparatus may perform the true bi-prediction by a corresponding method in the decoding apparatus.

The method for performing the true bi-prediction based on the conditions listed in Table 8 or 9 above may be independently applied to the DMVR and the BDOF or may be applied under the same condition for the DMVR and the BDOF.

As an embodiment of the present disclosure, in order to increase the accuracy of the motion vector in low complexity, when the size of the block is small, the refinement techniques such as the DMVR and the BDOF may not be applied. In the conventional scheme, the refinement technique may be applied when the current block is a block which is equal to or larger than 8×8 and in the case of the DMVR of the refinement techniques, when the size of the current block is large, the refinement is applied by separating the current block into 16×16 units, and as a result, the DMVR may not be applied to a block which is smaller than 16×16. In this case, the application condition of the DMVR may include conditions presented in Table 10 below.

TABLE 10

- sps_dmvr_enabled_flag is set to 1.
- merge_flag[ xCb ][ yCb ] is equal to 1.
- mmvd_flag[ xCb ][ yCb ] is equal to 0.
- predFlagL0[0][0]=1 and predFlagL0[1][1]=1.
- DiffPicOrderCnt (currPic, RefPicList0 [refIdxL0]) − DiffPicOrderCnt (currPic, RefPicList1 [ refIdxL1 ] ) is equal to 0.
- CbHeight is greater than or equal to 16.
- CbWidth is greater than or equal to 16.

Referring to Table 10 above, the DMVR may not be applied to the block which is smaller than 16×16 by changing the conditions (e.g., CbHeight and CbWidth) related to the size of the current block. For example, a condition applied when the height of the current block (e.g., CbHeight) is equal to or larger than 16 and a condition applied when the width of the current block (e.g., CbWidth) is equal to or larger than 16 may be used. When the application conditions related to the size of the current block are satisfied (i.e., when the size of the current block is equal to or larger than 16×16, the DMVR may be applied and when the application conditions related to the size of the current block are not satisfied (i.e., when the size of the current block is smaller than 16×16), the DMVR may not be applied.

Further, in the embodiment, together with the conditions (e.g., CbHeight and CbWidth) related to the size of the current block, whether to apply the DMVR may be determined based on the remaining application conditions listed in Table 10 above.

In other words, the decoding apparatus may determine whether all conditions listed in Table 10 above are satisfied and when all conditions are satisfied, the decoding apparatus may perform the true bi-prediction by applying the DMVR. When even any of the conditions listed in Table 10 above is not satisfied, the decoding apparatus may not apply the DMVR. The encoding apparatus may also apply the conditions of Table 10 above and the encoding apparatus may perform the true bi-prediction by a corresponding method in the decoding apparatus.

As an embodiment of the present disclosure, when the current block is the block which is smaller than 16×16, the BDOF may not be applied in addition to the DMVR. In this case, the application condition of the BDOF may include conditions presented in Table 11 below.

TABLE 11

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt (currPic, refPicList1[ refIdxL1 ] ) is less than 0.
- MotionModelIdc[ xCb ][ yCb ] is equal to 0.
- merge_subblock_flag[ xCb ][ yCb ] is equal to 0.
- CbHeight is greater than or equal to 16
- CbWidth is greater than or equal to 16
- GbiIdx[ xCb ][ yCb ] is equal to 0.
- cIdx is equal to 0.

Referring to Table 11 above, the BDOF may not be applied to the block which is smaller than 16×16 by changing the conditions (e.g., CbHeight and CbWidth) related to the size of the current block. For example, a condition applied when the height of the current block (e.g., CbHeight) is equal to or larger than 16 and a condition applied when the width of the current block (e.g., CbWidth) is equal to or larger than 16 may be used. When the application conditions related to the size of the current block are satisfied (i.e., when the size of the current block is equal to or larger than 16×16, the BDOF may be applied and when the application conditions related to the size of the current block are not satisfied (i.e., when the size of the current block is smaller than 16×16), the BDOF may not be applied.

Further, in the embodiment, together with the conditions (e.g., CbHeight and CbWidth) related to the size of the current block, whether to apply the BDOF may be determined based on the remaining application conditions listed in Table 11 above.

In other words, the decoding apparatus may determine whether all conditions listed in Table 11 above are satisfied and when all conditions are satisfied, the decoding apparatus may perform the true bi-prediction by applying the BDOF. When even any of the conditions listed in Table 11 above is not satisfied, the decoding apparatus may not apply the BDOF. The encoding apparatus may also apply the conditions of Table 11 above and the encoding apparatus may perform the true bi-prediction by a corresponding method in the decoding apparatus.

The method for performing the true bi-prediction based on the conditions listed in Table 10 or 11 above may be independently applied to the DMVR and the BDOF or may be applied under the same condition for the DMVR and the BDOF.

As described above, the DMVR is applied when the distances between the current picture and the bilateral reference pictures are the same as each other, while the BDOF is continuously applied in the case of the true bi-prediction even though the distances between the current picture and the bilateral reference pictures are different from each other. Accordingly, the present disclosure proposes a method that may integrally apply the condition related to the bilateral reference picture distance to the DMVR and the BDOF in order to increase coding efficiency.

As an embodiment proposed in the present disclosure, the application condition of the BDOF may include conditions presented in Table 12 below.

TABLE 12

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt (currPic, RefPicList0 [refIdxL0]) − DiffPicOrderCnt (currPic, RefPicList1 [ refIdxL1 ] ) is equal to 0 : True bi and bilateral reference picture distances are the same
- MotionModelIdc[ xCb ][ yCb ] is equal to 0.
- merge_subblock_flag[ xCb ][ yCb ] is equal to 0.
- GbiIdx[ xCb ][ yCb ] is equal to 0.
- cIdx is equal to 0.

Referring to Table 12 above, a condition related to the reference picture distance among the application conditions of the BDOF (e.g., DiffPicOrderCnt) is changed to similarly apply the corresponding condition to the DMVR and the BDOF. For example, whether DiffPicOrderCnt(currPic, RefPicList0 [refIdxL0])−DiffPicOrderCnt(currPic, RefPicList1 [refIdxL1]) is 0 is determined to determine whether a distance between the current picture and an L0 reference picture (i.e., a reference picture in the reference picture list L0) and a distance between the current picture and an L1 reference picture (i.e., a reference picture in the reference picture list L1) are the same as each other. In other words, the BDOF may be applied only when the distances between the current picture and the bilateral reference pictures are the same as each other. As such, as a condition in which the true bi-prediction is performed and the bilateral reference picture distances are the same as each other is added, a BDOF application range is limited, thereby saving decoding complexity.

Further, in the embodiment, together with the conditions (e.g., DiffPicOrderCnt) related to the reference picture distance, whether to apply the BDOF may be determined based on the remaining application conditions listed in Table 12 above.

In other words, the decoding apparatus may determine whether all conditions listed in Table 12 above are satisfied and when all conditions are satisfied, the decoding apparatus may perform the true bi-prediction by applying the BDOF. When even any of the conditions listed in Table 12 above is not satisfied, the decoding apparatus may not apply the BDOF. The encoding apparatus may also apply the conditions of Table 12 above and the encoding apparatus may perform the true bi-prediction by a corresponding method in the decoding apparatus.

As an embodiment proposed in the present disclosure, the application condition of the DMVR may include conditions presented in Table 13 below.

TABLE 13

- sps_dmvr_enabled_flag is set to 1.
- merge_flag[ xCb ][ yCb ] is equal to 1.
- mmvd_flag[ xCb ][ yCb ] is equal to 0.
- predFlagL0[0][0]=1 and predFlagL0[1][1]=1.
- DiffPicOrderCnt( currPic, refPicList0[ refIdxL0 ] ) * DiffPicOrderCnt( currPic, refPicList1[ refIdxL1 ] ) is less than 0. : TrueBi
- CbHeight is greater than or equal to 8
- CbHeight*CbWidth is greater than or equal to 64

Referring to Table 13 above, a condition related to the reference picture distance among the application conditions of the DMVR (e.g., DiffPicOrderCnt) is changed to similarly apply the corresponding condition to the DMVR and the BDOF. For example, it is determined whether DiffPicOrderCnt(currPic, refPicList0[refIdxL0])*DiffPicOrderCnt (currPic, refPicList1 [refIdxL1]) is smaller 0 to determine whether a true bi-prediction is performed in which the bilateral reference pictures are located in different directions based on the current picture. In other words, the DMVR may be continuously applied in the case of the true bi-prediction even though the distances between the current picture and the bilateral reference pictures are not the same as each other. As such, as the condition for whether the true bi-prediction is performed is applied, a motion vector derived by considering the decoding complexity may be used without scaling even when the bilateral reference picture distances are different.

Further, in the embodiment, together with the condition (e.g., DiffPicOrderCnt) related to the reference picture distance, whether to apply the DMVR may be determined based on the remaining application conditions listed in Table 13 above.

In other words, the decoding apparatus may determine whether all conditions listed in Table 13 above are satisfied and when all conditions are satisfied, the decoding apparatus may perform the true bi-prediction by applying the DMVR. When even any of the conditions listed in Table 13 above is not satisfied, the decoding apparatus may not apply the DMVR. The encoding apparatus may also apply the conditions of Table 13 above and the encoding apparatus may perform the true bi-prediction by a corresponding method in the decoding apparatus.

The method for performing the true bi-prediction based on the conditions listed in Table 12 or 13 above may be independently applied to the DMVR and the BDOF or may be applied under the same condition for the DMVR and the BDOF.

Meanwhile, in each reference block, a case where motion compensation is performed by a weighted sum by a change in light may occur. In this case, since a phenomenon may be determined by GBi or local illumination compensation (LIC), the application conditions of the DMVR and the BDOF may be determined by considering the GBi or LIC condition.

As an embodiment of the present disclosure, proposed is a method for determining whether to apply the DMVR by considering the GBi and LIC conditions. In this case, the application condition of the DMVR may include conditions presented in Table 14 below.

TABLE 14

- sps_dmvr_enabled_flag is set to 1.
- merge_flag[ xCb ][ yCb ] is equal to 1.
- mmvd_flag[ xCb ][ yCb ] is equal to 0.
- predFlagL0[0][0]=1 and predFlagL0[1][1]=1.
- DiffPicOrderCnt (currPic, RefPicList0 [refIdxL0]) – DiffPicOrderCnt (currPic, RefPicList1 [ refIdxL1 ]) is equal to 0.
- CbHeight is greater than or equal to 8.
- CbHeight*CbWidth is greater than or equal to 64.
- GbiIdx[ xCb ][ yCb ] is equal to 0.
- LICFlag is equal to 0.

Referring to Table 14 above, whether to apply the DMVR may be determined by adding the GBi condition (e.g., GbiIdx) and the LIC condition (e.g., LICFlag). For example, when GbiIdx is 0 (i.e., when GbiIdx is default), it is determined that the condition for whether GBi exists is satisfied and when LICFlag is 0 (i.e., when LIC exists), it may be determined that a condition for whether LIC exists is satisfied.

Further, in the embodiment, together with the GBi condition (e.g., GbiIdx) and the LIC condition (e.g., LICFlag), whether to apply the DMVR may be determined based on the remaining application conditions listed in Table 14 above.

In other words, the decoding apparatus may determine whether all conditions listed in Table 14 above are satisfied and when all conditions are satisfied, the decoding apparatus may perform the true bi-prediction by applying the DMVR. When even any of the conditions listed in Table 14 above is not satisfied, the decoding apparatus may not apply the DMVR. The encoding apparatus may also apply the conditions of Table 14 above and the encoding apparatus may perform the true bi-prediction by a corresponding method in the decoding apparatus.

As an embodiment of the present disclosure, proposed is a method for determining whether to apply the BDOF by considering the GBi and LIC conditions. In this case, the application condition of the BDOF may include conditions presented in Table 15 below.

TABLE 15

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt( currPic, refPicList1[ refIdxL1 ] ) is less than 0.
- MotionModelIdc[ xCb ][ yCb ] is equal to 0.
  merge_subblock_flag[ xCb ][ yCb ] is equal to 0.
- GbiIdx[ xCb ][ yCb ] is equal to 0.
- LICFlag is equal to 0.
- cIdx is equal to 0.

According to Table 15 above, whether to apply the BDOF may be determined by adding an LIC condition (e.g., LICFlag) together with the conventional GBi condition (e.g., GbiIdx). For example, when GbiIdx is 0 (i.e., when GbiIdx is default), it is determined that the condition for whether GBi exists is satisfied and when LICFlag is 0 (i.e., when LIC exists), it may be determined that a condition for whether LIC exists is satisfied.

Accordingly, in the embodiment, together with the GBi condition (e.g., GbiIdx) and the LIC condition (e.g., LICFlag), whether to apply the BDOF may be determined based on the remaining application conditions listed in Table 15 above.

In other words, the decoding apparatus may determine whether all conditions listed in Table 15 above are satisfied and when all conditions are satisfied, the decoding apparatus may perform the true bi-prediction by applying the BDOF. When even any of the conditions listed in Table 15 above is not satisfied, the decoding apparatus may not apply the BDOF. The encoding apparatus may also apply the conditions of Table 15 above and the encoding apparatus may perform the true bi-prediction by a corresponding method in the decoding apparatus.

The method for performing the true bi-prediction based on the conditions listed in Table 14 or 15 above may be independently applied to the DMVR and the BDOF or may be applied under the same condition for the DMVR and the BDOF.

Meanwhile, since the DMVR and the BDOF derive the motion information through the refinement process in the decoding apparatus, a decoding complexity problem occurs. Accordingly, the present disclosure proposes a method that may reduce the decoding complexity by allowing whether to apply the DMVR and the BDOF to be determined by using the merge index. In this case, since both the DMVR and the BDOF perform refinement of the motion vector in a limited range, an effect of refinement may be reduced when the motion vector is inaccurate. Accordingly, the present disclosure proposes a method that may limitatively apply the DMVR and the BDOF only when a value indicating the merge index is small by considering efficiency of the refinement.

Here, the merge index may be a syntax element signaled from the encoding apparatus to the decoding apparatus. For example, the encoding/decoding apparatus may configure the merge candidate list based on the neighboring blocks of the current block when the merge mode/skip mode is applied to the current block. In this case, the encoding apparatus may select an optimal merge candidate among the merge candidates included in the merge candidate list based on rate-distortion (RD) cost and signal merge index information indicating the selected merge candidate to the decoding apparatus. The decoding apparatus may select the merge candidate applied to the current block based on the merge candidate list and the merge index information.

As an embodiment of the present disclosure, a method for determining whether to apply the DMVR by using the merge index may include conditions presented in Table 16 below.

TABLE 16

- sps_dmvr_enabled_flag is set to 1.
- merge_flag[ xCb ][ yCb ] is equal to 1.
- mmvd_flag[ xCb ][ yCb ] is equal to 0.
- merge_idx[ xCb ] [ yCb ] < 2.
- predFlagL0[0][0]=1 and predFlagL0[1][1]=1.
- DiffPicOrderCnt (currPic, RefPicList0 [refIdxL0]) – DiffPicOrderCnt (currPic, RefPicList1 [ refIdxL1 ]) is equal to 0.
- CbHeight is greater than or equal to 8.
- CbHeight*CbWidth is greater than or equal to 64.

Referring to Table 16 above, whether to apply the DMVR may be determined by adding a merge index condition (e.g., merge_idx). For example, when the merge index (e.g., merge_idx) is smaller than 2, it may be determined that the merge index condition is satisfied. Here, a value (threshold) of the merge index may be set to 2, but this is just one example and the corresponding value may be changed according to the coding efficiency.

Accordingly, in the embodiment, together with the merge index condition (e.g., merge_idx), whether to apply the DMVR may be determined based on the remaining application conditions listed in Table 16 above.

In other words, the decoding apparatus may determine whether all conditions listed in Table 16 above are satisfied and when all conditions are satisfied, the decoding apparatus may perform the true bi-prediction by applying the DMVR. When even any of the conditions listed in Table 16 above is not satisfied, the decoding apparatus may not apply the DMVR. The encoding apparatus may also apply the conditions of Table 16 above and the encoding apparatus may perform the true bi-prediction by a corresponding method in the decoding apparatus.

As an embodiment of the present disclosure, a method for determining whether to apply the BDOF by using the merge index may include conditions presented in Table 17 below.

TABLE 17

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt( currPic, refPicList1[ refIdxL1 ]) is less than 0.
- MotionModelIdc[ xCb ][ yCb ] is equal to 0.
- merge_subblock_flag[ xCb ][ yCb ] is equal to 0.
- GbiIdx[ xCb ][ yCb ] is equal to 0.
- !(merge_flag[ xCb ][ yCb ] is equal to 1 && merge_idx[ xCb ][ yCb ] >= 2)
- cIdx is equal to 0.

Referring to Table 17 above, whether to apply the BDOF may be determined by adding the condition for whether the merge mode/skip mode is applied (e.g., merge_flag) and the merge index condition (e.g., merge_idx). For example, when merge_flag is not 1 (i.e., when the inter prediction is performed by using the merge mode/skip mode) and merge_idx is not equal to or larger than 2, only if the value of the merge index is small, it may be determined that the condition for limitatively applying the BDOF is satisfied. In other words, when merge_flag is 1 (i.e., when the inter prediction is performed by using the merge mode/skip mode) and merge_idx is smaller than 2, only if the value of the merge index is small, it may be determined that the merge index condition is satisfied and the BDOF may be applied. Here, the value (threshold) of the merge index may be set to 2, but this is just one example and the corresponding value may be changed according to the coding efficiency.

In other words, in the embodiment, together with the condition for whether the merge mode/skip mode is applied (e.g., merge_flag) and the merge index condition (e.g., merge_idx), whether to apply the BDOF may be determined based on the remaining application conditions listed in Table 17 above.

In other words, the decoding apparatus may determine whether all conditions listed in Table 17 above are satisfied and when all conditions are satisfied, the decoding apparatus may perform the true bi-prediction by applying the BDOF. When even any of the conditions listed in Table 17 above is not satisfied, the decoding apparatus may not apply the BDOF. The encoding apparatus may also apply the conditions of Table 17 above and the encoding apparatus may perform the true bi-prediction by a corresponding method in the decoding apparatus.

The method for performing the true bi-prediction based on the conditions listed in Table 16 or 17 above may be independently applied to the DMVR and the BDOF or may be applied under the same condition for the DMVR and the BDOF.

Meanwhile, in the merge/skip mode, the motion information may be refined through the MMVD and in this case, since the decoding complexity increases, the DMVR is not performed when the MMVD is applied. However, when the DMVR is applied without considering the MMVD, the DMVR may be applied without the MMVD condition by considering performance enhancement. In this case, according to an embodiment of the present disclosure, the application condition of the DMVR may include conditions presented in Table 18 below.

TABLE 18

- sps_dmvr_enabled_flag is set to 1.
- merge_flag[ xCb ][ yCb ] is equal to 1.
- predFlagL0[0][0]=1 and predFlagL0[1][1]=1.
- DiffPicOrderCnt (currPic, RefPicList0 [refIdxL0]) − DiffPicOrderCnt (currPic, RefPicList1 [ refIdxL1 ]) is equal to 0.
- CbHeight is greater than or equal to 8.
- CbHeight*CbWidth is greater than or equal to 64.

Referring to Table 18 above, a condition (e.g., mmvd_flag) for whether to apply the MMVD mode among the application conditions of the conventional DMVR may be excluded. In other words, a process of determining whether mmvd_flag is 0 (i.e., whether the MMVD mode is not used) may be omitted and whether to apply the DMVR may be determined based on the conditions listed in Table 17 above.

In other words, the decoding apparatus may determine whether all conditions listed in Table 18 above are satisfied (excluding the condition (e.g., mmvd_flag) for whether to apply the MMVD mode) and when all conditions are satisfied, the decoding apparatus may perform the true bi-prediction by applying the DMVR. When even any of the conditions listed in Table 18 above is not satisfied, the decoding apparatus may not apply the DMVR. The encoding apparatus may also apply the conditions of Table 18 above and the encoding apparatus may perform the true bi-prediction by a corresponding method in the decoding apparatus.

Further, contrary to the embodiment of Table 18 described above, when the motion information is refined through the MMVD in the merge/skip mode, whether to perform the BDOF may be determined by considering the decoding complexity. Accordingly, the present disclosure proposes a method for determining whether to apply the BDOF by considering the MMVD condition. In this case, according to an embodiment of the present disclosure, the application condition of the BDOF may include conditions presented in Table 19 below.

TABLE 19

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt( currPic, refPicList1[ refIdxL1 ] ) is less than 0.
- MotionModelIdc[ xCb ][ yCb ] is equal to 0.
- merge_subblock_flag[ xCb ] [ yCb ] is equal to 0.
- GbiIdx[ xCb ] [ yCb ] is equal to 0.
- mmvd_flag[ xCb ] [ yCb ] is equal to 0
- cIdx is equal to 0.

Referring to Table 19 above, the BDOF may not be applied when the motion information is refined through the MMVD by adding the condition (e.g., mmvd_flag) for whether to apply the MMVD mode. For example, when mmvd_flag is 0 (i.e., when the MMVD mode is not used), it may be determined that the condition for whether to apply the MMVD mode is satisfied.

Accordingly, in the embodiment, together with the condition (e.g., mmvd_flag) for whether to apply the MMVD mode, whether to apply the BDOF may be determined based on the remaining application conditions listed in Table 19 above.

In other words, the decoding apparatus may determine whether all conditions listed in Table 19 above are satisfied and when all conditions are satisfied, the decoding apparatus may perform the true bi-prediction by applying the BDOF. When even any of the conditions listed in Table 19 above is not satisfied, the decoding apparatus may not apply the BDOF. The encoding apparatus may also apply the conditions of Table 19 above and the encoding apparatus may perform the true bi-prediction by a corresponding method in the decoding apparatus.

The method for performing the true bi-prediction based on the conditions listed in Table 18 or 19 above may be independently applied to the DMVR and the BDOF or may be applied under the same condition for the DMVR and the BDOF.

Meanwhile, in the case of the AMVP, an Adaptive Motion Vector Resolution (AMVR) technique may be applied. In this case, when a resolution of the motion vector is high, i.e., when an integer-pel rounding or 4 integer-pel rounding is provided, it may not be appropriate to apply the technique in the case of the BDOF of performing the refinement in the limited area. Accordingly, the present disclosure proposes a method that may determine performing the BDOF according to the AMVR condition. In this case, according to an embodiment of the present disclosure, the application condition of the BDOF may include conditions presented in Table 20 below.

TABLE 20

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt( currPic, refPicList1[ refIdxL1 ] ) is less than 0.
- MotionModelIdc[ xCb ][ yCb ] is equal to 0.
- merge_subblock_flag[ xCb ][ yCb ] is equal to 0.
- amvr_flag != 0

TABLE 20-continued

- GbiIdx[ xCb ][ yCb ] is equal to 0.
- cIdx is equal to 0.

Referring to Table 20 above, whether to apply the BDOF may be determined by adding the AMVR condition (e.g., amvr_flag). Here, amvr_flag may be information representing the solution of a motion vector difference (MVD). For example, in a case where amvr_flag is 0, the case may indicate that the resolution of the MVD is derived in units of ¼ sample (quarter-luma-sample) and in a case where amvr_flag is not 0, the case may indicate that the resolution of the MVD is derived in units of integer-luma-sample or four-luma-sample. Alternatively, a reverse case thereto may be determined. According to an embodiment, as presented in Table 20 above, in the case where amvr_flag is not 0, the condition that the BDOF is applied may be set. In other words, in the case where amvr_flag is 0, the BDOF may be limited not to be applied.

Accordingly, in the embodiment, together with the AMVR condition (e.g., amvr_flag), whether to apply the BDOF may be determined based on the remaining application conditions listed in Table 20 above.

In other words, the decoding apparatus may determine whether all conditions listed in Table 20 above are satisfied and when all conditions are satisfied, the decoding apparatus may perform the true bi-prediction by applying the BDOF. When even any of the conditions listed in Table 20 above is not satisfied, the decoding apparatus may not apply the BDOF. The encoding apparatus may also apply the conditions of Table 20 above and the encoding apparatus may perform the true bi-prediction by a corresponding method in the decoding apparatus.

Meanwhile, the DMVR and the BDOF may be each signaled in a sequence parameter set (SPS) syntax. Table 21 below shows one example of a syntax element indicating whether the DMVR signaled through the SPS syntax is enabled and whether the BDOF is enabled.

TABLE 21

| seq_parameter_set_rbsp( ) { | Descriptor |
|---|---|
| ...... | ...... |
| sps_dmvr_enabled_flag | u(1) |
| sps_bdof_enabled_flag | u(1) |
| ...... | ...... |
| } | |

Referring to Table 21 above, sps_dmvr_enabled_flag may be signaled in the SPS syntax and whether true bi-prediction based DMVR is enabled may be represented based on the syntax element. For example, in a case where sps_dmvr_enabled_flag is 1, the case may indicate that the true bi-prediction based DMVR is enabled and in a case where sps_dmvr_enabled_flag is 0, the case may indicate that the true bi-prediction based DMVR is not enabled.

Further, sps_bdof_enabled_flag may be signaled in the SPS syntax and whether true bi-prediction based BDOF is enabled may be represented based on the syntax element. For example, in a case where sps_bdof_enabled_flag is 1, the case may indicate that the true bi-prediction based BDOF is enabled and in a case where sps_bdof_enabled_flag is 0, the case may indicate that the true bi-prediction based BDOF is not enabled.

As shown in Table 21, the application conditions of the DMVR and the BDOF may be checked by using a syntax element (e.g., sps_dmvr_enabled_flag) representing whether the DMVR is enabled and a syntax element (e.g., sps_bdof_enabled_flag) representing whether the BDOF is enabled.

Figure 10:
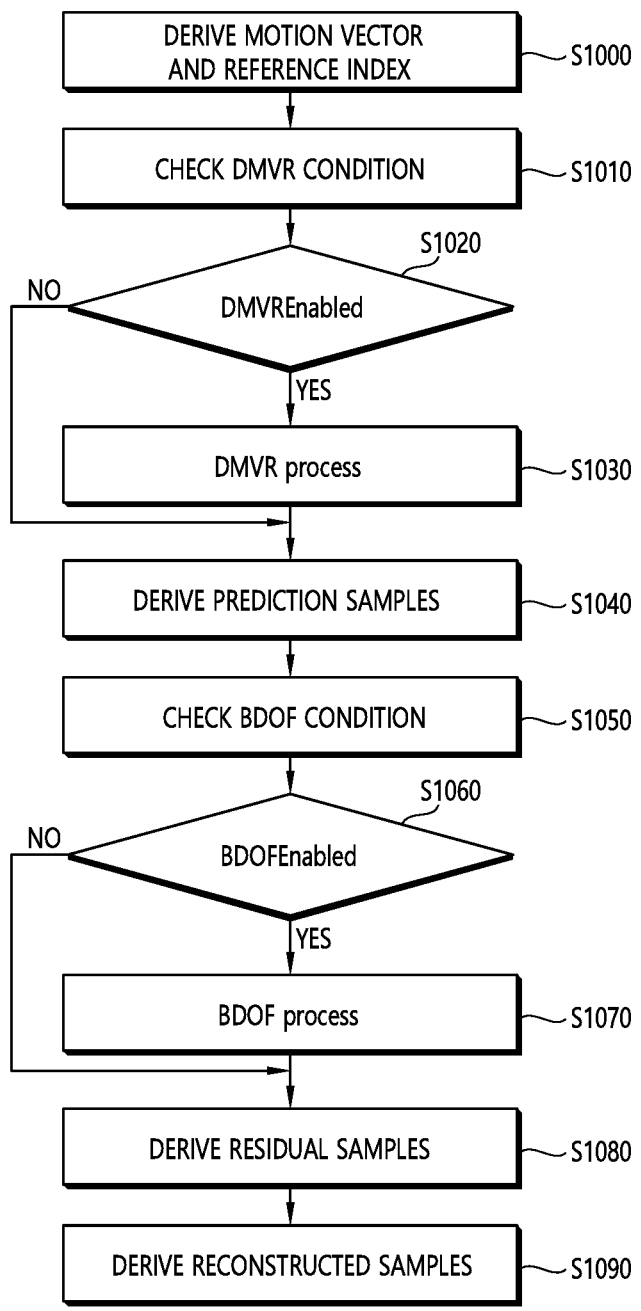
FIG. 10 illustrates one example illustrating a method for performing a decoding process by checking application conditions of a DMVR and a BDOF.

FIG. 10 illustrates one example illustrating a method for performing a decoding process by checking application conditions of a DMVR and a BDOF.

As shown in Table 21, the method of FIG. 10 may be applied when using a syntax element (e.g., sps_dmvr_enabled_flag) representing whether the DMVR is enabled and a syntax element (e.g., sps_bdof_enabled_flag) representing whether the BDOF is enabled.

Referring to FIG. 10, the decoding apparatus may derive motion information (e.g., a motion vector, a reference picture index, etc.) for a current block (S1000).

The decoding apparatus may check an application of the DMVR (S1010). In this case, the application condition of the DMVR may be checked based on the syntax element (e.g., sps_dmvr_enabled_flag) representing whether the DMVR is enabled. For example, when the DMVR is enabled (e.g., when sps_dmvr_enabled_flag is 1), the application condition of the DMVR may be checked.

The decoding apparatus may determine whether to apply a DMVR process according to whether the application condition of the DMVR is satisfied (S1020).

When all application conditions of the DMVR are satisfied, the decoding apparatus may derive refined motion information by applying the DMVR process (S1030). When at least one of the application conditions of the DMVR is not satisfied, the decoding apparatus may not apply the DMVR process.

The decoding apparatus may derive prediction samples of the current block based on motion information derived (not refined) when refined motion information or DMVR derived when applying the DMVR is not applied (S1040).

In addition, the decoding apparatus may check an application condition of the BDOF (S1050). In this case, the application condition of the BDOF DMVR may be checked based on the syntax element (e.g., sps_bdof_enabled_flag) representing whether the BDOF is enabled. For example, when the DMVR is enabled (e.g., when sps_bdof_enabled_flag is 1), the application condition of the DMVR may be checked.

When all application conditions of the BDOF are satisfied, the decoding apparatus may refine prediction samples by applying the BDOF process (S1070). When at least one of the application conditions of the BDOF is not satisfied, the decoding apparatus may not apply the BDOF process.

The decoding apparatus may derive the residual samples for the current block (S1080) and derive reconstructed samples based on the refined prediction samples derived when applying the residual samples and the BDOF or prediction samples (not refined) derived when not applying the BDOF (S1090).

The present disclosure proposes various embodiments that may enhance coding efficiency and reduce complexity by harmonizing mutual application conditions of the DMVR and the BDOF at the time of applying the DMVR and the BDOF as described above. In checking the application conditions of the DMVR and the BDOF according to the embodiments of the present disclosure and applying the application conditions to a decoding process, respective conditions may be separately checked and applied, but the application conditions may be checked at once in order to enhance the coding efficiency. In other words, the present disclosure proposes a method that may integrate and check the application conditions of the DMVR and the BDOF at once.

As an embodiment of the present disclosure, information (e.g.,) indicating whether to apply the refinement in the decoding apparatus in the sequence parameter set (SPS) syntax is signaled to perform a process of checking the application condition of the DMVR/BDOF. Next, Table 22 shows one example of a syntax element (e.g., sps_refinement_enabled_flag) representing whether to apply the refinement in the decoding apparatus signaled through the SPS syntax.

TABLE 22

| seq_parameter_set_rbsp( ) { | Descriptor |
|---|---|
| ...... | ...... |
| sps_refinement_enabled_flag | u(1) |
| if(sps_refinement_enabled_flag) { | |
| sps_dmvr_enabled_flag | u(1) |
| sps_bdof_enabled_flag | u(1) |
| } | |
| ...... | ...... |
| } | |

Referring to Table 22 above, sps_refinement_enabled_flag may be signaled in the SPS syntax and may represent whether the refinement is applicable in the decoding apparatus based on the syntax element. For example, when sps_refinement_enabled_flag exists (i.e., when sps_refinement_enabled_flag is true), it may be determined that the refinement is applicable in the decoding apparatus. In this case, the decoding apparatus obtains the sps_dmvr_enabled_flag syntax element representing whether the DMVR is enabled and the sps_bdof_enabled_flag syntax element representing whether the BDOF is enabled to determine the application conditions of the DMVR and the BDOF.

Figure 11:
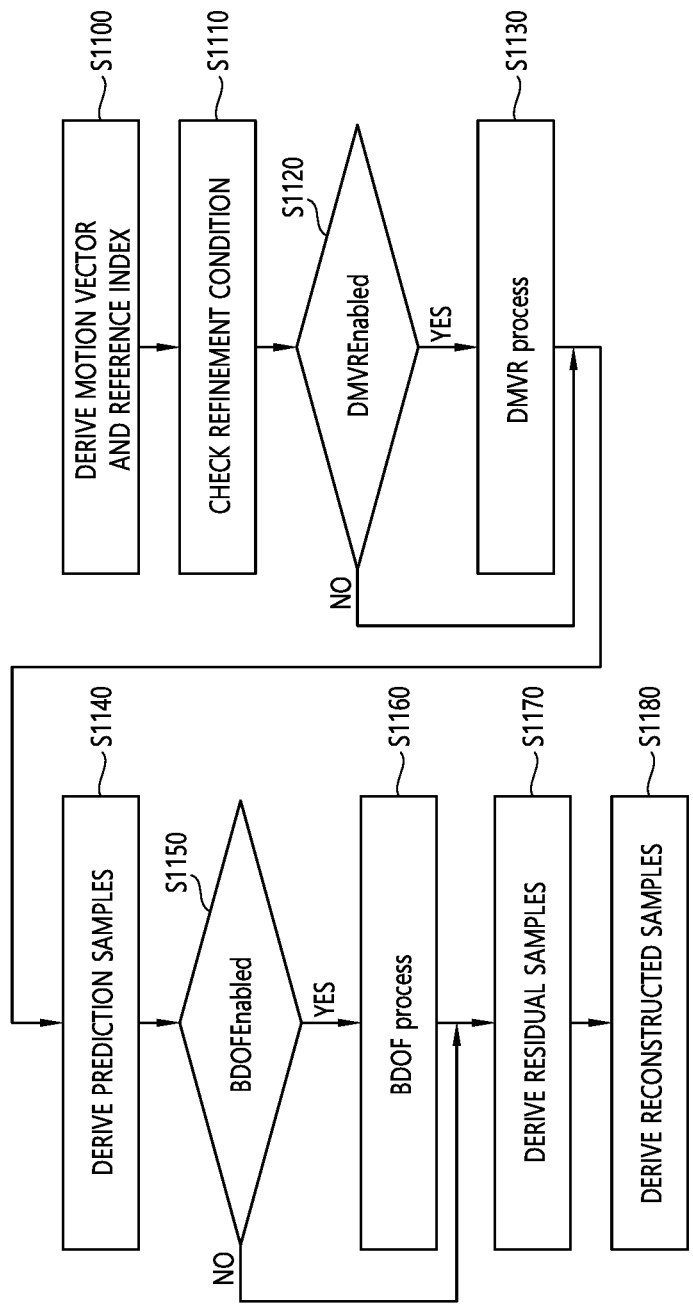
FIGS. 11 and 12 illustrate another example illustrating a method for performing a decoding process by checking application conditions of a DMVR and a BDOF.
Figure 12:
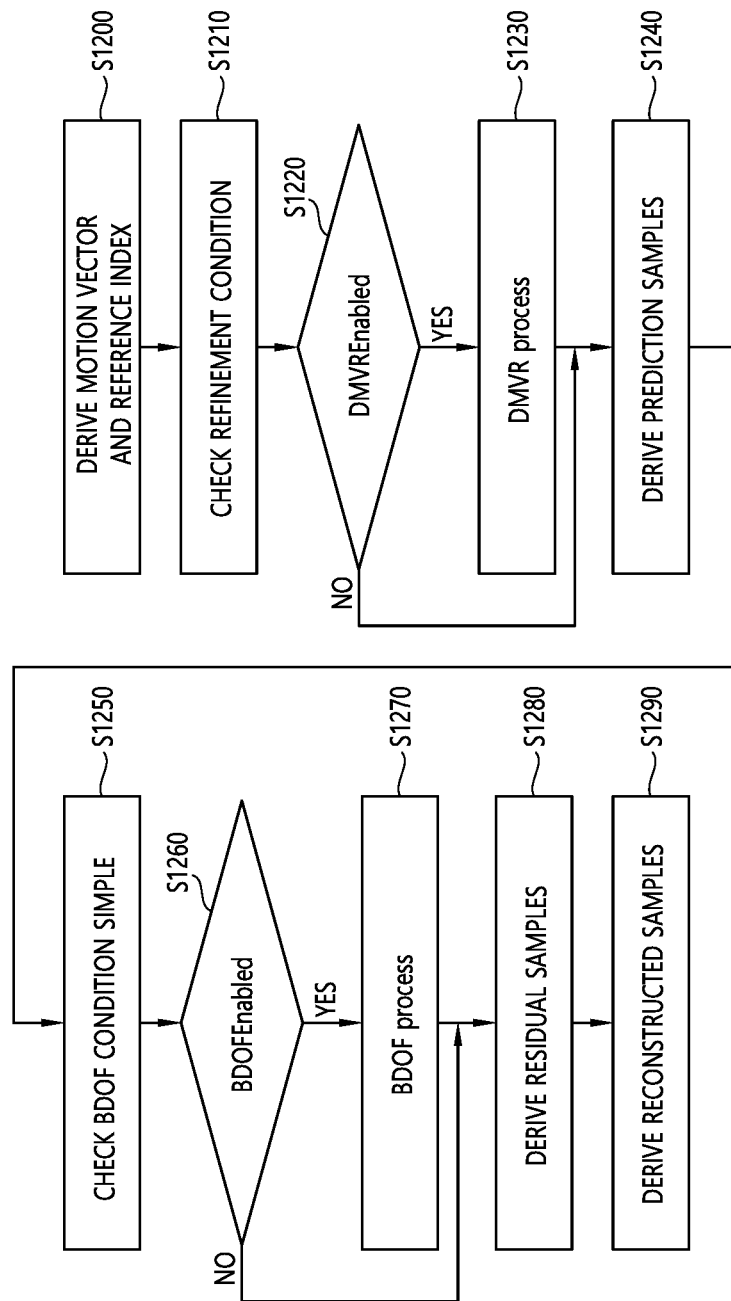

FIGS. 11 and 12 illustrate another example illustrating a method for performing a decoding process by checking application conditions of a DMVR and a BDOF.

The method of FIG. 11 and the method of FIG. 12 may be applied when the syntax element (e.g., sps_refinement_enabled_flag) representing whether the refinement is applicable in the decoding apparatus is used as shown in Table 22 above. Further, description of duplicated contents of FIGS. 11 and 12 with FIG. 10 described above will be omitted.

Referring to FIG. 11, it can be seen that the application conditions are checked at once in the previous stage without checking the respective application conditions of the DMVR and the BDOF by comparing with the process of FIG. 10 above. As an embodiment, in step S1110 of FIG. 11, the decoding apparatus may check a refinement application condition. In this case, the refinement application condition may be checked based on sps_refinement_enabled_flag shown in Table 22 above. For example, the decoding apparatus may obtain the sps_dmvr_enabled_flag syntax element representing whether the DMVR is enabled and the sps_bdof_enabled_flag syntax element representing whether the BDOF is enabled when sps_refinement_enabled_flag is 1 and check the application conditions of the DMVR and the BDOF based on the obtained syntax elements.

Further, referring to FIG. 12, the application conditions are checked at once in the previous stage without checking the respective application conditions of the DMVR and the BDOF by comparing with the process of FIG. 10 above and a simple checking process (the application condition of the BDOF) may be performed with respect to a different condition. As an embodiment, in step S1210 of FIG. 12, the decoding apparatus may check the refinement application condition. Thereafter, in step S1250 of FIG. 12, the decoding apparatus may additionally simply check the application condition of the BDOF having a condition different from the refinement application condition.

Meanwhile, when the height or the size (Height*Width) of the current block is smaller than a specific length or a specific size, a calculation ratio of multiplication/addition for motion compensation increases. Accordingly, in an embodiment of the present disclosure, the application of the BDOF to a block having a small height or a small size may be limited as in the application condition of the DMVR in order to reduce a worst case. In this case, the application condition of the BDOF may include conditions presented in Table 23 below.

TABLE 23

- sps_bdof_enabled_flag is equal to 1.
- predFlagL0[ xSbIdx ][ ySbIdx ] and predFlagL1[ xSbIdx ][ ySbIdx ] are both equal to 1.
- DiffPicOrderCnt( currPic, refPicList0[ refIdxL0 ] ) * DiffPicOrderCnt( currPic, refPicList1[ refIdxL1 ]) is less than 0.
- MotionModelIdc[ xCb ][ yCb ] is equal to 0.
- merge_subblock_flag[ xCb ] [ yCb ] is equal to 0.
- GbiIdx[ xCb ] [ yCb ] is equal to 0.
- CbHeight is greater than or equal to 8. : When the height (or size) of the block is larger than a threshold (here, the example of the threshold may be diversified)
- CbHeight*CbWidth is greater than or equal to 64. : When the size of the block is larger than the threshold (here, the example of the threshold may be diversified)
- cIdx is equal to 0.

Referring to Table 23 above, the BDOF may not be applied to a block which is smaller than a specific size by adding the conditions (e.g., CbHeight and CbWidth) related to the size of the current block. For example, a condition applied when the height of the current block (e.g., CbHeight) is equal to or larger than 8 and a condition applied when the size of the current block (e.g., CbHeight*CbWidth) is equal to or larger than 64 may be used. When the application conditions related to the size of the current block are satisfied (i.e., when the height of the current block is equal to or larger than 8 and the height*width of the current block is equal to or larger than 64), the BDOF may be applied and when the application conditions related to the size of the current block are not satisfied, the BDOF may not be applied.

Further, in the embodiment, together with the conditions (e.g., CbHeight and CbHeight*CbWidth) related to the size of the current block, whether to apply the BDOF may be determined based on the remaining application conditions listed in Table 23 above.

In other words, the decoding apparatus may determine whether all conditions listed in Table 23 above are satisfied and when all conditions are satisfied, the decoding apparatus may perform the true bi-prediction by applying the BDOF. When even any of the conditions listed in Table 23 above is not satisfied, the decoding apparatus may not apply the BDOF. The encoding apparatus may also apply the conditions of Table 23 above and the encoding apparatus may perform the true bi-prediction by a corresponding method in the decoding apparatus.

Meanwhile, when the MMVD is applied to the current block, the motion information may be derived based on information (e.g., mmvd_index) on the MMVD. Here, the information on the MMVD may include an index of a base MV, a distance index, a direction index, and the like. In particular, the distance index (more specifically, mmvd_distance_index[xCb][yCb]) may be used for representing a distance from the base MV and for example, distance indexes 0 to 7 may be represented as {¼, ½, 1, 2, 4, 8, 16, 32}, respectively. In determining refinement of the motion information in the DMVR and the BDOF, whether the refinement is performed by considering an adjacent pixel (adjacent sample) and in this case, when a distance between the adjacent pixel and the base MV is far, the value of the distance index also increases. In such a case, it is difficult that considering the adjacent pixel helps performance enhancement of the DMVR and the BDOF. Accordingly, the present disclosure proposes a method that may determine whether to apply the DMVR and the BDOF according to the distance index (more specifically, mmvd_distance_index [xCb][yCb]) value.

As an embodiment of the present disclosure, whether to apply the DMVR may be determined by considering the distance index and in this case, the application condition of the DMVR may include conditions presented in Table 24 below.

TABLE 24

- sps_dmvr_enabled_flag is set to 1.
- merge_flag[ xCb ][ yCb ] is equal to 1.
- mmvd_flag[ xCb ][ yCb ] is equal to 1 and
- mmvd_distance_index[ xCb ][ yCb ] > 4.
- predFlagL0[0][0]=1 and predFlagL0[1][1]=1.
- DiffPicOrderCnt (currPic, RefPicList0 [refIdxL0]) − DiffPicOrderCnt (currPic, RefPicList1 [ refIdxL1 ]) is equal to 0.
- CbHeight is greater than or equal to 8.
- CbHeight*CbWidth is greater than or equal to 64.

Referring to Table 24 above, a condition (e.g., mmvd_flag) related to the MMVD among the application conditions of the DMVR is changed to limitatively apply the DMVR in the MMVD mode. For example, when mmvd_flag is 1 and mmvd_distance_index is larger than 4, it may be determined that a distance index condition of the MMVD is satisfied. Accordingly, when the MMVD mode is applied, whether to apply the DMVR may be determined according to the distance index (more specifically, mmvd_distance_index[xCb][yCb]) value.

Here, the value (threshold) of mmvd_distance_index may be set to 4, but this is just one example and the corresponding value may be changed to various values according to the performance and the coding efficiency.

Accordingly, in the embodiment, together with the condition (e.g., mmvd_flag) for whether to apply the MMVD and the distance index condition (e.g., mmvd_distance_index) of the MMVD, whether to apply the DMVR may be determined based on the remaining application conditions listed in Table 24 above.

In other words, the decoding apparatus may determine whether all conditions listed in Table 24 above are satisfied and when all conditions are satisfied, the decoding apparatus may perform the true bi-prediction by applying the DMVR. When even any of the conditions listed in Table 24 above is not satisfied, the decoding apparatus may not apply the DMVR. The encoding apparatus may also apply the conditions of Table 24 above and the encoding apparatus may perform the true bi-prediction by a corresponding method in the decoding apparatus.

Further, as an embodiment of the present disclosure, whether to apply the BDOF may be determined by considering the distance index and in this case, the application condition of the BDOF may include conditions presented in Table 25 below.

TABLE 25

- sps_bdof_enabled_flag is equal to 1.
- predFlagL0[ xSbIdx ] [ ySbIdx ] and predFlagL1 [ xSbIdx ] [ ySbIdx ] are both equal to 1.
- DiffPicOrderCnt( currPic, refPicList0[ refIdxL0 ] ) * DiffPicOrderCnt( currPic, refPicList1[ refIdxL1 ] ) is less than 0.
- MotionModelIdc[ xCb ] [ yCb ] is equal to 0.
- merge_subblock_flag[ xCb ] [ yCb ] is equal to 0.
- !merge flag || (merge_flag && mmvd_flag[ xCb ] [ yCb ] is equal to 1 and mmvd_distance_index[ xCb ][ yCb ] > 4)
- GbiIdx[ xCb ] [ yCb ] is equal to 0.
- cIdx is equal to 0.

Referring to Table 25 above, the BDOF may be limitatively applied in the MMVD mode by adding the condition for whether the merge mode/skip mode is applied (e.g., merge_flag) and conditions (e.g., mmvd_flag and mmvd_distance_index) related to the MMVD. For example, when merge_flag does not exist (i.e., when merge_flag is not 1) or when merge_flag is 1, mmvd_flag is 1, and mmvd_distance_index is larger than 4, it may be determined that the condition of limitatively applying the BDOF in the MMVD mode is satisfied. Accordingly, when the MMVD mode is applied, whether to apply the BDOF may be determined according to the distance index (e.g., mmvd_distance_index[xCb][yCb]) value.

Here, the value (threshold) of mmvd_distance_index may be set to 4, but this is just one example and the corresponding value may be changed to various values according to the performance and the coding efficiency.

Accordingly, in the embodiment, together with the condition for whether the merge mode/skip mode is applied (e.g., merge_flag) and the condition related to the MMVD (e.g., mmvd_flag, mmvd_distance_index), whether to apply the BDOF may be determined based on the remaining application conditions listed in Table 25 above.

In other words, the decoding apparatus may determine whether all conditions listed in Table 25 above are satisfied and when all conditions are satisfied, the decoding apparatus may perform the true bi-prediction by applying the BDOF. When even any of the conditions listed in Table 25 above is not satisfied, the decoding apparatus may not apply the BDOF. The encoding apparatus may also apply the conditions of Table 25 above and the encoding apparatus may perform the true bi-prediction by a corresponding method in the decoding apparatus.

The method for performing the true bi-prediction based on the conditions listed in Table 24 or 25 above may be independently applied to the DMVR and the BDOF or may be applied under the same condition for the DMVR and the BDOF.

Meanwhile, a combined intra-inter prediction (CIIP) mode of simultaneously performing the intra prediction and the inter prediction may be applied to the current block as described above. In this case, a prediction block (inter block) in which the inter prediction is performed is combined with an intra prediction method to finally generate prediction sample values, thereby enhancing prediction accuracy. However, since the DMVR and the BDOF are techniques of refining the inter block, application of the CIIP mode may not be required in terms of the performance compared with the complexity. Accordingly, the present disclosure proposes a method that may determine whether to apply the DMVR and the BDOF by considering the CIIP.

As an embodiment of the present disclosure, whether to apply the DMVR may be determined by considering the CIIP and in this case, the application condition of the DMVR may include conditions presented in Table 26 below.

TABLE 26 sps_dmvr_enabled_flag is set to 1.
merge_flag[ xCb ][ yCb ] is equal to 1.
mmvd_flag[ xCb ][ yCb ] is equal to 0.
predFlagL0[0][0]=1 and predFlagL0[1][1]=1.
DiffPicOrderCnt (currPic, RefPicList0 [refIdxL0]) − DiffPicOrderCnt (currPic, RefPicList1 [ refIdxL1 ]) is equal to 0.
CbHeight is greater than or equal to 8.
CbHeight*CbWidth is greater than or equal to 64.
ciip_flag is equal to 0.: In other words, when the CIIP is not applied, the DMVR maybe applied.

Referring to Table 26 above, the DMVR may be limitatively applied according to whether to apply the CIP by adding a condition for whether to apply the CIIP mode (e.g., ciip_flag). For example, when ciip_flag is 0 (i.e., when the CIIP mode is not applied), the DMVR may be applied by determining that the condition for whether to apply the CIIP mode is satisfied.

Accordingly, in the embodiment, together with the condition (e.g., ciip_flag) for whether to apply the CIIP mode, whether to apply the DMVR may be determined based on the remaining application conditions listed in Table 26 above.

In other words, the decoding apparatus may determine whether all conditions listed in Table 26 above are satisfied and when all conditions are satisfied, the decoding apparatus may perform the true bi-prediction by applying the DMVR. When even any of the conditions listed in Table 26 above is not satisfied, the decoding apparatus may not apply the DMVR. The encoding apparatus may also apply the conditions of Table 26 above and the encoding apparatus may perform the true bi-prediction by a corresponding method in the decoding apparatus.

Further, as an embodiment of the present disclosure, whether to apply the BDOF may be determined by considering the CIIP and in this case, the application condition of the BDOF may include conditions presented in Table 27 below.

TABLE 27 sps_bdof_enabled_flag is equal to 1.
predFlagL0[ xSbIdx ] [ ySbIdx ] and predFlagL1[ xSbIdx ] [ ySbIdx ] are both equal to 1.
DiffPicOrderCnt( currPic, refPicList0[ refIdxL0 ] ) * DiffPicOrderCnt( currPic, refPicList1[ refIdxL1 ] ) is less than 0.
MotionModelIdc[ xCb ][ yCb ] is equal to 0.
merge_subblock_flag[ xCb ] [ yCb ] is equal to 0.
GbiIdx[ xCb ] [ yCb ] is equal to 0.
ciip_flag is equal to 0. : In other words, when the CIIP is not applied, the BDOF may be applied.
cIdx is equal to 0.

Referring to Table 27 above, the BDOF may be limitatively applied according to whether to apply the CIIP by adding the condition for whether to apply the CIIP mode (e.g., ciip_flag). For example, when ciip_flag is 0 (i.e., when the CIIP mode is not applied), the BDOF may be applied by determining that the condition for whether to apply the CIIP mode is satisfied.

Accordingly, in the embodiment, together with the condition (e.g., ciip_flag) for whether to apply the CIIP mode, whether to apply the BDOF may be determined based on the remaining application conditions listed in Table 27 above.

In other words, the decoding apparatus may determine whether all conditions listed in Table 27 above are satisfied and when all conditions are satisfied, the decoding apparatus may perform the true bi-prediction by applying the BDOF. When even any of the conditions listed in Table 27 above is not satisfied, the decoding apparatus may not apply the BDOF. The encoding apparatus may also apply the conditions of Table 27 above and the encoding apparatus may perform the true bi-prediction by a corresponding method in the decoding apparatus.

The method for performing the true bi-prediction based on the conditions listed in Table 26 or 27 above may be independently applied to the DMVR and the BDOF or may be applied under the same condition for the DMVR and the BDOF.

The methods listed in Tables 6 to 27 according to the embodiment of the present disclosure described above may be applied in combination. In other words, whether to apply the DMVR and the BDOF may be determined by checking the refinement application condition and conditions shown in Table 28 below may be applied.

TABLE 28

| | |
|---|---|
| DMVR | - sps_dmvr_enabled_flag is set to 1.<br>- merge_flag[ xCb ][ yCb ] is equal to 1.<br>- mmvd_flag[ xCb ] [ yCb ] is equal to 0.<br>- predFlagL0[0][0]=1 and predFlagL0[1][1]=1.<br>- DiffPicOrderCnt (currPic, RefPicList0 [refIdxL0]) − DiffPicOrderCnt (currPic, RefPicList1 [ refIdxL1 ] ) is equal to 0.<br>- CbHeight is greater than or equal to 8.<br>- CbHeight*CbWidth is greater than or equal to 64. |
| BDOF | - sps_bdof_enabled_flag is equal to 1.<br>- predFlagL0[ xSbIdx ][ ySbIdx ] and predFlagL1[ xSbIdx ][ ySbIdx ] are both equal to 1.<br>- DiffPicOrderCnt( currPic, refPicList0[ refIdxL0 ] ) * DiffPicOrderCnt( currPic, refPicList1[ refIdxL1 ] ) is less than 0.<br>- MotionModelIdc[ xCb ][ yCb ] is equal to 0.<br>- merge_subblock_flag[ xCb ] [ yCb ] is equal to 0.<br>- GbiIdx[ xCb ] [ yCb ] is equal to 0.<br>- cIdx is equal to 0. |
| DMVR + BDOF | - predFlagL0[0][0]=1 and predFlagL0[1][1]=1.<br>- DiffPicOrderCnt (currPic, RefPicList0 [refIdxL0]) − DiffPicOrderCnt (currPic, RefPicList1 [ refIdxL1 ] ) is equal to 0.<br>- mmvd_flag[ xCb ] [ yCb ] is equal to 0.<br>- MotionModelIdc[ xCb ][ yCb ] is equal to 0.<br>- merge_subblock_flag[ xCb ] [ yCb ] is equal to 0.<br>- GbiIdx[ xCb ] [ yCb ] is equal to 0. |

Referring to Table 28 above, a condition in the bilateral prediction when the DMVR or BDOF is applied, a condition applied in the case of the true bi-prediction in which the distances between the current picture and the bilateral reference pictures are the same as each other, a condition applied when the MMVD mode is not used, a condition applied when the affine prediction is not performed, a condition applied when the subblock based merge mode is applied, and a condition applied when the GBi index is default may be used. In other words, whether to apply the DMVR or BDOF may be determined according to whether the conditions are satisfied.

Further, a condition for determining whether the merge mode is applied for the DMVR or determining whether the current block is the luma block for the BDOF may be added.

The application conditions listed in Table 28 above are examples and it is apparent that various conditions listed in the aforementioned embodiments (the embodiments in Tables 6 to 27 above) may be used in combination.

Meanwhile, in the DMVR, an SAD function is adopted as a cost function instead of a mean-removed SAD (MRSAD) function by considering the decoding complexity. However when the GBi index is not default (e.g., when GbiIdx is not 0), two reference blocks may have different weighting factors, and as a result, DMVR using the SAD may not be preferable. Accordingly, the condition of the DMVR may be fixed by considering the GBi index. According to an experimental result, a 0.00% RD-rate change is shown with 100% encoding and decoding run-time by comparing with VVC Test Model (VIM) 4.0.

In the case of versatile video coding (VVC), the DMVR process may be performed when all conditions listed in Table 29 below are satisfied.

TABLE 29 sps_dmvr_enabled_flag is equal to 1
merge_flag[ xCb ][ yCb ] is equal to 1
both predFlagL0[ 0 ][ 0 ] and predFlagL1[ 0 ][ 0 ] are equal to 1
mmvd_flag[ xCb ][ yCb ] is equal to 0
DiffPicOrderCnt( currPic, RefPicList[ 0 ][ refIdx0 ]) is equal to DiffPicOrderCnt( RefPicList[ 1 ][ refIdxL1 ], currPic )
cbHeight is greater than or equal to 8
cbHeight*cbWidth is greater than or equal to 64

In current DMVR, a block which is not matched may be searched by comparing with SAD of reference blocks to be weighted and averaged later. In the present disclosure, since two reference blocks may have different weights, the condition of the DMVR may be determined by considering such a case. According to an embodiment of the present disclosure, the DMVR may not be performed for the block in which the GBi index is not default. In this case, the application condition of the DMVR may be shown in Table 30 below.

TABLE 30 sps_dmvr_enabled_flag is equal to 1
merge_flag[ xCb ][ yCb ] is equal to 1
both predFlagL0[ 0 ][ 0 ] and predFlagL1[ 0 ][ 0 ] are equal to 1
mmvd_flag[ xCb ][ yCb ] is equal to 0
GbiIdx[ xCb ][ yCb ] is equal to 0.
DiffPicOrderCnt( currPic, RefPicList[ 0 ][ refIdxL0 ]) is equal to DiffPicOrderCnt( RefPicList[ 1 ][ refIdxL1 ], currPic )
cbHeight is greater than or equal to 8
cbHeight*cbWidth is greater than or equal to 64

As shown in Table 30 above, when the value of the GBi index (e.g., GbiIdx) is 0, a condition of performing the DMVR may be added. In other words, when the value of the GBi index (e.g., GbiIdx) is not 0, different weights are applied to tow reference blocks (i.e., a reference block referred for L0 prediction and a reference block referred for L1 prediction), and as a result, in this case, the DMVR may be limited not to be performed.

Meanwhile, the BDOF is performed when the current block (i.e., a current coding unit; a current CU) satisfies a true bi-prediction condition. When it is considered that an optical flow equation is designed to predict a motion of an object which moves at a predetermined speed (i.e., momentum), the current true bi-prediction condition is not an optimal condition for applying the BDOF. Accordingly, the condition of the BDOF may be fixed by considering the distance of the reference picture. According to an experimental result, a 0.01% RD-rate change is shown with 100% encoding and decoding run-time by comparing with VVC Test Model (VTM) 4.0.

Figure 13:
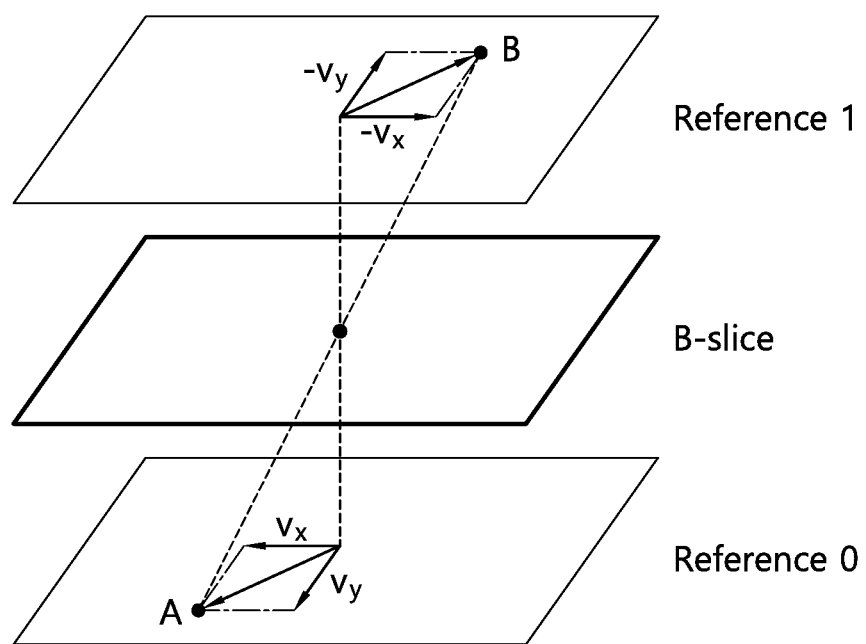
FIG. 13 is a diagram illustrated for describing a concept of a BDOF.

FIG. 13 is a diagram illustrated for describing a concept of a BDOF.

As described above, the BDOF is designed to enhance the performance of the motion compensation by using an optical flow concept. According to the BDOF, as illustrated in FIG. 13, it may be assumed that the object moves at a predetermined speed (constant motion) and while the object moves, the luminance of each pixel is not changed. In the case of the assumption, the optical flow equation may be expressed as Equation 7 below.

$$\Delta(i, j) = \\ A - B = 1(x + \delta x, y + \delta y, t + \delta t) - 1(x - \delta x, y - \delta y, t - \delta t)$$ [Equation 7]

As described above, when the current CU satisfies the true bi-prediction condition, the BDOF is performed. However, the true bi-prediction condition does not mean a case where the object moves at a predetermined speed. Accordingly, the present disclosure proposes a method that may apply the BDOF when the object has a predetermined motion and may enhance the performance of the motion compensation.

According to an embodiment of the present disclosure, in Equation 7 above, as $\delta t$, the BDOF may be applied when the distance from the L0 reference picture (reference 0 of FIG. 13) and the distance from the L1 reference picture (reference 1 of FIG. 13) based on the current picture are the same as each other. In this case, the application condition of the BDOF may be changed as shown in Table 31 below.

TABLE 31

The variable currPic specifies the current picture and the variable bdofFlag is derived as follows:
  If all of the following conditions are true, bdofFlag is set equal to TRUE.
    sps_bdof_enabled_flag is equal to 1.
    predFlagL0[ xSbIdx ][ ySbIdx ] and predFlagL1[ xSbIdx ][ ySbIdx ] are both equal to 1.
    DiffPicOrderCnt( currPic, RefPicList[ 0 ][ refIdxL0 ]) is equal to DiffPicOrderCnt( RefPicList[ 1 ][ refIdxL1 ], currPic )
    MotionModelIdc[ xCb ][ yCb ] is equal to 0.
    merge_subblock_flag[ xCb ][ yCb ] is equal to 0.
    GbiIdx[ xCb ][ yCb ] is equal to 0.
    cIdx is equal to 0.
  Otherwise, bdofFlag is set equal to FALSE.

Referring to Table 31 above, a condition related to the reference picture distance among the application conditions of the BDOF (e.g., DiffPicOrderCnt) is changed to apply the BDOF only when the object has a predetermined motion speed. For example, whether DiffPicOrderCnt(currPic, RefPicList[0][refIdxL0]) and DiffPicOrderCnt(RefPicList[1][refIdxL1], currPic) are the same as each other is determined to determine whether a distance between the current picture and an L0 reference picture (i.e., a reference picture in the reference picture list L0) and a distance between the current picture and an L1 reference picture (i.e., a reference picture in the reference picture list L1) are the same as each other. In other words, the BDOF may be applied only when the distance from the L0 reference picture and the distance from the L1 reference picture based on the current picture are the same as each other. As such, a condition in which the bilateral reference picture distances are the same based on the current picture is used to determine whether the true bi-prediction is performed and an object which moves at a predetermined speed is included. The BDOF is applied to the block satisfying the condition to obtain a more enhanced motion information refinement result.

Further, in the embodiment, together with the conditions (e.g., DiffPicOrderCnt) related to the reference picture distance, whether to apply the BDOF may be determined based on the remaining application conditions listed in Table 31 above.

In other words, the decoding apparatus may determine whether all conditions listed in Table 31 above are satisfied and when all conditions are satisfied, the decoding apparatus may perform the true bi-prediction by applying the BDOF. When even any of the conditions listed in Table 31 above is not satisfied, the decoding apparatus may not apply the BDOF. The encoding apparatus may also apply the conditions of Table 31 above and the encoding apparatus may perform the true bi-prediction by a corresponding method in the decoding apparatus.

Meanwhile, the present disclosure proposes a method for determining whether to apply the BDOF according to the block size. Table 32 below shows a case where a block size limit according to an embodiment of the present disclosure is included as the application condition.

TABLE 32

The variable currPic specifies the current picture and the variable bdofFlag is derived as follows:
  If all of the following conditions are true, bdofFlag is set equal to TRUE.
    sps_bdof_enabled_flag is equal to 1.
    predFlagL0[ xSbIdx ][ ySbIdx ] and predFlagL1[ xSbIdx ][ ySbIdx ] are both equal to 1.
    DiffPicOrderCnt( currPic, RefPicList[ 0 ][ refIdxL0 ] ) *

TABLE 32-continued

DiffPicOrderCnt( currPic, RefPicList[ 1 ][ refIdxL1 ] ) is less than 0.
    MotionModelIdc[ xCb ][ yCb ] is equal to 0.
    merge_subblock_flag[ xCb ][ yCb ] is equal to 0.
    GbiIdx[ xCb ][ yCb ] is equal to 0.
    cIdx is equal to 0.
    cbHeight is greater than or equal to 8
    cbHeight*cbWidth is greater than or equal to 64
  Otherwise, bdofFlag is set equal to FALSE.

Referring to Table 32 above, in applying the BDOE, when the height of the current block (e.g., CbHeight) is equal to or larger than 8, a case where the size (e.g., CbHeight*CbWidth) of the current block is equal to or larger than 64 may be added as the condition.

Accordingly, in the embodiment, together with the condition for whether the height of the current block is equal to or larger than 8 and the condition for whether the height*width of the current block is equal to or larger than 64, whether to apply the BDOF may be determined by using the remaining conditions listed in Table 32 above.

In other words, the decoding apparatus may determine whether all conditions listed in Table 32 above are satisfied and when all conditions are satisfied, the decoding apparatus may perform the true bi-prediction by applying the BDOF. When even any of the conditions listed in Table 32 above is not satisfied, the decoding apparatus may not apply the BDOF. The encoding apparatus may also apply the conditions of Table 32 above and the encoding apparatus may perform the true bi-prediction by a corresponding method in the decoding apparatus.

The DMVR process described in the present disclosure may be implemented according to a specification shown in Table 32 below. Table 33 below shows one example of a motion vector refinement process based on the SAD as an embodiment of the present disclosure.

TABLE 33

8.5.3.1 General
Inputs to this process are:
  a luma location (xSb, ySb ) specifying the top-left sample of the current coding subblock relative to the top left luma sample of the current picture,
  a variable sbWidth specifying the width of the current coding subblock in luma samples,
  a variable sbHeight specifying the height of the current coding subblock in luma samples,
  the luma motion vectors in $\frac{1}{16}$ fractional-sample accuracy mvL0 and mvL1,
  the selected luma reference picture sample arrays refPicL0L and refPicL1L.
Outputs of this process are:
  delta luma motion vectors dMvL0 and dMvL1.
The variable subPelFlag is set to 0. and the variables srRange, offsetH0, offsetH1, offsetV0, and offsetV1 are all set equal to 2.
Both components of the delta luma motion vectors dMvL0 and dMvL1 are set equal to zero and modified as follows:
  For each X being 0 or 1, the ( sbWidth + 2 * srRange ) × ( sbHeight + 2 * srRange ) array predSamplesLXL of prediction luma sample values is derived by invoking the fractional sample bilinear interpolation process specified in 8.5.3.2.1 with the luma location ( xSb, ySb ), the prediction block width set equal to ( sbWidth + 2 * srRange ), the prediction block height set equal to ( sbHeight + 2 * srRange ), the reference picture sample array refPicLXL, the motion vector mvLX and the refinement search range srRange as inputs.
  The list sadList[ i ] with i = 0..8 is derived by invoking the sum of absolute differences calculation process specified in 8.5.3.3 with sbWidth, sbHeight, offsetH0, offsetH1, offsetV0, offsetV1, predSamplesL0L and predSamplesL1L as inputs.
    When sadList[ 4 ] is greater than or equal to 4 * (sbHeight >> 1) * sbWidth, the following applies:
    The variable bestIdx is derived by invoking the array entry selection process specified in clause 8.5.3.4 with the list sadList[ i ] with i = 0..8 as input.
      If bestIdx is equal to 4, subPelFlag is set equal to 1.
      Otherwise, the following applies:

| | | |
|---|---|---|
| dX = bestIdx % 3 − 1 | | (8 436) |
| dY = bestIdx / 3 − 1 | | (8 437) |
| dMvL0[ 0 ] += 16 * dX | | (8 438) |
| dMvL0[ 1 ] += 16 * dY | | (8 439) |
| offsetH0 += dX | (8 440) | |
| offsetV0 += dY | (8 441) | |
| offsetH1 −= dX | (8 442) | |
| offsetV1 −= dY | (8 443) | |

TABLE 33-continued

The list sadList[ i ] with i = 0..8 is modifed by invoking the sum of absolute differences calculation process specified in 8.5.3.3 with sbWidth, sbHeight, offsetH0, offsetH1, offsetV0, offsetV1, predSamplesL0L and predSamplesL1L as inputs.
    The variable bestIdx is modifed by invoking the array entry selection process specified in clause 8.5.3.4 with the list sadList[ i ] with i = 0..8 as input.
       If bestIdx is equal to 4, subPelFlag is set equal to 1
       Otherwise (bestIdx is not equal to 4), the following applies:
dMvL0[ 0 ] += 16 * (bestIdx % 3 − 1 )           (8 444)
dMvL0[ 1 ] += 16 * (bestIdx / 3 − 1 )           (8 445)
    When subPelFlag is equal to 1, the parametric motion vector refinement process specified in clause 8.5.3.5 is invoked with the list sadList[ i ] with i = 0 . . . 8, and the delta motion vector dMvL0 as inputs and the modified dMvL0 as output.
    The delta motion vector dMvL1 is derived as follows:
dMvL1[ 0 ] = −dMvL0[ 0 ]           (8 446)
dMvL1[ 1 ] = −dMvL0[ 1 ]           (8 447)

Meanwhile, as described above, in the DMVR, the SAD function is adopted as the cost function instead of the mean-removed SAD (MRSAD) function by considering the decoding complexity. However, when the GBi index is not default (e.g., when GbiIdx is not 0) and a weighting flag by an explicit weight prediction is not 0, the DMVR using the SAD may not be preferable. Accordingly, the condition of the DMVR may be fixed by considering the GBi index and the weighting flag of the explicit weight prediction. Further, the same condition may be applied even to the BDOF. According to the experimental result, a 0.00% RD-rate change is shown with 100% encoding and decoding runtime by comparing with VVC Test Model (VTM) 4.0.

In the current DMVR, a block which is not matched may be searched by comparing with SAD of reference blocks to be weighted and averaged later. In the present disclosure, since two reference blocks may have different weights, the condition of the DMVR may be determined by considering such a case. According to an embodiment of the present disclosure, the DMVR may not be performed for the block in which the GBi index is not default. Further, the DMVR may not be performed for a block in which the weighting flag by the explicit weight prediction is not 0.

In an embodiment of the present disclosure, proposed is a method that may determine whether to apply the DMVR by considering the weighted bi-prediction is performed. In this case, the application condition of the DMVR may include conditions presented in Table 34 below.

TABLE 34 sps_dmvr_enabled_flag is equal to 1
merge_flag[ xCb ][ yCb ] is equal to 1
both predFlagL0[ 0 ][ 0 ] and predFlagL1[ 0 ][ 0 ] are equal to 1
mmvd_flag[ xCb ][ yCb ] is equal to 0
GbiIdx[ xCb ][ yCb ] is equal to 0
luma_weight_l0_flag[ refIdxL0 ] and luma_weight_l1_flag[ refIdxL1 ] are equal to 0
DiffPicOrderCnt( currPic, RefPicList[ 0 ][ refIdxL0 ])   is   equal   to DiffPicOrderCnt( RefPicList[ 1 ][ refIdxL1 ], currPic )
cbHeight is greater than or equal to 8
cbHeight*cbWidth is greater than or equal to 64

Referring to Table 34 above, a condition indicating whether the weight is explicitly applied to the L0 prediction and the L1 prediction (e.g., luma_weight_l0_flag and luma_weight_l1_flag) and an index condition (e.g., GbiIdx) indicating weights applied to the L0 prediction and the L1 prediction are added to determine whether to apply the DMVR according to whether the weighted bi-prediction is performed.

For example, it may be determined whether the explicit weight prediction is applied to the current block based on flag information (e.g., luma_weight_l0_flag) representing whether to explicitly apply the weight to the L0 prediction and flag information (e.g., luma_weight_l1_flag) representing whether to explicitly apply the weight to the L1 prediction. In other words, when the value of luma_weight_l0_flag is 0 and the value of luma_weight_l1_flag is 0, the DMVR may be limitatively applied. In other words, when the weight prediction is not explicitly applied to the L0 and L1 predictions, it may be determined that the DMVR is applied.

Further, whether bi-prediction (i.e., L0 prediction and L1 prediction) of using different weights is applied to the current block may be determined based on a value of a bi-prediction weight index (e.g., GbiIdx) representing the weights applied to the L0 prediction and the L1 prediction. In other words, the case where the value of the bi-prediction weight index (e.g., GbiIdx) is 0 may be a default case in which different weights are not applied to the L0 prediction and the L1 prediction as described in the embodiment of Table 4 above. Accordingly, when the value of the bi-prediction weight index (e.g., GbiIdx) is 0, the DMVR may be limitatively applied.

According to the embodiment, when the weight prediction is not explicitly applied to the L0 and L1 predictions (when the value of luma_weight_l0_flag is 0 and when the value of luma_weight_l1_flag is 0), information on the bi-prediction weight index (e.g., GbiIdx) is further obtained to determine whether the value of the bi-prediction weight index (e.g., GbiIdx) is 0.

In the embodiment, together with the condition indicating whether the weight is explicitly applied to the L0 prediction and the L1 prediction (e.g., luma_weight_l0_flag and luma_weight_l1_flag) and the index condition (e.g., GbiIdx) indicating weights applied to the L0 prediction and the L1 prediction, it may be determined whether to apply the DMVR based on the remaining conditions listed in Table 34 above.

In other words, the decoding apparatus may determine whether all conditions listed in Table 34 above are satisfied and when all conditions are satisfied, the decoding apparatus may perform the true bi-prediction by applying the DMVR. When even any of the conditions listed in Table 34 above is not satisfied, the decoding apparatus may not apply the DMVR. The encoding apparatus may also apply the conditions of Table 34 above and the encoding apparatus may perform the true bi-prediction by a corresponding method in the decoding apparatus.

Meanwhile, in the case of the BDOF, the GBi index is considered, but the weighting flag of the explicit weight prediction is not considered. Accordingly, the present disclosure proposes a method for determining whether to apply the BDOF by considering the GBi index and the weighting flag of the explicit weight prediction.

As an embodiment of the present disclosure, whether to apply the BDOF may be determined by considering whether the weighted bi-prediction is performed and in this case, the application condition of the BDOF may include conditions presented in Table 35 below.

TABLE 35 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, RefPicList[ 0 ][ refIdxL0 ] ) * DiffPicOrderCnt( currPic, RefPicList[ 1 ][ refIdxL1 ] ) is less than 0.
MotionModelIdc[ xCb ][ yCb ] is equal to 0.
merge_subblock_flag[ xCb ][ yCb ] is equal to 0.
GbiIdx[ xCb ][ yCb ] is equal to 0.
luma_weight_l0_flag[ refIdxL0 ] and luma_weight_l1_flag[ refIdxL1 ] are equal to 0.
cIdx is equal to 0.

Referring to Table 35 above, a condition indicating whether the weight is explicitly applied to the L0 prediction and the L1 prediction (e.g., luma_weight_l0_flag and luma_weight_l1_flag) is added to determine whether to apply the BDOF according to whether the weighted bi-prediction is performed.

For example, it may be determined whether the explicit weight prediction is applied to the current block based on flag information (e.g., luma_weight_l0_flag) representing whether to explicitly apply the weight to the L0 prediction and flag information (e.g., luma_weight_l1_flag) representing whether to explicitly apply the weight to the L1 prediction. In other words, when the value of luma_weight_l0_flag is 0 and the value of luma_weight_l1_flag is 0, the BDOF may be limitatively applied. In other words, when the weight prediction is not explicitly applied to the L0 and L1 predictions, it may be determined that the BDOF is applied.

In the embodiment, together with a condition indicating whether the weight is explicitly applied to the L0 prediction and the L1 prediction (e.g., luma_weight_l0_flag and luma_weight_l1_flag), whether to apply the BDOF may be determined based on the remaining conditions listed in Table 35 above.

In other words, the decoding apparatus may determine whether all conditions listed in Table 35 above are satisfied and when all conditions are satisfied, the decoding apparatus may perform the true bi-prediction by applying the BDOF. When even any of the conditions listed in Table 35 above is not satisfied, the decoding apparatus may not apply the BDOF. The encoding apparatus may also apply the conditions of Table 35 above and the encoding apparatus may perform the true bi-prediction by a corresponding method in the decoding apparatus.

The method for performing the true bi-prediction based on the conditions listed in Table 34 or 35 above may be independently applied to the DMVR and the BDOF or may be applied under the same condition for the DMVR and the BDOF.

As described above, whether to apply the DMVR and the BDOF may be determined by considering a weight factor of the explicit weight prediction in addition to the GBi index. In this case, in order to determine whether to apply the explicit weight prediction, it is considered whether the weight prediction is performed for the luma component by using luma_weight_lX_flag (here, X is 0 or 1), but whether the weight prediction is performed may be considered even for the chroma component. Accordingly, the present disclosure proposes a method for determining whether to apply the DMVR and the BDOF by considering the weight factor of the chroma component in addition to the weight factor of the luma component.

As an embodiment of the present disclosure, whether to apply the DMVR may be determined by considering the weight factor of the explicit weight prediction for the luma component and the chroma component of the current block and in this case, the application condition of the DMVR may include conditions presented in Table 36 below.

TABLE 36 sps_dmvr_enabled_flag is equal to 1
merge_flag[ xCb ][ yCb ] is equal to 1
both predFlagL0[ 0 ][ 0 ] and predFlagL1[ 0 ][ 0 ] are equal to 1
mmvd_flag[ xCb ][ yCb ] is equal to 0
GbiIdx[ xCb ][ yCb ] is equal to 0
luma_weight_l0_flag[ refIdxL0 ] and luma_weight_l1_flag[ refIdxL1 ] are equal to 0
chroma_weight_l0_flag[ refIdxL0 ] and chroma_weight_l1_flag[ refIdxL1 ] are equal to 0
DiffPicOrderCnt( currPic, RefPicList[ 0 ][ refIdxL0 ]) is equal to DiffPicOrderCnt( RefPicList[ 1 ][ refIdxL1 ], currPic )
cbHeight is greater than or equal to 8
cbHeight*cbWidth is greater than or equal to 64

Referring to Table 36 above, a condition (e.g., luma_weight_l0_flag, luma_weight_l1_flag) indicating whether to explicitly apply the weight to the luma component (luma prediction value) of the L0 prediction and the luma component (luma prediction value) of the L1 prediction, a condition (e.g., chroma_weight_l0_flag, chroma_weight_l1_flag) indicating whether to explicitly apply the weight to the chroma component (chroma prediction value) of the L0 prediction and the chroma component (chroma prediction value) of the L1 prediction, and the index condition (e.g., GbiIdx) indicating the weights applied to the L0 prediction and the L1 prediction are added to limitatively apply the DMVR only when the weights (i.e., weight factors) to both the luma and chroma components.

For example, it may be determined whether the weight factor of the explicit weight prediction is applied to the luma component of the current block based on flag information (e.g., luma_weight_l0_flag) representing whether to explicitly apply the weight to the luma component (luma prediction value) of the L0 prediction and flag information (e.g., luma_weight_l1_flag) representing whether to explicitly apply the weight to the luma component (luma prediction value) of the L1 prediction.

Further, it may be determined whether the weight factor of the explicit weight prediction is applied to the chroma component of the current block based on flag information (e.g., chroma_weight_l0_flag) representing whether to explicitly apply the weight to the chroma component (chroma prediction value) of the L0 prediction and flag information (e.g., chroma_weight_l1_flag) representing whether to explicitly apply the weight to the chroma component (chroma prediction value) of the L1 prediction.

In other words, when the value of luma_weight_l0_flag is 0 and the value of luma_weight_l1_flag is 0, it may be determined that the weight factor does not explicitly exist for the luma component and when the value of chroma_weight_l0_flag is 0 and the value of chroma_weight_l1_flag is 0, it may be determined that the weight factor does not explicitly exist for the chroma component. As such, when the explicit weight factor does not exist for both the luma component and the chroma component, the DMVR may be limitatively applied.

Further, whether bi-prediction (i.e., L0 prediction and L1 prediction) of using different weights is applied to the current block may be determined based on a value of a bi-prediction weight index (e.g., GbiIdx) representing the weights applied to the L0 prediction and the L1 prediction. In other words, the case where the value of the bi-prediction weight index (e.g., GbiIdx) is 0 may be a default case in which different weights are not applied to the L0 prediction and the L1 prediction as described in the embodiment of Table 4 above. Accordingly, when the value of the bi-prediction weight index (e.g., GbiIdx) is 0, the DMVR may be limitatively applied.

According to the embodiment, when the weight prediction is not explicitly applied to the L0 and L1 predictions of the luma component (when the value of luma_weight_l0_flag is 0 and the value of luma_weight_l1_flag is 0) and when the weight prediction is not explicitly applied to the L0 and L1 predictions of the chroma component (when the value of chroma_weight_l0_flag is 0 and the value of chroma_weight_l1_flag is 0), information on the bi-prediction weight index (e.g., GbiIdx) is further obtained to determine whether the value of the bi-prediction weight index (e.g., GbiIdx) is 0.

In the embodiment, together with the condition indicating whether the weight is explicitly applied to the L0 prediction and the L1 prediction of the luma component (e.g., luma_weight_l0_flag and luma_weight_l1_flag), the condition indicating whether to explicitly apply the weight to the L0 prediction and the L1 prediction of the chroma component, and the index condition (e.g., GbiIdx) indicating weights applied to the L0 prediction and the L1 prediction, it may be determined whether to apply the DMVR based on the remaining conditions listed in Table 36 above.

In other words, the decoding apparatus may determine whether all conditions listed in Table 36 above are satisfied and when all conditions are satisfied, the decoding apparatus may perform the true bi-prediction by applying the DMVR. When even any of the conditions listed in Table 36 above is not satisfied, the decoding apparatus may not apply the DMVR. The encoding apparatus may also apply the conditions of Table 36 above and the encoding apparatus may perform the true bi-prediction by a corresponding method in the decoding apparatus.

Further, as an embodiment of the present disclosure, whether to apply the BDOF may be determined by considering the weight factor of the explicit weight prediction for the luma component and the chroma component of the current block and in this case, the application condition of the BDOF may include conditions presented in Table 37 below.

TABLE 37 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, RefPicList[ 0 ][ refIdxL0 ] ) * DiffPicOrderCnt( currPic, RefPicList[ 1 ][ refIdxL1 ] ) is less than 0.
MotionModelIdc[ xCb ][ yCb ] is equal to 0.
merge_subblock_flag[ xCb ][ yCb ] is equal to 0.
GbiIdx[ xCb ][ yCb ] is equal to 0.
luma_weight_l0_flag[ refIdxL0 ] and luma_weight_l1_flag[ refIdxL1 ] are equal to 0.
chroma_weight_l0_flag[ refIdxL0 ] and chroma_weight_l1_flag[ refIdxL1 ]

TABLE 37-continued are equal to 0.
cIdx is equal to 0.

Referring to Table 37 above, a condition (e.g., luma_weight_l0_flag, luma_weight_l1_flag) indicating whether to explicitly apply the weight to the luma component (luma prediction value) of the L0 prediction and the luma component (luma prediction value) of the L1 prediction and a condition (e.g., chroma_weight_l0_flag, chroma_weight_l1_flag) indicating whether to explicitly apply the weight to the chroma component (chroma prediction value) of the L0 prediction and the chroma component (chroma prediction value) of the L1 prediction are added to limitatively apply the BDOF only when the weights (i.e., weight factors) to both the luma and chroma components.

For example, it may be determined that the weight factors of the L0 prediction and the L1 prediction for the luma component of the current block do not explicitly exist when the value of the flag information (e.g., luma_weight_l0_flag) representing whether to explicitly apply the weight to the luma component (luma prediction value) of the L0 prediction is 0 and the value of the flag information (e.g., luma_weight_l1_flag) representing whether to explicitly apply the weight to the luma component (luma prediction value) of the L1 prediction is 0.

Further, it may be determined that the weight factors of the L0 prediction and the L1 prediction for the chroma component of the current block do not explicitly exist when the value of the flag information (e.g., chroma_weight_l0_flag) representing whether to explicitly apply the weight to the chroma component (chroma prediction value) of the L0 prediction is 0 and the value of the flag information (e.g., chroma_weight_l1_flag) representing whether to explicitly apply the weight to the chroma component (chroma prediction value) of the L1 prediction is 0.

As such, when the weight factor does not exist for both the luma component and the chroma component, the BDOF may be limitatively applied.

In the embodiment, together with the condition indicating whether the weight is explicitly applied to the L0 prediction and the L1 prediction of the luma component (e.g., luma_weight_l0_flag and luma_weight_l1_flag) and the condition indicating whether to explicitly apply the weight to the L0 prediction and the L1 prediction of the chroma component (e.g., chroma_weight_l0_flag and chroma_weight_l1_flag), it may be determined whether to apply the BDOF based on the remaining conditions listed in Table 37 above.

In other words, the decoding apparatus may determine whether all conditions listed in Table 37 above are satisfied and when all conditions are satisfied, the decoding apparatus may perform the true bi-prediction by applying the BDOF. When even any of the conditions listed in Table 37 above is not satisfied, the decoding apparatus may not apply the BDOF. The encoding apparatus may also apply the conditions of Table 37 above and the encoding apparatus may perform the true bi-prediction by a corresponding method in the decoding apparatus.

The method for performing the true bi-prediction based on the conditions listed in Table 36 or 37 above may be independently applied to the DMVR and the BDOF or may be applied under the same condition for the DMVR and the BDOF.

Meanwhile, as described above according to embodiments of the present disclosure, whether to apply the DMVR and the BDOF may be determined by considering the explicit weight prediction. In this case, in order to determine whether to apply the explicit weight prediction, a type of slice may be considered. Accordingly, the present disclosure proposes a method for determining whether to apply the DMVR and the BDOF by considering the slice type and whether to apply the weight prediction accordingly.

As an embodiment of the present disclosure, whether to apply the DMVR and the BDOF may be determined by using flag information indicating whether to apply the weight prediction according to the type of current slice. Here, the flag information indicating whether to apply the weight prediction according to the type of current slice may be signaled from the encoding apparatus to the decoding apparatus through the picture parameter set (PPS) or sequence parameter set (SPS) syntax. As one example, Table 38 below shows the flag information signaled through the PPS syntax.

TABLE 38

| pic_parameter_set_rbsp( ) { | Descriptor |
|---|---|
| ... | |
| weighted_pred_flag | u(1) |
| weighted_bipred_flag | u(1) |

Referring to Table 38 above, weighted_pred_flag and weighted_bipred_flag may be signaled from the encoding apparatus to the decoding apparatus. Here, weighted_pred_flag may be information indicating whether the weight prediction is applied to slice P and weighted_bipred_flag may be information indicating whether the weight prediction is applied to slice B.

For example, when the value of weighted_pred_flag is 0, it may be indicated that the weight prediction is not applied to a P slice and when the value of weighted_pred_flag is 1, it may be indicated that the weight prediction is applied to the P slice. Further, when the value of weighted_bipred_flag is 0, it may be indicated that the weight prediction is not applied to a B slice and when the value of weighted_bipred_flag is 1, it may be indicated that the weight prediction is applied to the B slice.

Here, the predictive (P) slice may mean a slice decoded based on an inter prediction (end) using one motion vector and one reference picture index. The bi-predictive (B) slice may mean a slice decoded based on an inter prediction using one or more, e.g., two motion vectors and reference picture indexes.

As an embodiment of the present disclosure, whether to apply the DMVR may be determined based on flag information (e.g., weighted_pred_flag) indicating whether the weight prediction is applied to the P slice and flag information (e.g., weighted_bipred_flag) indicating whether the weight prediction is applied to the B slice and in this case, the application condition of the DMVR may include conditions presented in Table 39 below.

TABLE 39 sps_dmvr_enabled_flag is equal to 1
merge_flag[ xCb ][ yCb ] is equal to 1
both predFlagL0[ 0 ][ 0 ] and predFlagL1[ 0 ][ 0 ] are equal to 1
mmvd_flag[ xCb ][ yCb ] is equal to 0
GbiIdx[ xCb ][ yCb ] is equal to 0
!(weighted_pred_flag && P_SLICE) && !(weighted_bipred_flag && B_SLICE)

TABLE 39-continued

DiffPicOrderCnt( currPic, RefPicList[ 0 ][ refIdxL0 ]) is equal to DiffPicOrderCnt( RefPicList[ 1 ][ refIdxL1 ], currPic )
cbHeight is greater than or equal to 8
cbHeight*cbWidth is greater than or equal to 64

Referring to Table 39 above, the condition (e.g., weighted_pred_flag) indicating whether the weight prediction is applied to the P slice, the condition (e.g., weighted_bipred_flag) indicating whether the weight prediction is applied to the B slice, and the index condition (e.g., GbiIdx) indicating the weights applied to the L0 prediction and the L1 prediction are added to limitatively apply the DMVR only when the weight prediction is not applied to the P slice and the B slice.

For example, when the value of weighted_pred_flag is 1 and the current slice is not the P slice and when the value of weighted_bipred_flag is 1 and the current slice is not the B slice, the DMVR may be applied. In other words, when the weight prediction is not applied to the P slice and the weight prediction is not applied to the B slice, it may be determined that the DMVR is applied.

Further, whether bi-prediction (i.e., L0 prediction and L1 prediction) of using different weights is applied to the current block may be determined based on a value of a bi-prediction weight index (e.g., GbiIdx) representing the weights applied to the L0 prediction and the L1 prediction. In other words, the case where the value of the bi-prediction weight index (e.g., GbiIdx) is 0 may be a default case in which different weights are not applied to the L0 prediction and the L1 prediction as described in the embodiment of Table 4 above. Accordingly, when the value of the bi-prediction weight index (e.g., GbiIdx) is 0, the DMVR may be limitatively applied.

In the embodiment, together with the condition (e.g., weighted_pred_flag) indicating whether the weight prediction is applied to the P slice, the condition (e.g., weighted_bipred_flag) indicating whether the weight prediction is applied to the B slice, and the index condition (e.g., GbiIdx) indicating the weights applied to the L0 prediction and the L1 prediction, whether to apply the DMVR may be determined based on the remaining conditions listed in Table 39 above.

In other words, the decoding apparatus may determine whether all conditions listed in Table 39 above are satisfied and when all conditions are satisfied, the decoding apparatus may perform the true bi-prediction by applying the DMVR. When even any of the conditions listed in Table 39 above is not satisfied, the decoding apparatus may not apply the DMVR. The encoding apparatus may also apply the conditions of Table 39 above and the encoding apparatus may perform the true bi-prediction by a corresponding method in the decoding apparatus.

Further, as an embodiment of the present disclosure, whether to apply the BDOF may be determined based on flag information (e.g., weighted_pred_flag) indicating whether the weight prediction is applied to the P slice and flag information (e.g., weighted_bipred_flag) indicating whether the weight prediction is applied to the B slice and in this case, the application condition of the BDOF may include conditions presented in Table 40 below.

TABLE 40 sps_bdof_enabled_flag is equal to 1.
predFlagL0[ xSbIdx ][ ySbIdx ] and predFlagL1[ xSbIdx ][ ySbIdx ] are both equal to 1.
DiffPicOrderCnt( currPic, RefPicList[ 0 ][ refIdxL0 ] ) * DiffPicOrderCnt( currPic, RefPicList[ 1 ][ refIdxL1 ] ) is less than 0.
MotionModelIdc[ xCb ][ yCb ] is equal to 0.
merge_subblock_flag[ xCb ][ yCb ] is equal to 0.
GbiIdx[ xCb ][ yCb ] is equal to 0.
!(weighted_pred_flag && P_SLICE) && !(weighted_bipred_flag && B_SLICE)
cIdx is equal to 0.

Referring to Table 40 above, the condition (e.g., weighted_pred_flag) indicating whether the weight prediction is applied to the P slice and the condition (e.g., weighted_bipred_flag) indicating whether the weight prediction is applied to the B slice are added to limitatively apply the BDOF only when the weight prediction is not applied to the P slice and the B slice.

For example, when the value of weighted_pred_flag is 1 and the current slice is not the P slice and when the value of weighted_bipred_flag is 1 and the current slice is not the B slice, the BDOF may be applied. In other words, when the weight prediction is not applied to the P slice and the weight prediction is not applied to the B slice, it may be determined that the BDOF is applied.

In the embodiment, together with the condition (e.g., weighted_pred_flag) indicating whether the weight prediction is applied to the P slice, the condition (e.g., weighted_bipred_flag) indicating whether the weight prediction is applied to the B slice, and the index condition (e.g., GbiIdx) indicating the weights applied to the L0 prediction and the L1 prediction, whether to apply the BDOF may be determined based on the remaining conditions listed in Table 40 above.

In other words, the decoding apparatus may determine whether all conditions listed in Table 40 above are satisfied and when all conditions are satisfied, the decoding apparatus may perform the true bi-prediction by applying the BDOF. When even any of the conditions listed in Table 40 above is not satisfied, the decoding apparatus may not apply the BDOF. The encoding apparatus may also apply the conditions of Table 40 above and the encoding apparatus may perform the true bi-prediction by a corresponding method in the decoding apparatus.

The method for performing the true bi-prediction based on the conditions listed in Table 39 or 40 above may be independently applied to the DMVR and the BDOF or may be applied under the same condition for the DMVR and the BDOF.

Meanwhile, whether to perform bi-prediction or uni-prediction may be determined according to the block size. For example, when the size of the current block is small (e.g., a block having a size of 4×8 or 8×4), only the uni-prediction may be limited to be enabled and when the size of the current block is large, the bi-prediction may be configured to be enabled. As such, if only the uni-prediction is limited to be performed when the block size is small, the block size limited during the uni-prediction should be considered even for the DMVR and the BDOF performed in the case of the bi-prediction. For example, if only the uni-prediction is limited to be enabled when the size of the current block is 4×8 or 8×4, the bi-prediction may be performed when at least one of the height or the width of the current block is larger than 4. Accordingly, the present disclosure proposes a method for applying the DMVR and the BDOF by considering the block size applied during the bi-prediction or uni-prediction.

As an embodiment of the present disclosure, proposed is a method for determining whether to apply the BDOF by considering the height (and/or width) of the current block. In this case, the application condition of the BDOF may include conditions presented in Table 41 below.

TABLE 41

The variable currPic specifies the current picture and the variable bdofFlag is derived as follows:
  If all of the following conditions are true, bdofFlag is set equal to TRUE.
    sps_bdof_enabled_flag is equal to 1.
    predFlagL0[ xSbIdx ][ ySbIdx ] and predFlagL1[ xSbIdx ][ ySbIdx ] are both equal to 1.
    DiffPicOrderCnt( currPic, RefPicList[ 0 ][ refIdxL0 ] ) * DffPicOrderCnt( currPic, RefPicList[ 1 ][ refIdxL1 ] ) is less than 0.
    MotionModelIdc[ xCb ][ yCb ] is equal to 0.
    merge_subblock_flag[ xCb ][ yCb ] is equal to 0.
    GbiIdx[ xCb ][ yCb ] is equal to 0.
    cIdx is equal to 0.
    cbHeight is greater than 4
  Otherwise, bdofFlag is set equal to FALSE.

Referring to Table 41 above, the BDOF may be applied to a block which is larger than a specific size by changing the conditions (e.g., cbHeight) related to the height (and/or width) of the current block. For example, when the height (e.g., CbHeight) of the current block is larger than 4, a condition of applying the BDOF may be used. Alternatively, when the width (e.g., CbWidth) of the current block is larger than 4, the condition of applying the BDOF may be used. When the condition related to the size of the current block (e.g., CbHeight or CbWidth) is satisfied (i.e., when the height of the current block is larger than 4), the BDOF may be applied and when the condition related to the size of the current block is not satisfied (i.e., when the height of the current block is equal to or smaller than 4), the BDOF may not be applied.

Further, in the embodiment, together with the conditions (e.g., CbHeight and CbWidth) related to the size of the current block, whether to apply the BDOF may be determined based on the remaining application conditions listed in Table 41 above. In this case, bdofFlag may be derived according to the conditions listed in Table 41 above are satisfied. In this case, when all of the conditions listed in Table 41 above are satisfied, the value of bdofFlag may be derived as 1 (true), otherwise the value of bdofFlag may be derived as 0 (false). Here, bdofFlag may be flag information indicating whether the BDOF is applied to the current block.

In other words, the decoding apparatus may determine whether all conditions listed in Table 41 above are satisfied and when all conditions are satisfied, the decoding apparatus may perform the true bi-prediction by applying the BDOF. When even any of the conditions listed in Table 41 above is not satisfied, the decoding apparatus may not apply the BDOF. The encoding apparatus may also apply the conditions of Table 41 above and the encoding apparatus may perform the true bi-prediction by a corresponding method in the decoding apparatus.

Further, as an embodiment of the present disclosure, proposed is a method for determining whether to apply the DMVR by considering the height (and/or width) of the current block. In this case, the application condition of the DMVR may include conditions presented in Table 42 below.

TABLE 42

The variable currPic specifies the current picture and the variable dmvrFlag is derived as follows:
   If all of the following conditions are true, dmvrFlag is set equal to TRUE.
      sps_dmvr_enabled_flag is equal to 1
      merge_flag[ xCb ][ yCb ] is equal to 1
      both predFlagL0[ 0 ][ 0 ] and predFlagL1[ 0 ][ 0 ] are equal to 1
      mmvd_flag[ xCb ][ yCb ] is equal to 0
      DiffPicOrderCnt( currPic, RefPicList[ 0 ][ refIdxL0 ]) is equal to DiffPicOrderCnt( RefPicList[ 1 ][ refIdxL1 ], currPic )
      cbHeight is greater than 4
   Otherwise, dmvrFlag is set equal to FALSE.

Referring to Table 42 above, the DMVR may be applied to a block which is larger than a specific size by changing the conditions (e.g., cbHeight) related to the height (and/or width) of the current block. For example, when the height (e.g., CbHeight) of the current block is larger than 4, a condition of applying the DMVR may be used. Alternatively, when the width (e.g., CbWidth) of the current block is larger than 4, the condition of applying the DMVR may be used. When the condition related to the size of the current block (e.g., CbHeight or CbWidth) is satisfied (i.e., when the height of the current block is larger than 4), the DMVR may be applied and when the condition related to the size of the current block is not satisfied (i.e., when the height of the current block is equal to or smaller than 4), the DMVR may not be applied.

Further, in the embodiment, together with the conditions (e.g., CbHeight and CbWidth) related to the size of the current block, whether to apply the DMVR may be determined based on the remaining application conditions listed in Table 42 above. In this case, dmvrFlag may be derived according to the conditions listed in Table 42 above are satisfied. In this case, when all of the conditions listed in Table 42 above are satisfied, the value of dmvrFlag may be derived as 1 (true), otherwise the value of dmvrFlag may be derived as 0 (false). Here, dmvrFlag may be flag information indicating whether the DMVR is applied to the current block.

In other words, the decoding apparatus may determine whether all conditions listed in Table 42 above are satisfied and when all conditions are satisfied, the decoding apparatus may perform the true bi-prediction by applying the DMVR. When even any of the conditions listed in Table 42 above is not satisfied, the decoding apparatus may not apply the DMVR. The encoding apparatus may also apply the conditions of Table 42 above and the encoding apparatus may perform the true bi-prediction by a corresponding method in the decoding apparatus.

The method for performing the true bi-prediction based on the conditions listed in Table 41 or 42 above may be independently applied to the DMVR and the BDOF or may be applied under the same condition for the DMVR and the BDOF.

In the present disclosure, DMVR flag information indicating whether to apply the DMVR and BDOF flag information indicating whether to apply the BDOF may be derived based on the application conditions of Tables 2 to 42 described above.

For example, the DMVR flag information (e.g., dmvrFlag) may be derived based on the application conditions (at least one of the application conditions of Tables 2 to 42 or a combination of the application conditions). In this case, when the value of dmvrFlag is 1 (or true), it may be indicated that the DMVR is applied and when the value of dmvrFlag is 0 (or false), it may be indicated that the DMVR is not applied. Further, the BDOF flag information (e.g., bdofFlag) may be derived based on the application conditions (at least one of the application conditions of Tables 2 to 42 or a combination of the application conditions) of the BDOF. In this case, when the value of bdofFlag is 1 (or true), it may be indicated that the BDOF is applied and when the value of bdofFlag is 0 (or false), it may be indicated that the BDOF is not applied.

Figure 14:
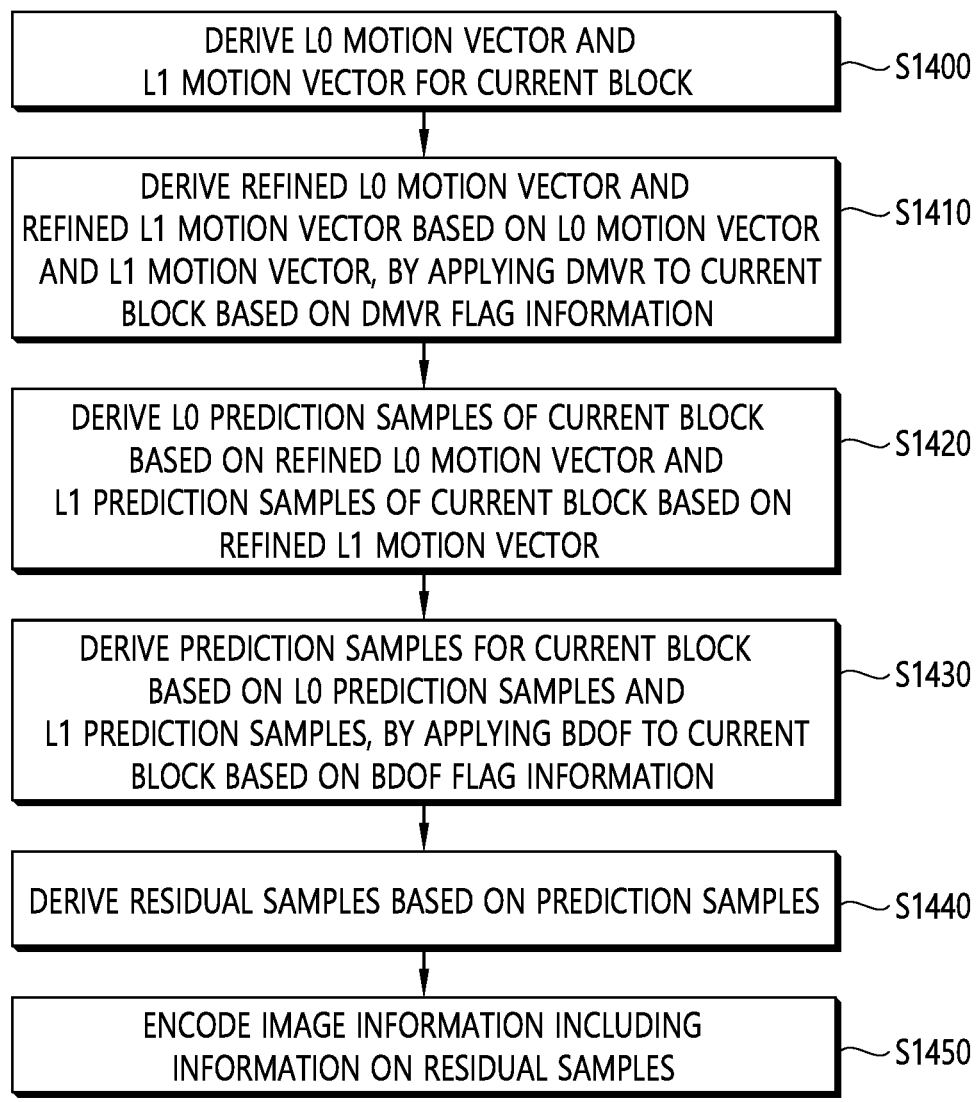
FIG. 14 is a flowchart schematically showing an encoding method which may be performed by an encoding apparatus according to an embodiment of the present disclosure.

FIG. 14 is a flowchart schematically showing an encoding method which may be performed by an encoding apparatus according to an embodiment of the present disclosure.

The method disclosed in FIG. 14 may be performed by the encoding apparatus 200 disclosed in FIG. 2. Specifically, steps S1400 to S1430 of FIG. 14 may be performed by the predictor 220 and an inter predictor 221 disclosed in FIG. 2, step S1440 of FIG. 14 may be performed by the residual processor 230 disclosed in FIG. 2, and step S1450 of FIG. 14 may be performed by the entropy encoder 240 disclosed in FIG. 2. Further, the method disclosed in FIG. 14 may include the embodiments described above in the present disclosure. Accordingly, in FIG. 14, detailed description of the duplicated contents with the embodiments will be omitted or simplified.

Referring to FIG. 14, the encoding apparatus may derive an L0 motion vector and an L1 motion vector of the current block (S1400).

As an embodiment, when performing the inter prediction for the current block, the encoding apparatus may derive motion information (motion vector, reference picture index, etc.) of the current block. For example, the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block.

Further, the encoding apparatus may determine an inter prediction mode applied to the current block among various prediction modes. The encoding apparatus may compare RD cost for the various prediction modes and determine an optimal prediction mode for the current block.

For example, the encoding apparatus may determine whether to apply the merge mode as an optimal prediction mode for the current block. When applying the merge mode to the current block, the encoding apparatus may configure a merge candidate list based on neighboring blocks of the current block and generate merge index information. Specifically, a reference block may be derived in which a difference from the current block is minimum or is equal to or less than a predetermined criterion among reference blocks (i.e., neighboring blocks) indicated by merge candidates included in the merge candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

Here, the motion information may include information such as the motion vector, the reference picture index, etc., and include L0 motion information and/or L1 motion information according to the inter-prediction type (L0 prediction, L1 prediction, Bi prediction, etc.). When the bi-prediction is applied to the current block, the motion information may include an L0-direction motion vector (L0 motion vector) and an L1-direction motion vector (L1 motion vector). Further, the motion information may include an L0 reference picture index and an L0 reference picture indicated by the L0 reference picture index in an L0 reference picture list and an L1 reference picture index and an L1 reference picture indicated by the L1 reference picture index in an L1 reference picture list.

In other words, when the merge mode is applied, the encoding apparatus may derive the L0 motion vector and the L1 motion vector of the neighboring block indicated by the merge index information among the neighboring blocks of the current block and use the derived L0 and L1 motion vectors as the L0 and L1 motion vectors of the current block.

The encoding apparatus applies the DMVR to the current block based on DMVR flag information indicating whether to apply the DMVR to the current block to derive a refined L0 motion vector and a refined L1 motion vector based on the L0 motion vector and the L1 motion vector (S1410).

In this case, the encoding apparatus may determine whether to apply the DMVR to the current block by considering coding efficiency, complexity, prediction performance, etc. In other words, the encoding apparatus may apply the DMVR to the current block based on whether a predetermined application condition of the DMVR is satisfied for the current block. Here, the application condition of the predetermined DMVR may be constituted by some (or all) or specific combinations of various application conditions described in Tables 2 to 42 above. Further, the encoding apparatus may derive the DMVR flag information according to whether the predetermined application condition of the DMVR is satisfied. The DMVR flag information may be information (e.g., dmvrFlag described above) indicating whether to apply the DMVR to the current block.

As an embodiment, the predetermined application condition of the DMVR may include a condition in which values of both L0 luma weight prediction flag information and L1 luma weight prediction flag information are 0.

In this case, when a case where the values of both the L0 luma weight prediction flag information (e.g., luma_weight_l0_flag) and the L1 luma weight prediction flag information (e.g., luma_weight_l1_flag) are 0 is satisfied, the encoding apparatus may derive the DMVR flag information to a value indicating that the DMVR is applied to the current block. For example, when both luma_weight_l0_flag and luma_weight_l1_flag are 0, the DMVR flag information may be derived as the value (e.g., 1 or true) indicating that the DMVR is applied to the current block. Otherwise, the DMVR flag information may be derived as a value (e.g., 0 or false) indicating that the DMVR is not applied to the current block.

Here, the L0 luma weight prediction flag information may be information indicating whether the weight factor of the L0 prediction for the luma component of the current block presents and the L1 luma weight prediction flag information may be information indicating whether the weight factor of the L1 prediction for the luma component of the current block presents. For example, the case where the value of the L0 luma weight prediction flag information is 0 may indicate that the weight factor does not present for the luma component of the L0 prediction and the case where the value of the L0 luma weight prediction flag information is 1 may indicate that the weight factor presents for the luma component of the L0 prediction. For example, the case where the value of the L1 luma weight prediction flag information is 0 may indicate that the weight factor does not present for the luma component of the L1 prediction and the case where the value of the L1 luma weight prediction flag information is 1 may indicate that the weight factor presents for the luma component of the L1 prediction.

Further, as an embodiment, the predetermined application condition of the DMVR may include a condition in which the value of bi-prediction weight index information of the current block is 0.

In this case, when the value of the bi-prediction weight index information (e.g., GbiIdx) is 0, the encoding apparatus may derive the DMVR flag information to the value indicating that the DMVR is applied to the current block. For example, when GbiIdx is 0, the DMVR flag information may be derived as the value (e.g., 1 or true) indicating that the DMVR is applied to the current block. Otherwise, the DMVR flag information may be derived as a value (e.g., 0 or false) indicating that the DMVR is not applied to the current block.

Here, the case where the value of the bi-prediction weight index (e.g., GbiIdx) is 0 may be a default case in which different weights are not applied to the L0 prediction and the L1 prediction. As one example, as shown in Table 4 above, the case where the value of the bi-prediction weight index information is 0 may be a case where the ½ weight is applied to each of the L0 prediction and the L1 prediction.

Further, as an embodiment, the predetermined application condition of the DMVR may include a condition in which a prediction mode (CIIP mode) in which the inter prediction and the intra prediction are combined is not applied to the current block.

In this case, when the case where the prediction mode in which the inter prediction and the intra prediction are combined is not applied to the current block (e.g., a case where ciip_flag is 0) is satisfied, the DMVR flag information may be derived as the value indicating that the DMVR is applied to the current block. For example, when ciip_flag is 0, the DMVR flag information may be derived as the value (e.g., 1 or true) indicating that the DMVR is applied to the current block. When ciip_flag is 1, the DMVR flag information may be derived as the value (e.g., 0 or false) indicating that the DMVR is not applied to the current block.

Further, as an embodiment, the predetermined application condition of the DMVR may include a condition in which the size of the current block is equal to or larger than 16×16. In other words, the predetermined application condition may mean a case where the height of the current block is equal to or larger than 16 and the width of the current block is equal to or larger than 16.

In this case, when the case where the size of the current block is equal to or larger than 16×16 is satisfied, the encoding apparatus may derive the DMVR flag information to the value indicating that the DMVR is applied to the current block. For example, in the case where the size of the current block is equal to or larger than 16×16, the DMVR flag information may be derived as the value (e.g., 1 or true) indicating that the DMVR is applied to the current block. Otherwise (i.e., in the case where the size of the current block is smaller than 16×16), the DMVR flag information may be derived as the value (e.g., 0 or false) indicating that the DMVR is not applied to the current block.

Further, according to an embodiment, the predetermined application condition of the DMVR may include a condition in which DMVR based inter bi-prediction is enabled, a condition in which bi-prediction performed based on the L0 reference picture and the L1 reference picture is applied to the current block, a condition in which a first picture order count (POC) difference between the current picture and the L0 reference picture and a second POC difference between the current picture and the L1 reference picture are the same as each other, a condition in which the merge mode is applied to the current block, a condition in which a merge mode with motion vector difference (MMVD) mode is not applied to the current block, etc.

In other words, the application condition of the DMVR may be determined to include at least one of the conditions and the DMVR flag information may be derived based on the determined DMVR application condition. In this case, when the DMVR application condition is determined to include one or more conditions, if all of the predetermined DMVR application conditions are satisfied, the encoding apparatus derives the value of the DMVR flag information to true or 1 to determine that the DMVR is applied to the current block. Otherwise, if even any of the predetermined application conditions of the DMVR is not satisfied, the value of the DMVR flag information may be derived as false or 0.

Here, in deriving the DMVR flag information, the listed DMVR application conditions are just examples and the conditions of Tables 2 to 42 described above may be used in various combinations.

When the DMVR flag information indicates that the DMVR is applied to the current block (for example, when the DMVR flag information is derived as the true or 1 value), the encoding apparatus applies the DMVR to the current block to derive the refined L0 motion vector and the refined L1 motion vector based on the L0 motion vector and the L1 motion vector.

As an embodiment, the encoding apparatus a minimum sum of absolute differences (SAD) by using reference samples in the L0 reference picture derived based on the L0 motion vector and reference samples in the L1 reference picture derived based on the L1 motion vector. In addition, the encoding apparatus may derive the refined L0 motion vector for the L0 motion vector and the refined L1 motion vector for the L1 motion vector based on a sample position corresponding to the minimum SAD.

Here, the L0 reference picture is a reference picture indicated by the L0 reference picture index among the reference pictures included in the L0 reference picture list and the L1 reference picture is a reference picture indicated by the L1 reference picture index among the reference pictures included in the L1 reference picture list.

Further, the refined L0 motion vector may be a motion vector indicating the sample position corresponding to the minimum SAD in the L0 reference picture and the refined L1 motion vector may be a motion vector indicating the sample position corresponding to the minimum SAD in the L1 reference picture. The process of deriving the refined motion vector by applying the DMVR is described in detail in FIGS. 8 and 9, so the description thereof will be omitted herein.

The encoding apparatus may derive L0 prediction samples of the current block based on the refined L0 motion vector and the L1 prediction sample of the current block based on the refined L1 motion vector (S1420).

Here, the L0 prediction samples may be derived based on the reference samples indicated by the refined L0 motion vector in the L0 reference picture and the L1 prediction samples may be derived based on the reference samples indicated by the refined L1 motion vector in the L1 reference picture.

The encoding apparatus may derive the prediction samples for the current block based on the L0 prediction samples and the L1 prediction samples by applying the BDOF to the current block based on BDOF flag information indicating whether to apply the BDOF to the current block (S1430).

In this case, in deriving the prediction samples, the encoding apparatus may determine whether to apply the BDOF to the current block by considering coding efficiency, complexity, prediction performance, etc. In other words, the encoding apparatus may apply the BDOF to the current block based on whether a predetermined application condition of the BDOF is satisfied for the current block. Here, the predetermined application condition of the BDOF may be constituted by some (or all) or specific combinations of various application conditions described in Tables 2 to 42 above. Further, the encoding apparatus may derive the BDOF flag information according to whether the predetermined application condition of the BDOF is satisfied. The BDOF flag information may be information (e.g., bdofFlag described above) indicating whether to apply the BDOF to the current block.

As an embodiment, the predetermined application condition of the BDOF may include a condition in which values of both L0 luma weight prediction flag information and L1 luma weight prediction flag information are 0.

In this case, when a case where the values of both the L0 luma weight prediction flag information (e.g., luma_weight_l0_flag) and the L1 luma weight prediction flag information (e.g., luma_weight_l1_flag) are 0 is satisfied, the encoding apparatus may derive the BDOF flag information to the value indicating that the BDOF is applied to the current block. For example, when both luma_weight_l0_flag and luma_weight_l1_flag are 0, the BDOF flag information may be derived as the value (e.g., 1 or true) indicating that the BDOF is applied to the current block. Otherwise, the BDOF flag information may be derived as the value (e.g., 0 or false) indicating that the BDOF is not applied to the current block.

Further, as an embodiment, the predetermined application condition of the BDOF may include a condition in which the size of the current block is equal to or larger than 16×16. In other words, the predetermined application condition may mean a case where the height of the current block is equal to or larger than 16 and the width of the current block is equal to or larger than 16.

In this case, when the case where the size of the current block is equal to or larger than 16×16 is satisfied, the encoding apparatus may derive the BDOF flag information to the value indicating that the BDOF is applied to the current block. For example, in the case where the size of the current block is equal to or larger than 16×16, the BDOF flag information may be derived as the value (e.g., 1 or true) indicating that the BDOF is applied to the current block. Otherwise (i.e., in the case where the size of the current block is smaller than 16×16), the BDOF flag information may be derived as the value (e.g., 0 or false) indicating that the BDOF is not applied to the current block.

Further, as an embodiment, the predetermined application condition of the BDOF may include a condition in which the height of the current block is equal to or larger than 8.

In this case, when the case where the height of the current block is equal to or larger than 8 is satisfied, the encoding apparatus may derive the BDOF flag information to the value indicating that the BDOF is applied to the current block. For example, in the case where the height of the current block is equal to or larger than 8, the BDOF flag information may be derived as the value (e.g., 1 or true) indicating that the BDOF is applied to the current block. Otherwise (i.e., in the case where the height of the current block is smaller than 8), the BDOF flag information may be derived as the value (e.g., 0 or false) indicating that the BDOF is not applied to the current block.

Further, as an embodiment, the predetermined application condition of the BDOF may include a case in which a first picture order count (POC) between the current picture and the L0 reference picture and a second POC difference between the current picture and the L1 reference picture are the same as each other.

In this case, when the case where the first POC difference (e.g., DiffPicOrderCnt(currPic, RefPicList0 [refIdxL0])) and the second POC difference (e.g., DiffPicOrderCnt (currPic, RefPicList1[refIdxL1])) are the same as each other is satisfied, the encoding apparatus may derive the BDOF flag information to the value indicating that the BDOF is applied to the current block. For example, when DiffPicOrderCnt(currPic, RefPicList0 [refIdxL0])−DiffPicOrderCnt (currPic, RefPicList1 [refIdxL1]) is 0, the BDOF flag information may be derived as the value (e.g., 1 or true) indicating that the BDOF is applied to the current block. Otherwise, the BDOF flag information may be derived as the value (e.g., 0 or false) indicating that the BDOF is not applied to the current block.

Further, as an embodiment, the predetermined application condition of the BDOF may include a condition in which a prediction mode (CIIP mode) in which the inter prediction and the intra prediction are combined is not applied to the current block.

In this case, when the case where the prediction mode in which the inter prediction and the intra prediction are combined is not applied to the current block (e.g., a case where ciip_flag is 0) is satisfied, the BDOF flag information may be derived as the value indicating that the BDOF is applied to the current block. For example, when ciip_flag is 0, the BDOF flag information may be derived as the value (e.g., 1 or true) indicating that the BDOF is applied to the current block. When ciip_flag is 1, the BDOF flag information may be derived as the value (e.g., 0 or false) indicating that the BDOF is not applied to the current block.

Further, according to the embodiment, the predetermined application condition of the BDOF may include a condition in which a BDOF based inter prediction is enabled, a condition in which a bi-prediction performed based on the L0 reference picture and the L1 reference picture is applied to the current block, a condition in which the value of bi-prediction weight index information of the current block is 0, a condition in which the affine mode is not applied to the current block, a condition in which the subblock based merge mode is not applied to the current block, a condition in which the current block is the luma component, etc.

In other words, the application condition of the BDOF may be determined to include at least one of the conditions and the BDOF flag information may be derived based on the determined BDOF application condition. In this case, when the BDOF application condition is determined to include one or more conditions, if all of the predetermined BDOF application conditions are satisfied, the encoding apparatus derives the value of the BDOF flag information to true or 1 to determine that the BDOF is applied to the current block. Otherwise, if even any of the predetermined application conditions of the BDOF is not satisfied, the value of the BDOF flag information may be derived as false or 0.

Here, in deriving the BDOF flag information, the listed BDOF application conditions are just examples and the conditions of Tables 2 to 42 described above may be used in various combinations.

When the BDOF flag information indicates that the BDOF is applied to the current block (for example, when the BDOF flag information is derived as the true or 1 value), the encoding apparatus may derive the prediction samples by applying the BDOF to the current block.

As an embodiment, the encoding apparatus may calculate a first gradient for L0 prediction samples derived based on the refined L0 motion vector and a second gradient for L1 prediction samples derived based on the refined L1 motion vector. In addition, the encoding apparatus may finally derive the prediction samples for the current block based on the L0 prediction samples, the L1 prediction samples, the first gradient, and the second gradient. As one example, the calculation such as Equations 1 to 6 described above may be used for the process of deriving the prediction samples by applying the BDOF.

The encoding apparatus may derive the residual samples for the current block based on the prediction samples (S1440) and encode image information including information on the residual samples (S1450).

In other words, the encoding apparatus may derive the residual samples based on original samples for the current block and the prediction samples of the current block. In addition, the encoding apparatus may generate the information on the residual samples. Here, the information on the residual samples may include information such as value information, positional information, a transform technique, a transform kernel, a quantization parameter, etc for quantized transform coefficients derived by performing transform and quantization for the residual samples.

The encoding apparatus may encode the information on the residual samples and output the encoded information as the bitstream and transmit the output bitstream to the decoding apparatus through a network, or a storage medium.

Further, the encoding apparatus may encode the image information derived in steps S1400 to S1450 described above and output the encoded image information as the bitstream. For example, the merge flag information, the merge index information, the L0 reference picture index, the L1 reference picture index, the L0 luma weight prediction flag information, the L1 luma weight prediction flag information, the bi-prediction weight index information, etc., may be included in the image information and encoded and the encoded image information may be signaled to the decoding apparatus.

Figure 15:
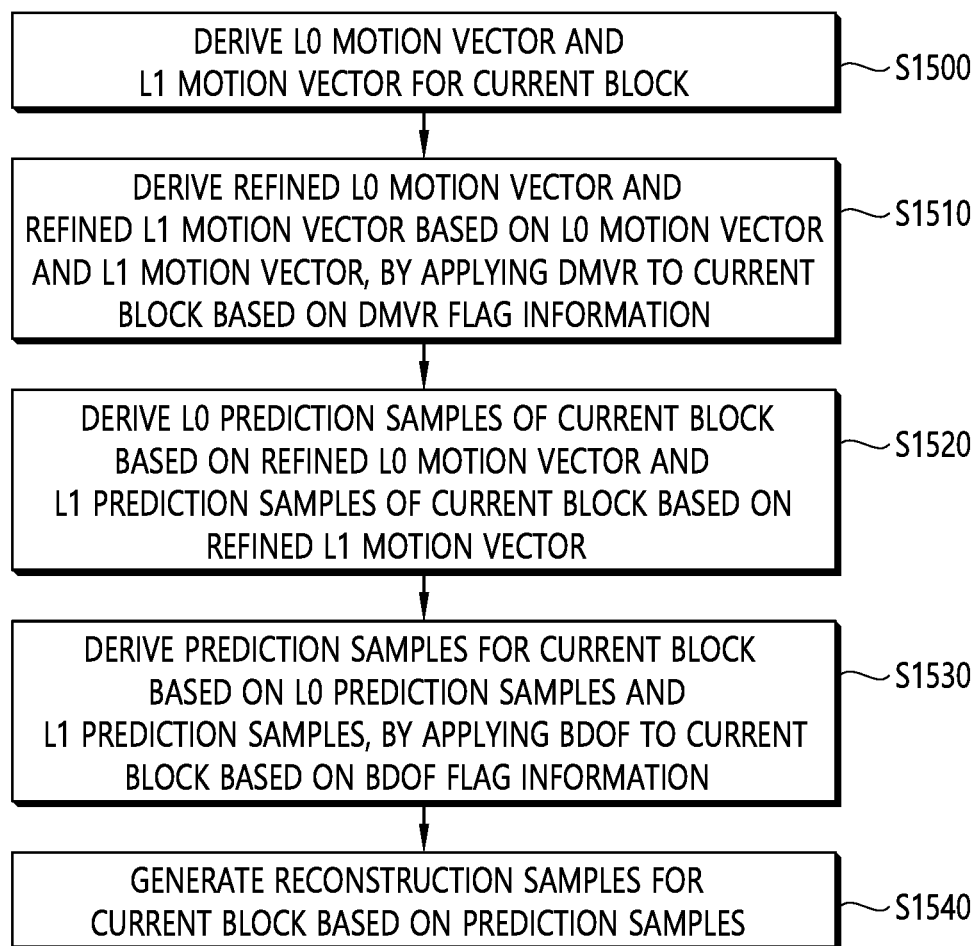
FIG. 15 is a flowchart schematically showing a decoding method which may be performed by a decoding apparatus according to an embodiment of the present disclosure.

FIG. 15 is a flowchart schematically showing a decoding method which may be performed by a decoding apparatus according to an embodiment of the present disclosure.

The method disclosed in FIG. 15 may be performed by the decoding apparatus 300 disclosed in FIG. 3. Specifically, steps S1500 to S1530 of FIG. 15 may be performed by the predictor 330 and the inter predictor 332 disclosed in FIG. 3 and step S1540 of FIG. 15 may be performed by the adder 340 disclosed in FIG. 3. Further, the method disclosed in FIG. 15 may include the embodiments described above in the present disclosure. Accordingly, in FIG. 15, detailed description of the duplicated contents with the embodiments will be omitted or simplified.

Referring to FIG. 15, the decoding apparatus may derive an L0 motion vector and an L1 motion vector of the current block (S1500).

The method disclosed in FIG. 15 may be performed by the decoding apparatus 300 disclosed in FIG. 3. Specifically, steps S1500 to S1530 of FIG. 15 may be performed by the predictor 330 and the inter predictor 332 disclosed in FIG. 3 and step S1540 of FIG. 15 may be performed by the adder 340 disclosed in FIG. 3. Further, the method disclosed in FIG. 15 may include the embodiments described above in the present disclosure. Accordingly, in FIG. 15, detailed description of the duplicated contents with the embodiments will be omitted or simplified.

Referring to FIG. 15, the decoding apparatus may derive the L0 motion vector and the L1 motion vector of the current block (S1500).

As an embodiment, the decoding apparatus may determine the prediction mode for the current block based on the prediction information signaled from the encoding apparatus. However, the decoding apparatus may derive the motion information (motion vector, reference picture index, etc.) of the current block based on the prediction mode. Here, the prediction mode may include a skip mode, a merge mode, an (A)MVP mode, etc.

For example, when the merge mode is applied to the current block, the decoding apparatus may configure the merge candidate list based on the neighboring blocks of the current block and select one merge candidate among the merge candidates included in the merge candidate list. In this case, one merge candidate may be selected in the merge candidate list based on the merge index information. The decoding apparatus may derive the motion information of the current block by using the motion information of the selected merge candidate. In other words, the motion information of the merge candidate selected by the merge index among the merge candidates included in the merge candidate list may be used as the motion information of the current block.

Here, the motion information may include information such as the motion vector, the reference picture index, etc., and include L0 motion information and/or L1 motion information according to the inter-prediction type (L0 prediction, L1 prediction, Bi prediction, etc.). When the bi-prediction is applied to the current block, the motion information may include an L0-direction motion vector (L0 motion vector) and an L1-direction motion vector (L1 motion vector). Further, the motion information may include an L0 reference picture index and an L0 reference picture indicated by the L0 reference picture index in an L0 reference picture list and an L1 reference picture index and an L1 reference picture indicated by the L1 reference picture index in an L1 reference picture list.

In other words, the decoding apparatus may determine whether the merge mode is applied to the current block based on prediction mode information (e.g., merge flag (merge_flag) indicating whether the prediction mode is the merge mode) of the current block. When the merge mode is applied to the current block based on the merge flag, the decoding apparatus may obtain the merge index information. In addition, the decoding apparatus may derive the L0 motion vector and the L1 motion vector of the neighboring block indicated by the merge index information among the neighboring blocks included in the merge candidate list and use the derived L0 and L1 motion vectors as the L0 and L1 motion vectors of the current block.

The decoding apparatus applies the DMVR to the current block based on DMVR flag information indicating whether to apply the DMVR to the current block to derive a refined L0 motion vector and a refined L1 motion vector based on the L0 motion vector and the L1 motion vector (S1510).

In this case, the decoding apparatus may determine whether to apply the DMVR to the current block by considering coding efficiency, complexity, prediction performance, etc. In other words, the decoding apparatus may apply the DMVR to the current block based on whether a predetermined application condition of the DMVR is satisfied for the current block. Here, the predetermined application condition of the DMVR may be constituted by some (or all) or specific combinations of various application conditions described in Tables 2 to 42 above. Further, the decoding apparatus may derive the DMVR flag information according to whether the predetermined application condition of the DMVR is satisfied. The DMVR flag information may be information (e.g., dmvrFlag described above) indicating whether to apply the DMVR to the current block.

As an embodiment, the predetermined application condition of the DMVR may include a condition in which values of both L0 luma weight prediction flag information and L1 luma weight prediction flag information are 0.

In this case, when a case where the values of both the L0 luma weight prediction flag information (e.g., luma_weight_l0_flag) and the L1 luma weight prediction flag information (e.g., luma_weight_l1_flag) are 0 is satisfied, the decoding apparatus may derive the DMVR flag information to the value indicating that the DMVR is applied to the current block. For example, when both luma_weight_l0_flag and luma_weight_l1_flag are 0, the DMVR flag information may be derived with the value (e.g., 1 or true) indicating that the DMVR is applied to the current block. Otherwise, the DMVR flag information may be derived as the value (e.g., 0 or false) indicating that the DMVR is not applied to the current block.

Here, the L0 luma weight prediction flag information may be information indicating whether the weight factor of the L0 prediction for the luma component of the current block presents and the L1 luma weight prediction flag information may be information indicating whether the weight factor of the L1 prediction for the luma component of the current block presents. For example, the case where the L0 luma weight prediction flag information may indicate that the weight factor does not present for the luma component of the L0 prediction and the case where the L0 luma weight prediction flag information is 1 may indicate that the weight factor presents for the luma component of the L0 prediction. For example, the case where the value of the L1 luma weight prediction flag information is 0 may indicate that the weight factor does not present for the luma component of the L1 prediction and the case where the value of the L1 luma weight prediction flag information is 1 may indicate that the weight factor presents for the luma component of the L1 prediction.

Further, as an embodiment, the predetermined application condition of the DMVR may include a condition in which the value of bi-prediction weight index information of the current block is 0.

In this case, when the value of the bi-prediction weight index information (e.g., GbiIdx) is 0, the decoding apparatus may derive the DMVR flag information to the value indicating that the DMVR is applied to the current block. For example, when GbiIdx is 0, the DMVR flag information may be derived as the value (e.g., 1 or true) indicating that the DMVR is applied to the current block. Otherwise, the DMVR flag information may be derived as a value (e.g., 0 or false) indicating that the DMVR is not applied to the current block.

Here, the case where the value of the bi-prediction weight index (e.g., GbiIdx) is 0 may be a default case in which different weights are not applied to the L0 prediction and the L1 prediction. As one example, as shown in Table 4 above, the case where the value of the bi-prediction weight index information is 0 may be a case where the ½ weight is applied to each of the L0 prediction and the L1 prediction.

Further, as an embodiment, the predetermined application condition of the DMVR may include a condition in which a prediction mode (CIIP mode) in which the inter prediction and the intra prediction are combined is not applied to the current block.

In this case, when the case where the prediction mode in which the inter prediction and the intra prediction are combined is not applied to the current block (e.g., the case where ciip_flag is 0) is satisfied, the decoding apparatus may derive the DMVR flag information to the value indicating that the DMVR is applied to the current block. For example, when ciip_flag is 0, the DMVR flag information may be derived as the value (e.g., 1 or true) indicating that the DMVR is applied to the current block. When ciip_flag is 1, the DMVR flag information may be derived as the value (e.g., 0 or false) indicating that the DMVR is not applied to the current block.

Further, as an embodiment, the predetermined application condition of the DMVR may include a condition in which the size of the current block is equal to or larger than 16×16. In other words, the predetermined application condition may mean a case where the height of the current block is equal to or larger than 16 and the width of the current block is equal to or larger than 16.

In this case, when the case where the size of the current block is equal to or larger than 16×16 is satisfied, the decoding apparatus may derive the DMVR flag information to the value indicating that the DMVR is applied to the current block. For example, in the case where the size of the current block is equal to or larger than 16×16, the DMVR flag information may be derived as the value (e.g., 1 or true) indicating that the DMVR is applied to the current block. Otherwise (i.e., in the case where the size of the current block is smaller than 16×16), the DMVR flag information may be derived as the value (e.g., 0 or false) indicating that the DMVR is not applied to the current block.

Further, according to an embodiment, the predetermined application condition of the DMVR may include a condition in which DMVR based inter bi-prediction is enabled, a condition in which bi-prediction performed based on the L0 reference picture and the L1 reference picture is applied to the current block, a condition in which a first picture order count (POC) difference between the current picture and the L0 reference picture and a second POC difference between the current picture and the L1 reference picture are the same as each other, a condition in which the merge mode is applied to the current block, a condition in which a merge mode with motion vector difference (MMVD) mode is not applied to the current block, etc.

In other words, the application condition of the DMVR may be determined to include at least one of the conditions and the DMVR flag information may be derived based on the determined DMVR application condition. In this case, when the DMVR application condition is determined to include one or more conditions, if all of the predetermined DMVR application conditions are satisfied, the decoding apparatus derives the value of the DMVR flag information to true or 1 to determine that the DMVR is applied to the current block. Otherwise, if even any of the predetermined application conditions of the DMVR is not satisfied, the value of the DMVR flag information may be derived as false or 0.

Here, in deriving the DMVR flag information, the listed DMVR application conditions are just examples and the conditions of Tables 2 to 42 described above may be used in various combinations.

When the DMVR flag information indicates that the DMVR is applied to the current block (for example, when the DMVR flag information is derived as the true or 1 value), the decoding apparatus applies the DMVR to the current block to derive the refined L0 motion vector and the refined L1 motion vector based on the L0 motion vector and the L1 motion vector.

As an embodiment, the decoding apparatus a minimum sum of absolute differences (SAD) by using reference samples in the L0 reference picture derived based on the L0 motion vector and reference samples in the L1 reference picture derived based on the L1 motion vector. In addition, the decoding apparatus may derive the refined L0 motion vector for the L0 motion vector and the refined L1 motion vector for the L1 motion vector based on a sample position corresponding to the minimum SAD.

Here, the L0 reference picture is a reference picture indicated by the L0 reference picture index among the reference pictures included in the L0 reference picture list and the L1 reference picture is a reference picture indicated by the L1 reference picture index among the reference pictures included in the L1 reference picture list.

Further, the refined L0 motion vector may be a motion vector indicating the sample position corresponding to the minimum SAD in the L0 reference picture and the refined L1 motion vector may be a motion vector indicating the sample position corresponding to the minimum SAD in the L1 reference picture. The process of deriving the refined motion vector by applying the DMVR is described in detail in FIGS. 8 and 9, so the description thereof will be omitted herein.

The decoding apparatus may derive L0 prediction samples of the current block based on the refined L0 motion vector and the L1 prediction sample of the current block based on the refined L1 motion vector (S1520).

Here, the L0 prediction samples may be derived based on the reference samples indicated by the refined L0 motion vector in the L0 reference picture and the L1 prediction samples may be derived based on the reference samples indicated by the refined L1 motion vector in the L1 reference picture.

The decoding apparatus may derive the prediction samples for the current block based on the L0 prediction samples and the L1 prediction samples by applying the BDOF to the current block based on BDOF flag information indicating whether to apply the BDOF to the current block (1530).

In this case, in deriving the prediction samples, the decoding apparatus may determine whether to apply the BDOF to the current block by considering coding efficiency, complexity, prediction performance, etc. In other words, the decoding apparatus may apply the BDOF to the current block based on whether a predetermined application condition of the BDOF is satisfied for the current block. Here, the predetermined application condition of the BDOF may be constituted by some (or all) or specific combinations of various application conditions described in Tables 2 to 42 above. Further, the decoding apparatus may derive the BDOF flag information according to whether the predetermined application condition of the BDOF is satisfied. The BDOF flag information may be information (e.g., bdofFlag described above) indicating whether to apply the BDOF to the current block.

As an embodiment, the predetermined application condition of the BDOF may include a condition in which values of both L0 luma weight prediction flag information and L1 luma weight prediction flag information are 0.

In this case, when the case where the values of both the L0 luma weight prediction flag information (e.g., luma_weight_l0_flag) and the L1 luma weight prediction flag information (e.g., luma_weight_l1_flag) are 0 is satisfied, the decoding apparatus may derive the BDOF flag information with a value indicating that the BDOF is applied to the current block. For example, when both luma_weight_l0_flag and luma_weight_l1_flag are 0, the BDOF flag information may be derived as the value (e.g., 1 or true) indicating that the BDOF is applied to the current block. Otherwise, the BDOF flag information may be derived as the value (e.g., 0 or false) indicating that the BDOF is not applied to the current block.

Further, as an embodiment, the predetermined application condition of the BDOF may include a condition in which the size of the current block is equal to or larger than 16×16. In other words, the predetermined application condition may mean a case where the height of the current block is equal to or larger than 16 and the width of the current block is equal to or larger than 16.

In this case, when the case where the size of the current block is equal to or larger than 16×16 is satisfied, the decoding apparatus may derive the BDOF flag information to the value indicating that the BDOF is applied to the current block. For example, in the case where the size of the current block is equal to or larger than 16×16, the BDOF flag information may be derived as the value (e.g., 1 or true) indicating that the BDOF is applied to the current block. Otherwise (i.e., in the case where the size of the current block is smaller than 16×16), the BDOF flag information may be derived as the value (e.g., 0 or false) indicating that the BDOF is not applied to the current block.

Further, as an embodiment, the predetermined application condition of the BDOF may include a condition in which the height of the current block is equal to or larger than 8.

In this case, when the case where the height of the current block is equal to or larger than 8 is satisfied, the decoding apparatus may derive the BDOF flag information to the value indicating that the BDOF is applied to the current block. For example, in the case where the height of the current block is equal to or larger than 8, the BDOF flag information may be derived as the value (e.g., 1 or true) indicating that the BDOF is applied to the current block. Otherwise (i.e., in the case where the height of the current block is smaller than 8), the BDOF flag information may be derived as the value (e.g., 0 or false) indicating that the BDOF is not applied to the current block.

Further, as an embodiment, the predetermined application condition of the BDOF may include a case in which a first picture order count (POC) between the current picture and the L0 reference picture and a second POC difference between the current picture and the L1 reference picture are the same as each other.

In this case, when the case where the first POC difference (e.g., DiffPicOrderCnt(currPic, RefPicList0 [refIdxL0])) and the second POC difference (e.g., DiffPicOrderCnt (currPic, RefPicList1 [refIdxL1])) are the same as each other is satisfied, the decoding apparatus may derive the BDOF flag information to the value indicating that the BDOF is applied to the current block. For example, when DiffPicOrderCnt(currPic, RefPicList0 [refIdxL0])−DiffPicOrderCnt (currPic, RefPicList1 [refIdxL1]) is 0, the BDOF flag information may be derived as the value (e.g., 1 or true) indicating that the BDOF is applied to the current block. Otherwise, the BDOF flag information may be derived as the value (e.g., 0 or false) indicating that the BDOF is not applied to the current block.

Further, as an embodiment, the predetermined application condition of the BDOF may include a condition in which a prediction mode (CIIP mode) in which the inter prediction and the intra prediction are combined is not applied to the current block.

In this case, when the case where the prediction mode in which the inter prediction and the intra prediction are combined is not applied to the current block (e.g., a case where ciip_flag is 0) is satisfied, the decoding apparatus may derive the BDOF flag information to the value indicating that the BDOF is applied to the current block. For example, when ciip_flag is 0, the BDOF flag information may be derived as the value (e.g., 1 or true) indicating that the BDOF is applied to the current block. When ciip_flag is 1, the BDOF flag information may be derived as the value (e.g., 0 or false) indicating that the BDOF is not applied to the current block.

Further, according to the embodiment, the predetermined application condition of the BDOF may include a condition in which a BDOF based inter prediction is enabled, a condition in which a bi-prediction performed based on the L0 reference picture and the L1 reference picture is applied to the current block, a condition in which the value of bi-prediction weight index information of the current block is 0, a condition in which the affine mode is not applied to the current block, a condition in which the subblock based merge mode is not applied to the current block, a condition in which the current block is the luma component, etc.

In other words, the application condition of the BDOF may be determined to include at least one of the conditions and the BDOF flag information may be derived based on the determined BDOF application condition. In this case, when the BDOF application condition is determined to include one or more conditions, if all of the predetermined BDOF application conditions are satisfied, the decoding apparatus derives the value of the BDOF flag information to true or 1 to determine that the BDOF is applied to the current block. Otherwise, if even any of the predetermined application conditions of the BDOF is not satisfied, the value of the BDOF flag information may be derived as false or 0.

Here, in deriving the BDOF flag information, the listed BDOF application conditions are just examples and the conditions of Tables 2 to 42 described above may be used in various combinations.

When the BDOF flag information indicates that the BDOF is applied to the current block (for example, when the BDOF flag information is derived as the true or 1 value), the decoding apparatus may derive the prediction samples by applying the BDOF to the current block.

As an embodiment, the decoding apparatus may calculate a first gradient for L0 prediction samples derived based on the refined L0 motion vector and a second gradient for L1 prediction samples derived based on the refined L1 motion vector. In addition, the decoding apparatus may finally derive the prediction samples for the current block based on the L0 prediction samples, the L1 prediction samples, the first gradient, and the second gradient. As one example, the calculation such as Equations 1 to 6 described above may be used for the process of deriving the prediction samples by applying the BDOF.

The decoding apparatus may generate reconstruction samples for the current block based on the prediction samples (S1540).

As an embodiment, the decoding apparatus may directly use the prediction samples as the reconstruction samples or generate the reconstruction samples by adding the residual samples to the prediction samples.

When there is the residual sample for the current block, the decoding apparatus may receive information on residual for the current block. The information on the residual may include transform coefficients relating to the residual samples. The decoding apparatus may derive the residual samples (or residual sample array) for the current block based on the residual information. The decoding apparatus may generate the reconstruction samples based on the prediction samples and the residual samples and derive the reconstruction block or reconstruction picture based on the reconstruction samples.

In the aforementioned embodiments, although the methods have been described based on the flowcharts in the form of a series of steps or units, the embodiments of the present disclosure are not limited to the order of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of rights of the present disclosure.

The aforementioned method according to the present disclosure may be implemented in a software form, and the encoding apparatus and/or the decoding apparatus according to the present disclosure may be included in an apparatus for performing image processing, for example, TV, a computer, a smartphone, a set-top box or a display device.

In the present disclosure, when embodiments are implemented in a software form, the aforementioned method be implemented as a module (process, function, etc.) for performing the aforementioned function. The module may be stored in the memory and executed by the processor. The memory may be placed inside or outside the processor and connected to the processor by various well-known means. The processor may include application-specific integrated circuits (ASICs), other chipsets, logic circuits and/or data processing devices. The memory may include read-only memory (ROM), random access memory (RAM), flash memory, memory cards, storage media and/or other storage devices. That is, the embodiments described in the present disclosure may be implemented and performed on a processor, a micro processor, a controller or a chip. For example, the function units illustrated in the drawings may be implemented and performed on a computer, a processor, a micro processor, a controller or a chip. In this case, information (e.g., information on instructions) or an algorithm for such implementation may be stored in a digital storage medium.

Furthermore, the decoding apparatus and the encoding apparatus to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blu-ray player, Internet access TV, a home theater system, a smartphone, a tablet PC, and a digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices in which computer-readable data is stored. The computer-readable recording medium may include Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the present disclosure may be implemented as a computer program product using program code. The program code may be performed by a computer according to an embodiment of the present disclosure. The program code may be stored on a carrier readable by a computer.

Figure 16:
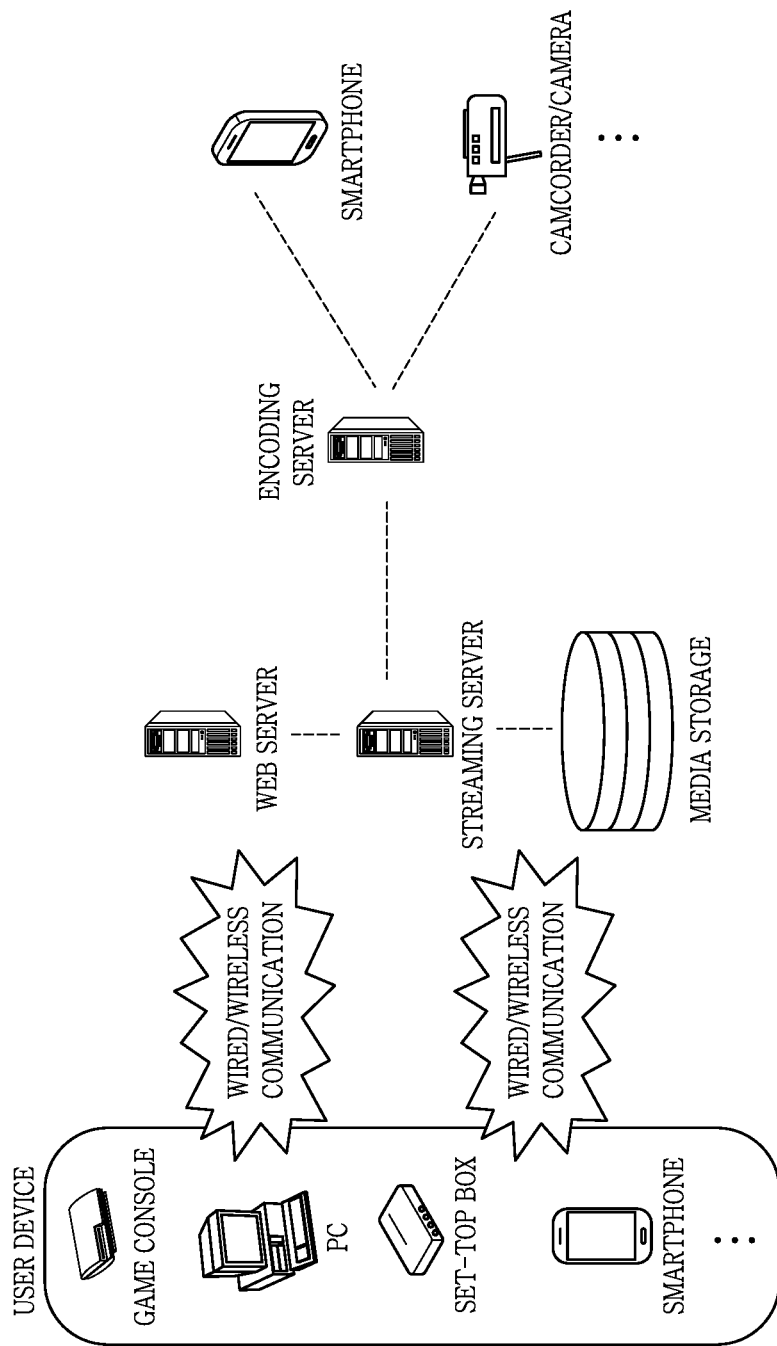
FIG. 16 illustrates one example of a content streaming system to which embodiments disclosed in the present disclosure may be applied.

FIG. 16 illustrates an example of a content streaming system to which embodiments disclosed in the present disclosure may be applied.

Referring to FIG. 16, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

Meanwhile, the decoding apparatus and the encoding apparatus to which the embodiment of the present disclosure is applied may be included in the digital device. The "digital device" includes, for example, all digital devices capable of performing at least one of transmitting, receiving, processing, and outputting data, contents, services, and the like. Here, processing the data, the contents, the service, and the like by the digital device includes an operation of encoding and/or decoding the data, the contents, the service, and the like. The digital device transmits/receives data by paring or connecting (hereinafter, referred to as 'paring') to another digital device, an external server, etc., through a wire/wireless network and converts the data as necessary.

The digital device includes all of a standing device such as a network TV, a Hybrid Broadcast Broadband TV (HBBTV), a Smart TV, an Internet protocol television (IPTV), a Personal Computer (PC), etc., and a mobile device or handheld device such as a Personal Digital Assistant (PDA), a Smartphone, a Tablet PC, a notebook, a VR/AR device, etc., for example. In addition, the digital device may include a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing devices, a 3 dimensional (3D) video device, a virtual reality (VR) device, an argument reality (AR) device, a video telephone video device, a transportation means terminal (e.g., a vehicle (including an autonomous vehicle) terminal, an airplane terminal, a ship terminal, etc.), and a medical video device, etc.

Meanwhile, the "wired/wireless network" described in the present disclosure is collectively referred to as a communication network that supports various communication standards or protocols for interconnection or/and data transmission/reception between the digital devices or between the digital device and the external server. The wired/wireless networks may include both communication networks currently supported or to be supported in the future by the standard and communication protocols therefor and may be formed by communication standards or protocols for wired communication, such as Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet Access (HSDPA), Long Term Evolution (LTE), or Wi-Fi Direct, for example.

Hereinafter, in the present disclosure, when being just referred to as the digital device, the digital device may mean the standing device or the mobile device or mean both the standing device and the mobile device.

Meanwhile, the digital device as an intelligent device that supports a broadcast receiving function, a computer function or support, and at least one external input, for example, may support e-mail, web browsing, banking, a game, an application, etc. Moreover, the digital device may include an interface for supporting at least one input or control means (hereinafter, referred to as input means) such as a manual input device, a touch screen, a space remote controller, etc. The digital device may use a standardized universal operating system (OS). For example, the digital device may add, delete, amend, update, etc., various applications on a universal OS kernel and configure, and configure and provide a more user-friendly environment through the addition, deletion, and amendment of various applications.

Meanwhile, the external input described in the present disclosure includes all input means or digital devices which are connected to an external input device, i.e., the digital device wiredly/wirelessly to transmit/receive related data through the wired/wireless connection and process the transmitted/received data. Here, the external input includes all digital devices such as a High Definition Multimedia Interface (HDMI), a game device such as a play station or an X-box, a smartphone, a tablet PC, a printer device, and a smart TV, for example.

Further, the "server" described in the present disclosure as a meaning including all digital devices or systems supplying data to a client [0034], i.e., the digital device is also referred to as a processor. The server may include a portal server providing a webpage or a web content, an advertising server providing advertising data, a content server providing a content, an SNS server providing a social network service (SNS), a service server or manufacturing server provided by a manufacturer, and the like, for example.

Besides, the "channel" described in the present disclosure which means a path, a means, and the like for transmitting/receiving data and a broadcasting channel may be taken as an example of the "channel". Here, the broadcasting channel is expressed as a term such as a physical channel, a virtual channel, a logical channel, etc., according to activation of digital broadcasting. The broadcasting channel may be referred to as a broadcasting network. As such, the broadcasting channel refers to a channel for providing a broadcasting content provided by a broadcasting station or accessing the broadcasting content by a receiver and since the broadcasting content which is primarily based on real-time broadcasting, the broadcasting channel is also referred to as a live channel. However, in recent years, a medium for broadcasting is further diversified and non-real time broadcasting is also activated in addition to the real-time broadcasting, and as a result, the live channel may be just appreciated as a term meaning the entirety of the broadcasting channel including the non-real time broadcasting in some cases in addition to the real-time broadcasting.

In the present disclosure, in addition to the broadcasting channel, an "arbitrary channel" is further defined in association with the channel. The arbitrary channel may be provided together with a service guide such as an Electronic Program Guide (EPG) together with the broadcasting channel and the service guide, a Graphic User Interface (GUI), or an On-Screen Display OSD) screen may be configured/provided only with the arbitrary channel.

Meanwhile, unlike a broadcasting channel having a channel number pre-promised between a transmitter and a receiver, the arbitrary channel is a channel arbitrarily allocated by the receiver and a channel number which is not basically duplicated with a channel number for expressing the broadcasting channel is allocated to the arbitrary channel. For example, when a specific broadcasting channel is tuned, the receiver receives the broadcasting content and a broadcasting signal for transmitting signaling information for the broadcasting content through the tuned channel. Here, the receiver parses channel information from the signaling information, and configures a channel browser, EPG, etc., based on the parsed channel information and provides the configured channel browser, EPG, etc., to a user. When the user makes a channel switch request through an input means, the receiver is a scheme to respond to the channel switch request.

As such, since the broadcasting channel is contents pre-promised between the transmitter and the receiver, when the arbitrary channel is allocated duplicatively with the broadcasting channel, a confusion of the user is caused or there is a confusion possibility, and as a result, it is preferable not to duplicatively allocate the channel as described above. Meanwhile, since there is still a possibility of the confusion in a channel surfing process of the user even though the arbitrary channel number is not duplicatively allocated with the broadcasting channel as described above, allocating the arbitrary channel number by considering the confusion possibility is required. The reason is that the arbitrary channel according to the embodiment of the present disclosure may also be implemented to be accessed like the broadcasting channel similarly in response to the channel switch request of the user through the input means similarly to the conventional broadcasting channel. Accordingly, the arbitrary channel number may be defined and represented as a form with characters such as arbitrary channel-1, arbitrary channel-2, etc., rather than a number form like the broadcasting channel for convenience of an access to the arbitrary channel and convenience of distinguishment or identification from the broadcasting channel number. Meanwhile, in this case, even though the representation of the arbitrary channel number may be the form with the characters such as arbitrary channel-1, the arbitrary channel number may be recognized and implemented as the number form such as the number of the broadcasting channel internally in the receiver. Besides, the arbitrary channel number may be provided as the number form like the broadcasting channel and the channel number may be defined and represented by various schemes which may be distinguished from the broadcasting channel, such as video content channel-1, title-1, video-1, etc.

The digital device executes a web browser for a web service to provide various forms of web pages to the user. Here, the web page also includes a web page including a video content and in the embodiment of the present disclosure, the video content is separated and processed separately or independently from the web page. In addition, the arbitrary channel number may be allocated to the separated video content and the separated video content may be provided through the service guide and the user may implement the separated video content to be output according to the channel switch request in the service guide or a broadcasting channel viewing process. Besides, even for the service such as the broadcasting content, the game, the application, etc., in addition to the web service, a predetermined content, an image, an audio, an item, etc., may be separated and processed independently from the broadcasting content, the game, or the application itself and the arbitrary channel number may be allocated for reproduction, processing, etc., and implemented as described above.

Figure 17:
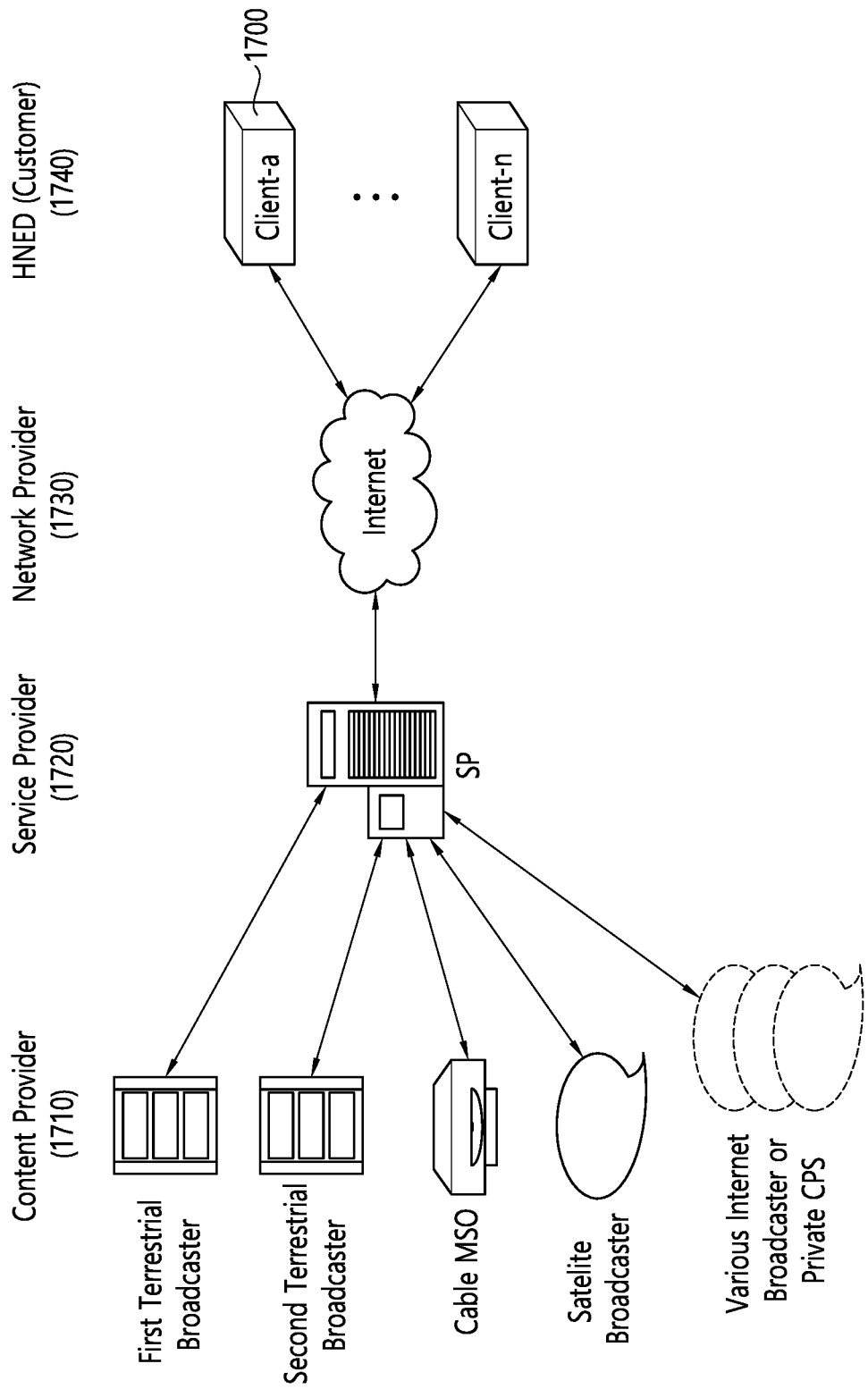
FIG. 17 is a diagram schematically illustrating one example of a service system including a digital device.

FIG. 17 is a diagram schematically illustrating one example of a service system including a digital device.

The service system including the digital device includes a content provider (CP) 1710, a service provider (SP) 1720, a network provider (NP) 1730, and a home network end user (HNED) 1740. Here, the HNED 1740 is, for example, a client 1700, i.e., the digital device. The content provider 1710 produces and provides various contents. As illustrated in FIG. 17, as the content provider 1710, a terrestrial broadcaster, a cable system operator (SO) or multiple system operators (SO), a satellite broadcaster, various Internet broadcasters, private content providers (CPs), etc., may be exemplified. Meanwhile, the content provider 1710 provides various applications, etc., in addition to the broadcasting content.

The service provider 1720 service-packages the content provided by the content provider 1710 and provides the content to the HNED 1740. For example, the service provider 1720 of FIG. 17 packages and provides a first terrestrial broadcast, a second terrestrial broadcast, the cable MSO, a satellite broadcast, various Internet broadcasts, applications, etc., to the HNED 1740.

The service provider 1720 provides the service to the client 1700 by a uni-cast or multi-cast scheme. Meanwhile, the service provider 1720 may transmit data to multiple pre-registered clients 1700 at once and to this end, the service provider 1720 may use an Internet Group Management Protocol (IGMP), etc.

The content provider 1710 and the service provider 1720 may be the same or single entity. For example, the content provided by the content provider 1710 is service-packaged and provided to the HNED 1740 and a function of the service provider 1720 may be also performed together or vice versa.

The network provider 1730 provides a network for data exchange between the content provider 1710 or/and the service provider 1720 and the client 1700.

The client 1700 may transmit/receive data by constructing a home network.

Meanwhile, the content provider 1710 or/and the service provider 1720 in the service system may use a conditional access or content protection means for protection of the transmitted content. In this case, the client 1700 may use a processing means such as a cable card (point of deployment (POD)), downloadable CAS (DCAS), etc., in response to the conditional access or content protection.

Besides, the client 1700 may use an interactive service through the network (or communication network). In this case, the client 1700 may still perform the function of the content provider and the conventional service provider 1720 may receive the function and transmit the received function to the client again.

Figure 18:
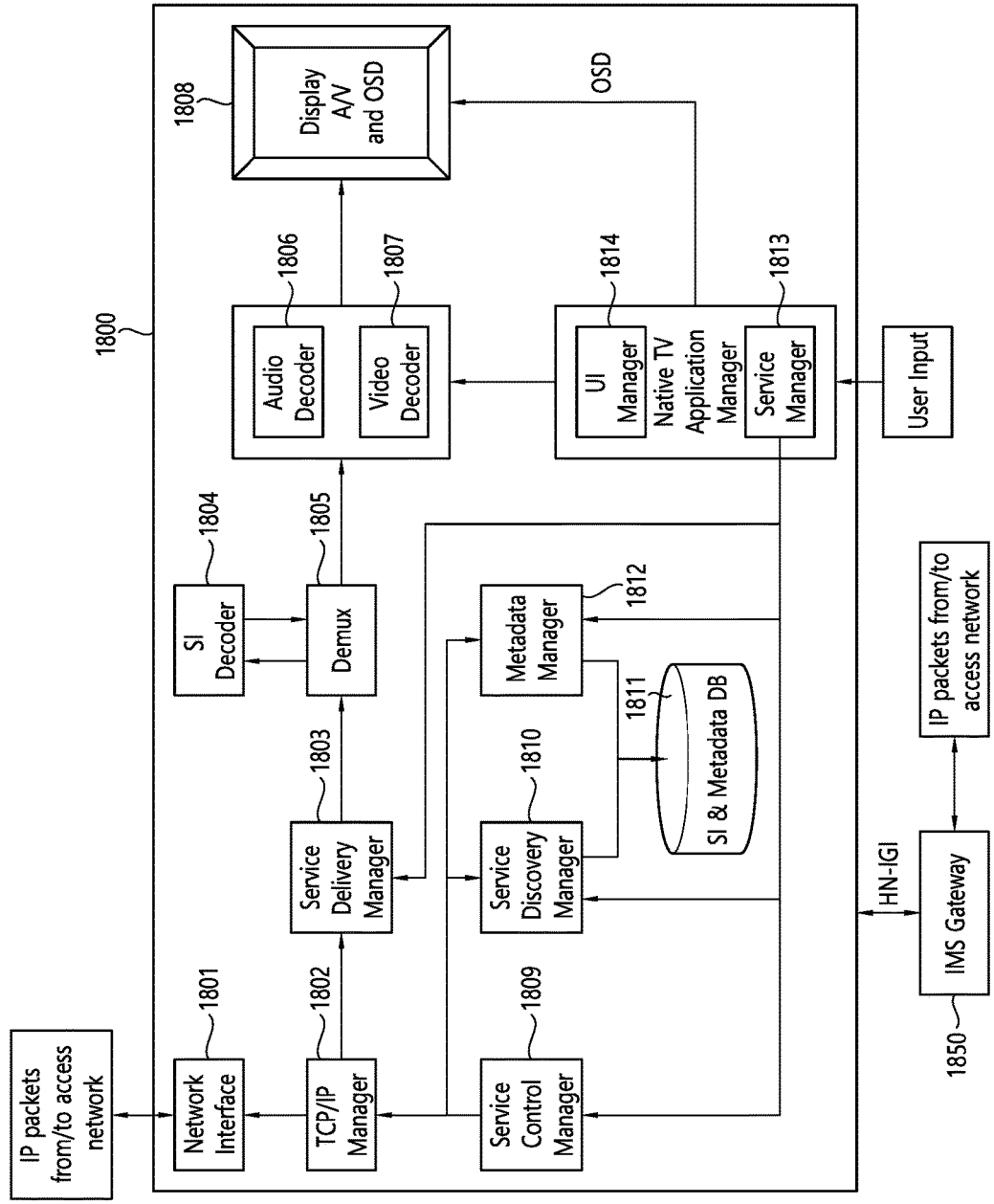
FIG. 18 is a block diagram illustrated for describing one embodiment of a digital device.

FIG. 18 is a block diagram illustrated for describing one embodiment of a digital device. Here, FIG. 18 may correspond to the client 1700 of FIG. 17 and means the digital device.

The digital device 1800 is configured to include a Network Interface 1801, a TCP/IP Manager 1802, a Service Delivery Manager 1803, an SI decoder 1804, a Demux 1805, an Audio Decoder 1806, a Video Decoder 1807, a Display A/V and OSD Module 1808, a Service Control Manager 1809, a Service Discovery Manager 1810, an SI & Metadata DB 1811, a Metadata Manager 1812, a service manager 1813, a UI manager 1814, and the like.

The network interface 1801 receives or transmits Internet protocol (IP) packets through the network. In other words, the network interface 1801 receives the service, the content, etc., from the service provider 1720 through the network.

The TCP/IP manager 1802 takes part in delivering IP packets received by the digital device 1800 and IP packets transmitted by the digital device 1800, i.e., packets between a source and a destination. In addition, the TCP/IP manager 1802 classifies the received packet(s) to correspond to an appropriate protocol and outputs the classified packet(s) to the service delivery manager 1805, the service discovery manager 1810, the service control manager 1809, the metadata manager 1812, etc. The service delivery manager 1803 is responsible for the control of the received service data. For example, the service delivery manager 1803 may use an RTP/RTCP when controlling real-time streaming data. When transmitting the real-time streaming data by using the RTP, the service delivery manager 1803 parses the received data packet according to the RTP and transmits the parsed data packet to the DEMUX 1805 or store the transmitted data packet in the SI & metadata database 1811 according to the control of the service manager 1813. In addition, the service delivery manager 1803 feeds back the network reception information to a server providing the service by using the RTCP. The DEMUX 1805 demultiplexes the received packet to audio, video, system information (SI) data, etc., and transmits the audio, video, system information (SI) data, etc., to the audio/video decoder 1806/1807 and the SI decoder 1804, respectively.

The SI decoder 1804 decodes service information such as Program Specific Information (PSI), Program and System Information Protocol (PSIP), Digital Video Broadcasting-Service Information (DVB-SI), etc., for example.

Further, the SI decoder 1804 stores the decoded service information, for example, in the SI & metadata database 1811. The stored service information may be read and used by the corresponding configuration by a request of the user, etc., for example.

The audio/video decoder 1806/1807 decodes each audio data and video data demultiplexed by the DEMUX 1805. The decoded audio data and video data are provided to the user through the display 1808.

The application manager may be configured to include the UI manager 1814 and the service manager 1813, for example. The application manager may manage an overall state of the digital device 1800 and provide a user interface, and manage another manager.

The UI manager 1814 provides the Graphic User Interface (GUI) for the user by using the On Screen Display (OSD) and receives a key input from the user and performs a device operation depending on the input. For example, when the UI manager 1814 receives the key input for channel selection from the user, the UI manager 1814 transmits the key input signal to the service manager 1813.

The service manager 1813 controls a manager associated with the service, such as the service delivery manager 1803, the service discovery manager 1810, the service control manager 1809, the metadata manager 1812, etc.

Further, the service manager 1813 creates a channel map and selects the channel by using the channel map according to the key input received from the user interface manager 1814. In addition, the service manager 1813 receives the service information of the channel from the SI decoder 1804 and sets an audio/video packet identifier (PID) of the selected channel to the DEMUX 1805. The set PID is used for the demultiplexing process. Accordingly, the DEMUX 1805 filters audio data, video data, and SI data by using the PID.

The service discovery manager 1810 provides information required for selecting a service provider providing the service. When receiving a signal for the channel selection from the service manager 1813, the service discovery manager 1810 finds the service by using the information.

The service control manager 1809 is responsible for selecting and controlling the service. For example, when the user selects a live broadcasting service such as the conventional broadcasting scheme, the service control manager 1809 uses the IGMP or RTSP and when the user selects a service such as Video on Demand (VOD), the service control manager 1809 performs the selection and the control of the service by using the RTSP. The RTSP may provide a trick mode for real-time streaming. Further, the service control manager 209 may initialize and manage a session through an IMS gateway 1850 by using an IP Multimedia Subsystem (IMS) and a Session Initiation Protocol (SIP). The protocols may be an embodiment and another protocol may be used according to an implementation example.

The metadata manager 1812 manages metadata associated with the service and stores the metadata in the SI & metadata database 1811.

The SI & metadata database 1811 stores the service information decoded by the SI decoder 1804, metadata managed by the metadata manager 1812, and information required for selecting the service provider provided by the service discovery manager 1810. Further, the SI & metadata database 1811 may store set-up data for the system, etc.

The SI & metadata database 1811 may be implemented by using a non-volatile RAM (NVRAM) or a flash memory.

Meanwhile, the IMS gateway 1850 is a gateway that collects functions required for accessing an IMS based IPTV service.

Figure 19:
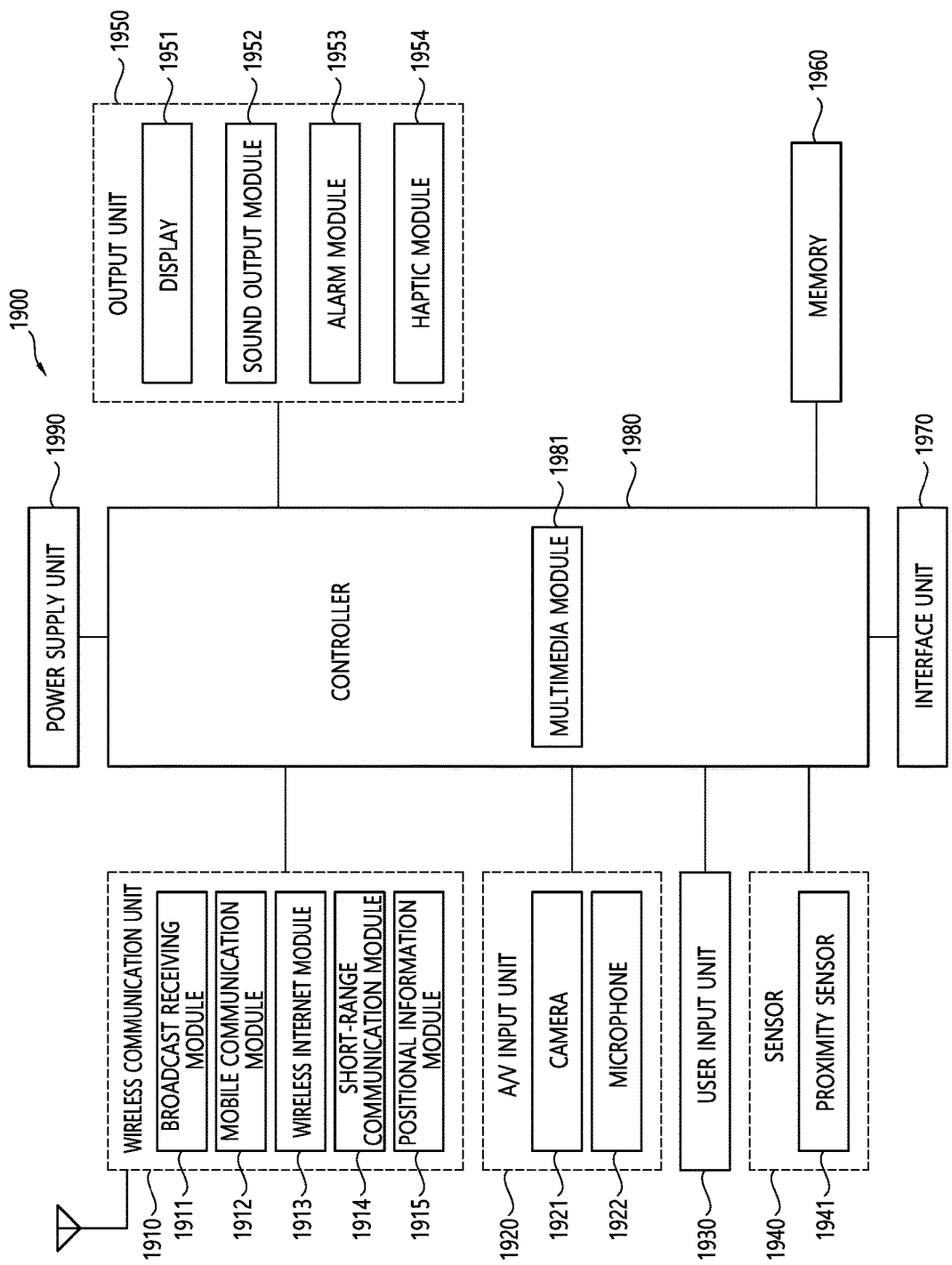
FIG. 19 is a block diagram illustrated for describing another embodiment of a digital device.

FIG. 19 is a block diagram illustrated for describing another embodiment of a digital device. In particular, FIG. 19 is a block diagram of a mobile device as another embodiment of the digital device.

Referring to FIG. 19, the mobile device 1900 may include a wireless communication unit 1910, an audio/video (A/V) input unit 1920, a user input unit 1930, a sensing unit 1940, an output unit 1950, a memory 1960, an interface unit 1970, a control unit 1980, and a power supply unit 1990. The components illustrated in FIG. 19 are not required. Therefore, a mobile device having more components therethan or less components therethan may be implemented.

The wireless communication unit 1910 may include one or more modules which enable wireless communication between the mobile device 1900 and the wireless communication system or between the mobile device and the network at which the mobile device is positioned. For example, the wireless communication unit 1910 may include a broadcast receiving module 1911, a mobile communication module 1912, a wireless Internet module 1913, a short-range communication module 1914, and a positional information module 1915.

The broadcast receiving module 1911 receives broadcast signals and/or broadcast related information from an external broadcast management server through the broadcasting channel. Here, the broadcasting channel may include a satellite channel and a terrestrial channel. The broadcast management server may be a server for generating and transmitting the broadcast signals and/or broadcast related information or a server for receiving previously generated broadcast signals and/or broadcast related information and transmitting the received broadcast signals and/or broadcast related information to the terminal. The broadcast signals may include a TV broadcast signal, a radio broadcast signal, and a data broadcast signal and include even a broadcast signal of a type in which the data broadcast signal is combined with the TV broadcast signal or the radio broadcast signal.

The broadcast related information may mean information related to the broadcast channel, a broadcast program, or a broadcast service provider. The broadcast related information may be provided even through a mobile communication network. In this case, the broadcast related information may be received by the mobile communication module 1912.

The broadcast related information may exist as various forms, e.g., a form such as Electronic Program Guide (EPG) or Electronic Service Guide (ESG).

For example, the broadcast receiving module 1911 may receive a digital broadcast signal by using a digital broadcasting system such as ATSC, Digital Video Broadcasting-Terrestrial (DVB-T), DVB-S (satellite), Media Forward Link Only (MediaFLO), DVB-H (handheld), Integrated Services Digital Broadcast-Terrestrial (ISDB-T), etc. Of course, the broadcast receiving module 1911 may be configured to be suitable for other broadcast systems as well as the digital broadcasting system.

The broadcast signal and/or broadcast related information received through the broadcast receiving module 1911 may be stored in the memory 1960.

The mobile communication module 1912 transmits/receives at least one radio signal to at least one of a base station, an external terminal, and a server on a mobile communication network. The radio signal may include various types of data depending on transmitting/receiving a voice signal, a video communication signal, or a text/multimedia message.

The wireless Internet module 1913 may include a module for wireless Internet access and may be internally or externally built in the mobile device 1900. As the wireless Internet technology, wireless LAN (WLAN) (Wi-Fi), wireless broadband (Wibro), world interoperability for microwave access (Wimax), high speed downlink packet access (HSDPA), or the like, may be used.

The short-range communication module 1914 represents a module for short-range communication. As short-range communication technology, Bluetooth, radio frequency identification (RFID), infrared data association (IrDA), ultra wideband (UWB), ZigBee, RS-232, RS-485, or the like may be used.

The positional information module 315 as a module for obtaining positional information of the mobile device 1900 may include a Global Position System (GPS) module as an example.

The A/V input unit 1920 which is used for inputting an audio signal or a video signal may include a camera 1921 and a microphone 1922. The camera 1921 processes an image frame such as a still image or a moving picture obtained by an image sensor in a video call mode or a photographing mode. The processed image frame may be displayed on the display unit 1951.

The images frame processed by the camera 1921 may be stored in the memory 1960 or transmitted to the outside through the wireless connection unit 1910. Two or more cameras 1921 may be provided according to a use environment.

The microphone 1922 receives an external sound signal by a microphone in a call mode or a recording mode, a voice recognition mode, or the like, and processes the received external sound signal as electrical voice data. The processed voice data may be converted into a transmittable form and transmitted to a mobile communication base station through the mobile communication module 1912 in the case of the call mode. Various noise removal algorithms may be implemented in the microphone 1922 to remove noise generated in receiving the external sound signal.

The user input unit 1930 generates input data for the user to control the operation of the terminal. The user input unit 1930 may include a keypad, a dome switch, a touch pad (resistive/capacitive), a jog wheel, a jog switch, and the like.

The sensing unit 1940 generates a sensing signal for an operation control of the mobile device 1900 by sensing a current state of the mobile device 300, such as an opening/closing state of the mobile device 1900, a position of the mobile device 1900, presence of a user contact, an orientation of the mobile device, acceleration/deceleration of the mobile device, etc. For example, when the mobile device 1900 is moved or inclined, the position or a tilt of the mobile device may be sensed. Further, whether the power supply unit 1990 supplies power, whether the interface unit 1970 is combined with the external device, and the like may also be sensed. Meanwhile, the sensing unit 1940 may include a proximity sensor 1941 including near field communication (NFC).

The output unit 1950 which is used for generating an output related with sight, hearing, or touch may include a display 1951, a sound output module 1952, an alarm unit 1953, and a haptic module 1954.

The display 1951 displays (outputs) information processed by the mobile device 1900. For example, when the mobile device is in the call mode, the display 1951 displays a user interface (UI) or graphic user interface (GUI) associated with the call. When the mobile device 1900 is in the video call mode or the photographing mode, the display 1951 displays a photographed or/and received image or UI and GUI.

The display 1951 may include at least one of a liquid crystal display (LCD), a thin film transistor-liquid crystal display (TFT LCD), an organic light-emitting diode (OLED), a flexible display, and a 3D display.

Some displays among them may be configured as a transparent or light transmissive type to view the outside through the displays. This may be called a transparent display and a representative example of the transparent display includes a transparent OLED (TOLED), and the like. A rear structure of the display unit 1951 may also be configured as a light transmission structure. By such a structure, the user may see an object positioned behind a terminal body through a region occupied by the display unit 1951 of the terminal body.

According to an implementation form of the mobile device 1900, two or more displays 1951 may exist. For example, in the mobile device 1900, the plurality of displays may be separated from each other or integrally disposed on one surface, and further, disposed on different surfaces, respectively.

When the display 1951 and a sensor (hereinafter, referred to as 'touch sensor') form a mutual layer structure (hereinafter, referred to as 'touch screen'), the display 1951 may be used as an input apparatus as well as the output apparatus. The touch sensor may take the form of, for example, a touch film, a touch sheet, a touch pad, or the like.

The touch sensor may be configured to convert a change in pressure applied to a specific portion of the display unit 1951 or capacitance generated at the specific portion of the display unit 1951 into an electrical input signal. The touch sensor may be configured to detect touch pressure as well as a touched position and area.

When there is a touch input for the touch sensor, a signal(s) corresponding to the touch input is(are) sent to a touch controller. The touch controller processes the signal(s) and thereafter, transmits data corresponding thereto to the controller 1980. As a result, the controller 1980 may know which region of the display 1951 is touched.

The proximity sensor 1941 may be disposed in an internal area of the mobile device covered by the touch screen or near the touch screen. The proximity sensor refers to a sensor that detects the presence or absence of an object approaching a predetermined detection surface or an object which exists nearby without mechanical contact using electromagnetic field force or infrared rays. The proximity sensor has a longer lifetime and higher utilization than the touch sensor.

Examples of the proximity sensor include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. When the touch screen is a capacitive sensor, the touch screen is configured to detect the proximity of the pointer by a change of an electric field depending on the proximity of the pointer. In this case, the touch screen (touch sensor) may be classified as the proximity sensor.

Hereinafter, for easy description, the act of recognizing that the pointer is positioned on the touch screen while the pointer is not in contact with the touch screen is referred to as "proximity touch" and the act of actually touching the pointer on the screen is referred to as "contact touch". The position where the pointer is proximately touched on the touch screen means a position where the pointer is vertically corresponding to the touch screen when the pointer is touched.

The proximity sensor detects the proximity touch and a proximity touch pattern (e.g., a proximity touch distance, a proximity touch direction, a proximity touch speed, a proximity touch time, a proximity touch position, a proximity touch movement state, and the like). Information corresponding to the sensed proximity touch operation and the proximity touch pattern may be output on the touch screen.

The sound output module 1952 may output audio data received from the wireless communication unit 1910 or stored in the memory 1960 in call signal receiving, the call mode or a recording mode, a voice recognition mode, a broadcast receiving mode, and the like. The sound output module 1952 may also output a sound signal related with a function (e.g., a call signal receiving sound, a message receiving sound, or the like) performed by the mobile device 1900. The sound output module 1952 may include a receiver, a speaker, a buzzer, and the like.

The alarm unit 1953 outputs a signal for notifying occurrence of an event of the mobile device 1900. Examples of the event which occurs in the mobile device include call signal reception, message reception, key signal input, touch input, and the like. The alarm unit 1953 may also output another form other than a video signal or an audio signal, for example, a signal for notifying the occurrence of the event by vibration.

The video signal or the audio signal may be output through the display unit 1951 or the sound output module 1952 so that the display 1951 and the display 1951 and the sound output module 1952 may be classified as a part of the alarm unit 153.

The haptic module 1954 generates various tactile effects that the user may feel. A typical example of the tactile effect generated by the haptic module 1954 is vibration. The intensity and pattern of the vibration generated by the tactile module 1954 is controllable. For example, different vibrations may be combined and output or sequentially output.

In addition to the vibration, the haptic module 1954 may various tactile effects including effects by stimulus including pin arrangement vertically moving with respect to a contact skin surface, spraying force or suction force of the air through an injection port or a suction port, a touch on the skin surface, contact with an electrode, electrostatic force, and the like and an effect of reproducing a cold sensation using a heat absorbing or heatable element.

The haptic module 1954 may be implemented not only to transmit the tactile effect through direct contact but also to allow the user to feel the tactile effect through the muscles of the finger or arm. At least two haptic modules 1954 may be provided according to a configuration aspect of the mobile device 1900.

The memory 1960 may store a program for a motion of the controller 1980 therein and temporarily store input/output data (e.g., a phone book, a message, a still image, a moving picture, or the like) therein. The memory 1960 may store data regarding various patterns of vibrations and sounds output in the touch input on the touch screen.

The memory 1960 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile device 1900 may operate in connection with a web storage performing a storing function of the memory 1960 on the Internet.

The interface unit 1970 serves as a passage with all external devices connected to the mobile device 1900. The interface unit 1970 transmits data from the external device or receives power to deliver power to each component in the mobile device 1900 or transmits data in the mobile device 1900 to the external device. For example, a wireless/wired headset port, an external charger port, a wired/wireless data port, a memory card port, a port connecting a device with an identification module, an audio input/output (I/O) port, a video I/O port, an earphone port, and the like may be included in the interface unit 1970.

The identification module as a chip for storing various information for authenticating use rights of the external device 1900 may include a user identification module (UTM), a subscriber identity module (SIM), a universal subscriber identity module (USIM), and the like. Apparatuses (hereinafter referred to as "identification apparatus") with the identification module may be manufactured in a smart card format. Therefore, the identification apparatus may be connected with the terminal 1900 via the port.

The interface unit 1970 may becomes a passage through which the power from a cradle is supplied to the mobile terminal 1900 when the mobile terminal 1900 is connected to an external cradle or may be a passage through which various command signals input from the cradle by the user are delivered to the mobile terminal. The various command signals or the power input from the cradle may serve as a signal for recognizing that the mobile terminal is correctly mounted on the cradle.

The controller 1980 generally controls all operations of the mobile device. For example, the controller 1980 performs related control and processing for voice call, data communication, video call, etc. The controller 1980 may include a multimedia module 1981 for reproducing multimedia. The multimedia module 1981 may be implemented in the controller 1980 or implemented apart from the controller 1980. The controller 1980, in particular, the multimedia module 1981 may include the encoding apparatus and/or the decoding apparatus.

The controller 1980 may perform pattern recognition processing to recognize a write input or a drawing input performed on the touch screen as a text or an image.

The power supply unit 1990 receives external power and internal power by a control of the controller 1980 to supply power required for operations of respective components.

Various embodiments described herein may be implemented in a computer-readable recording medium or a recording medium readable by a device similar to the computer by using, for example, software, hardware, or a combination thereof.

According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the controller 1980 itself.

According to software implementation, embodiments such as a procedure and a function described in the specification may be implemented by separate software modules. Each of the software modules may perform one or more functions and operations described in the specification. A software code may be implemented by a software application written by an appropriate program language. Here, the software code may be stored in the memory 1960 and executed by the controller 1980.

Figure 20:
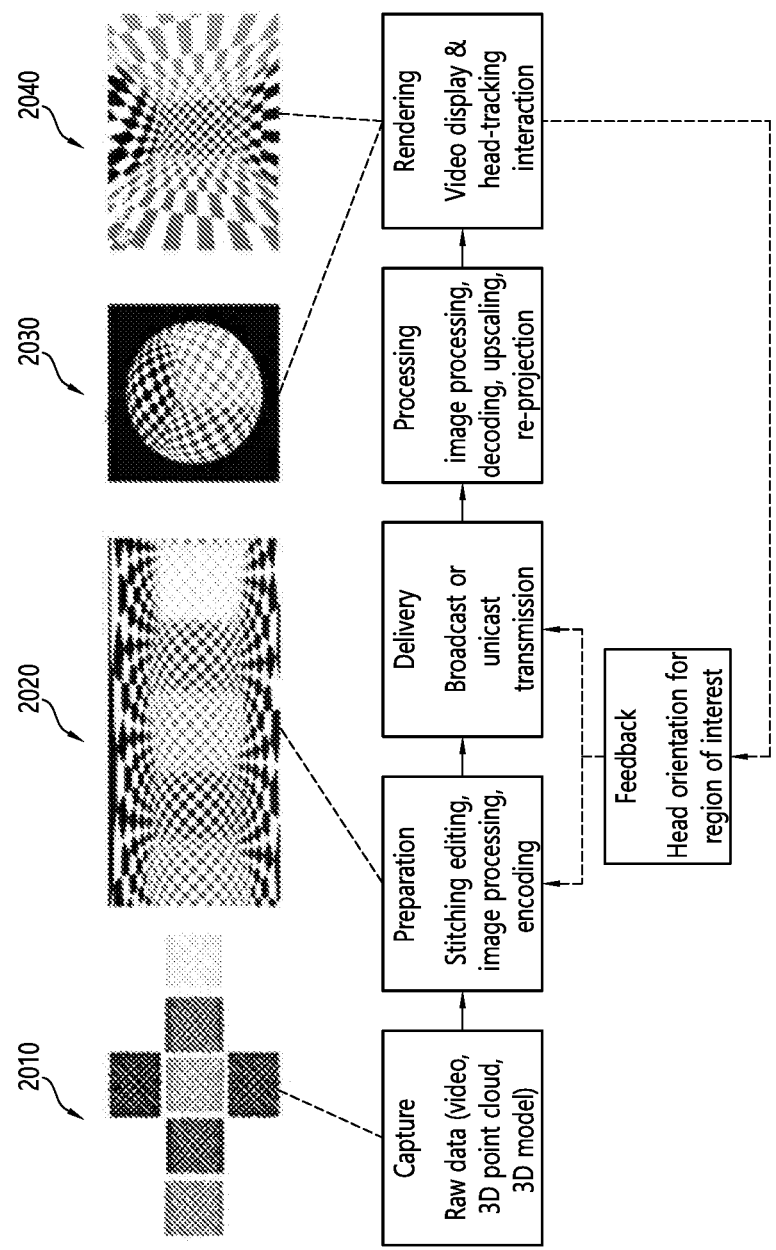
FIG. 20 schematically illustrates an architecture for providing a 3D image/video service in which an embodiment(s) of the present disclosure may be utilized.

FIG. 20 schematically illustrates an architecture for providing a 3D image/video service in which an embodiment(s) of the present disclosure may be utilized. This may represent a 360° or omni-directional video/image processing system. Further, this may be implemented in an extended reality (XR) support device, for example. In other words, the system may provide a method for providing a virtual reality to the user.

Virtual reality (VR), augmented reality (AR), and mixed reality (MR) are collectively referred to as extended reality. VR technology provides objects and backgrounds of a real world only with CG images, AR technology provides a virtually created CG image on a real object image together, and MR technology is a computer graphics technology provided by mixing and combining virtual objects into the real world.

The MR technology is similar to the AR technology in that a real object and a virtual object are shown together. However, the AR technology is different from the MR technology in that in the AR technology, the virtual object is used as a form of complementing the real object, while in the MR technology, the virtual object and the real object are used as an equal nature.

The XR technology may be applied to head-mount display (HMD), head-up display (HUD), a cellular phone, a tablet PC, a laptop, a desktop, a TV, a digital signage, etc., and a device to which the XR technology is applied may be referred to as an XR device. The XR device may include a first digital device and/or a second digital device to be described later.

360° contents may mean all contents for implementing and providing the VR and include 360° video and/or 360° audio. The 360° video may mean video or image contents required for providing the VR and captured or reproduced in all directions (360° or less). Hereinafter, 360° video may mean the 360° video. The 360° audio as audio contents for providing the VR may also mean spatial audio contents in which a sound generation site may be perceived to be located in a 3D specific space. The 360° contents may be generated, processed, and transmitted to users and the users may consume a VR experience by using the 360° contents. The 360° video may be referred to as omni-directional video and the 360° image may be referred to as an omni-directional image. Further, hereinafter, the embodiments will be described based on the 360° video and the embodiment(s) of the present disclosure is(are) not limited to the VR and may include processing of the video/image contents such as AR, MR, etc. The 360° video may mean a video or image represented in various forms of 3D spaces according to a 3D model and for example, the 360° video may be represented on a spherical surface.

This method proposes, in particular, a method for effectively providing the 360° video. In order to provide the 360° video, first, the 360° video may be captured through one or more cameras. The captured 360° video may be transmitted through a series of processes and a receiving side may process received data into original 360° video again and render the 360° video. Therethrough, the 360° video may be provided to the user.

Specifically, all processes for providing the 360° video may include a capture process, a preparation process, a transmission process, a processing process, a rendering process, and/or a feedback process.

The capture process may mean a process of capturing an image or video for each of a plurality of viewpoints through one or more cameras. Image/video data such as reference numeral 2010 of FIG. 20 illustrated may be generated by the capture process. Each plane of reference numeral 2010 of FIG. 20 illustrated may mean an image/video for each viewpoint. The plurality of captured images/videos may be referred to as (raw) data. Metadata related to the capture may be generated during the capture process.

A special camera may be used for the VR may be used for the capture. According to the embodiment, when 360° video for the virtual space created by a computer is intended to be provided, the capture through an actual camera may not be performed. In this case, the capture process may just be replaced with a process of generating related data.

The preparation process may be a process of processing the captured image/video and the metadata generated during the capture process. The captured image/video may be subjected to a stitching process, a projection process, a region-wise packing process, and/or an encoding process during the preparation process.

First, respective images/video may be subjected to the stitching process. The stitching process may be a process of creating one panorama image/video or spherical image/video by connecting the respective captured images/videos.

Thereafter, the stitched image/video may be subjected to the projection process. During the projection process, the stitched image/video may be projected on a 2D image. The 2D image may be referred to as a 2D image frame according to a context. Projection with the 2D image may be expressed as mapping to the 2D image. The projected image/video data may become a form of a 2D image of reference numeral 2020 of FIG. 20 illustrated.

The video data projected on the 2D image may be subjected to the region-wise packing process in order to increase video coding efficiency. The region-wise packing may mean a process of dividing and processing the video data projected on the 2D image for each region. Here, a region may mean an area where the 2D image on which the 360° video data is projected is divided. The regions may be distinguished by equally dividing the 2D image or distinguished by randomly dividing the 2D image according to the embodiment. Further, according to the embodiment, the regions may be distinguished according to a projection scheme. The region-wise process as an optional process may be omitted during the preparation process.

According to the embodiment, the processing process may include a process of rotating each region or rearranging each region on the 2D image in order to increase the video coding efficiency. For example, specific sides of the regions are positioned to be in close proximity to each other by rotating the regions to increase efficiency in coding.

According to the embodiment, the processing process may include a process of increasing or decreasing a resolution for a specific region in order to differentiate the resolution for each area on the 360° video. For example, regions corresponding relative more important regions on the 360° video may have a higher resolution than other regions. The video data projected on the 2D image or the video data packed for each region may be subjected to the encoding process through a video codec.

According to the embodiment, the preparation process may further additionally include an editing process. Edition of image/video data before and after projection may be further performed during the editing process. Similarly even during the preparation process, metadata for stitching/projection/encoding/editing may be generated. Further, metadata regarding an initial time of the video data projected on the 2D image or region of interest (ROI) may be generated.

The transmission process may be a process of processing and transmitting the image/video data and metadata subjected to the preparation process. Processing depending on a random transmission protocol may be performed for transmission. Data of which processing for transmission is completed may be delivered through the broadcasting network and/or broadband. The data may be delivered to the receiving side by the on demand scheme. The receiving side may receive the corresponding data through various paths.

The processing process may mean a process of decoding the received data and re-projecting the projected image/video data on a 3D model. During this process, the image/video data projected on the 2D images may be re-projected on the 3D space. This process may be referred to as mapping or projection according to the context. In this case, the mapped 3D space may have a different form according to the 3D model. For example, the 3D model may have sphere, cube, cylinder, or pyramid.

According to the embodiment, the processing process may further additionally include the editing process, an up scaling process, and the like. Edition of the image/video data before and after re-projection may be further performed during the editing process. When the image/video data is reduced, the size of the image/video data may be enlarged through up scaling of samples during the up scaling process. If necessary, an operation of reducing the size through down scaling may be performed.

The rendering process may mean a process of rending and displaying the image/video data re-projected on the 3D space. According to the expression, re-projection and rendering are combined to be expressed as rendering on the 3D model. The image/video re-projected on the 3D model (or rendered on the 3D mode) may have a form such as reference numeral 2030 of FIG. 20 illustrated. Reference numeral 2030 of FIG. 20 illustrated represents a case in which the image/video is re-projected to a spherical 3D model. The user may view a partial area of the rendered image/video through a VR display, etc. In this case, the area viewed by the user may have a form such as reference numeral 2040 of FIG. 20 illustrated.

The feedback process may mean a process of delivering various feedback information which may be obtained during the display process to a transmitting side. Interactivity may be provided in consuming the 360° video through the feedback process. According to the embodiment, head orientation information, viewport information indicating an area currently viewed by the user, and the like may be delivered to the transmitting side during the feedback process. According to the embodiment, the user may interact with those implemented in a VR environment and in this case, information related to the interaction may be delivered to the transmitting side or the service provider during the feedback process. According to the embodiment, the feedback process may not be performed.

The head orientation information may mean information on a head, a position, an angle, a motion, etc., of the user. Based on the information, information on an area currently viewed in the 360° video by the user, i.e., the viewport information may be calculated.

The viewport information may be on the information on the area currently viewed in the 360° video by the user. Through the information, a Gaze analysis is performed to identify by what method the user consumes the 360° video, at which area of the 360° video the user gazes and how much the user gaze at the area, etc. The gaze analysis may be performed by the receiving side and delivered to the transmitting side through the feedback channel. The apparatus such as the VR display may extract a viewport area based on the head position/direction of the user, vertical or horizontal field of view (FOV) information supported by the apparatus, etc.

Meanwhile, the 360° video/image may be processed based on a sub picture. A projected picture or packed picture including the 2D image may be divided into sub pictures and the processing may be performed in units of the sub picture. For example, a high resolution may be given to a specific sub picture(s) according a user viewport, etc., or only the specific sub picture(s) may be encoded and signaled to the receiving apparatus (decoding apparatus). In this case, the decoding apparatus may receive a sub picture bitstream and reconstructs/decodes the specific sub picture(s), and render the sub picture(s) according to the user viewport.

According to the embodiment, the feedback information may be delivered to the transmitting side and consumed by the receiving side. In other words, the decoding, re-projection, rendering process, etc., of the receiving side may be performed by using the feedback information. For example, only the 360° video for the area currently viewed by the user may be preferentially decoded and rendered by using the head orientation information and/or the viewport information.

Here, the viewport or the viewport area may mean the area viewed in the 360° video by the user. The viewpoint as a point which the user views in the 360° video may mean a dead center of the viewport area. In other words, the viewport may be an area centering the viewpoint and a size, a form, and the like of the area may be determined by the field of view of (FOV).

In an entire architecture for providing the 360° video, image/video data subjected to a series of processes such as the capture/projection/encoding/transmission/decoding/re-projection/rendering may be referred to 360° video data. The term "360° video data" may also be used as a concept including metadata or signaling information related to the image/video data.

In order to store and transmit media data such as the audio or video, a standardized media file format may be defined. According to the embodiment, the media file may have a file format based on an ISO base media file format (BMFF).

Figure 21:
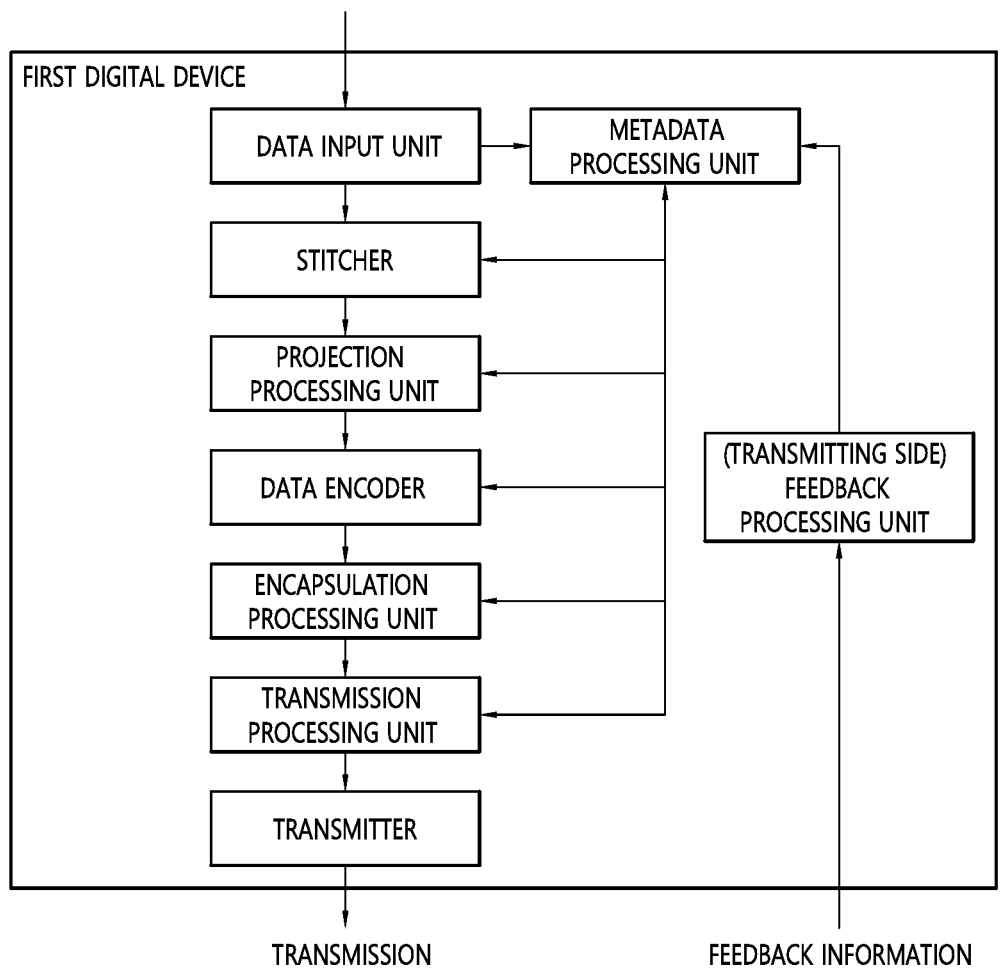
FIG. 21 is a diagram for schematically describing a configuration of a first digital device to which the method may be applied.

FIG. 21 is a diagram for schematically describing a configuration of a first digital device to which the method may be applied. The first digital device may correspond to a transmitting side for providing a 3D image/video service such as the VR/AR contents. The first digital device may include the encoding apparatus described above in the present disclosure. The encoding apparatus may be included in or may correspond to the data encoder.

The first digital device may perform operations related to the preparation process or transmission process. The first digital device may include a data input unit, a stitcher, a projection processing unit, a region-wise packing processing unit (not illustrated), a metadata processing unit, a (transmitting side) feedback processing unit, a data encoder, an encapsulation processing unit, a transmission processing unit, and/or a transmitter as internal/external elements.

The data input unit may receive each viewpoint-wise captured images/videos. The viewpoint-wise images/videos may be images/videos captured by one or more cameras. Further, the data input unit may receive the metadata generated during the capture process. The data input unit may deliver viewpoint-wise input image/videos to the stitcher and deliver the metadata during the capture process to the signaling processing unit.

The stitcher may perform a stitching operation for the viewpoint-wise captured images/videos. The stitcher may deliver stitched 360° video data to the projection processing unit. The stitcher may receive required metadata from the metadata processing unit and use the received metadata for the stitching operation if necessary. The stitcher may deliver the metadata generated during the stitching process to the metadata processing unit. The metadata during the stitching process may include information regarding whether stitching is performed, a stitching type, etc.

The projection processing unit may project the stitched 360° video data on the 2D image. The projection processing unit may perform the projection according to various schemes and this will be described below. The projection processing unit may perform mapping by considering the corresponding depth of the 360° video data for each viewpoint. The projection processing unit may receive required metadata from the metadata processing unit and use the received metadata for the projection operation if necessary. The projection processing unit may deliver the metadata generated during the projection process to the metadata processing unit. The metadata of the projection processing unit may include a type of projection scheme, and the like.

The region-wise packing processing unit (not illustrated) may perform the region-wise packing process. In other words, the region-wise packing processing unit may perform processing such as dividing the projected 360° video data for each region, rotating or rearranging each region, changing the resolution of each region, etc. As described above, the region-wise packing process may be an optional process and when the region-wise packing is not performed, the region-wise packing processing unit may be omitted. The region-wise packing processing unit may receive metadata required for region-wise packing from the metadata processing unit and use the received metadata for the region-wise packing operation if necessary. The region-wise packing processing unit may deliver the metadata generated during the region-wise packing process to the metadata processing unit. The metadata of the region-wise packing processing unit may include a rotation degree, the size, etc., of each region.

The stitcher, the projection processing unit, and/or the region-wise packing processing unit may be performed in one hardware component according to the embodiment.

The metadata processing unit may process the metadata which may be generated during the capture process, the stitching process, the projection process, the region-wise packing process, the encoding process, the encapsulation process, and/or a processing process for transmission. The metadata processing unit may generate 360° video related metadata by using the metadata. According to the embodiment, the metadata processing unit may generate the 360° video related metadata in the form of a signaling table. According to a signaling context, the 360° video related metadata may be referred to as metadata or 360° video related signaling information. Further, the metadata processing unit may deliver obtained or generated metadata to the internal elements of the first digital device as necessary. The metadata processing unit may deliver the 360° video related metadata to the data encoder, the encapsulation processing unit, and/or the transmission processing unit so as to transmit the 360° video related metadata to the receiving side.

The data encoder may encode the 360° video data projected on the 2D image and/or the region-wise packed 360° video data. The 360° video data may be encoded in various formats. The 360° video data projected on the 2D image and/or the region-wise packed 360° video data may correspond to a (2D based) input picture of the encoding apparatus. In this case, one or a series input pictures may be encoded and output as a bitstream form based on the method proposed in the embodiments of the present disclosure. The bitstream may be included in the 360° video data.

The encapsulation processing unit may encapsulate the 360° video data and/or the 360° video related metadata to a form such as a file, etc. Here, the 360° video related metadata may be delivered from the metadata processing unit. The encapsulation processing unit may encapsulate the corresponding data in the file format such as ISOBMFF, CFF, etc., or may be processed in the form of other DASH segment, etc. The encapsulation processing unit may make the 360° video related metadata in the file format according to the embodiment. The 360° video related metadata may be included in various levels of boxes on the ISOBMFF file format or included as data in a separate track in the file, for example. The encapsulation processing unit may encapsulate the 360° video related metadata itself in the file according to the embodiment. The transmission processing unit may perform processing for transmission for the 360° video data encapsulated according to the file format. The transmission processing unit may process the 360° video data according to a random transmission protocol. The processing for transmission may include processing for delivery through the broadcasting network and processing for delivery through the broadband. According to the embodiment, the transmission processing unit may receive the 360° video related metadata from the metadata processing unit in addition to the 360° video data and perform the processing for transmission for the received 360° video related metadata.

The transmitter may transmit the transmission-processed 360° video data and/or 360° video related metadata through the broadcasting network and/or the broadband. The transmitter may include an element for the processing through the broadcasting network and/or an element for the processing through the broadband.

By an embodiment of the first digital device according to the method, the first digital device may further include a data storage (not illustrated) as the internal/external element. The data storage may store the encoded 360° video data and/or 360° video related metadata before delivering the encoded 360° video data and/or 360° video related metadata to the transmission processing unit. A form storing the data may be the file format such as the ISOBMFF, etc. When the 360° video is transmitted in real time, the data storage may not be required, but when the 360° video is delivered through the on demand, non real time (NRT), the broadband, etc., the encapsulated 360° data may be transmitted after being stored in the data storage during a predetermined period.

By another embodiment of the first digital device according to the method, the first digital device may further include a (transmitting side) feedback processing unit and/or a network interface (not illustrated) as the internal/external element. The network interface may receive the feedback information from the second digital device according to the method and deliver the feedback information to the transmitting side feedback processing unit. The transmitting side feedback processing unit may deliver the feedback information to the stitcher, the projection processing unit, the region-wise packing processing unit, the data encoder, the encapsulation processing unit, the metadata processing unit, and/or the transmission processing unit. According to the embodiment, the feedback information may be delivered to the metadata processing unit once and then delivered to each internal element again. The internal elements receiving the feedback information may reflect the feedback information to subsequent processing of the 360° video data.

By yet another embodiment of the first digital device according to the method, the region-wise packing processing unit may rotate each region and the rotated region on the 2D image. In this case, respective regions may be rotated in different directions and at different angles and mapped onto the 2D image. The rotation of the region may be performed by considering an adjacent portion, a stitched portion, etc., before projecting the 360° video data on a spherical surface. Information regarding the rotation of the region, i.e., a rotational direction, a rotational angle, etc., may be signaled by the 360° video related metadata. By still yet another embodiment of the first digital device according to the present disclosure, the data encoder may perform encoding differently for each region. The data encoder may perform encoding for a specific region with a high quality and another region with a low quality. The transmitting side feedback processing unit delivers the feedback information delivered from a 360° video receiving apparatus to the data encoder to allow the data encoder to use a region-wise differentiated encoding method. For example, the transmitting side feedback processing unit may deliver the viewport information delivered from the receiving side to the data encoder. The data encoder may perform encoding for regions including an area indicated by the viewport information with a higher quality (UHD) than other regions.

By still yet another embodiment of the first digital device according to the method, the transmission processing unit may perform the processing for transmission differently for each region. The transmission processing unit may differentiate robustness of data delivered for each region by applying a different transmission parameter (modulation order, code rate, etc.) for each region.

In this case, the transmitting side feedback processing unit delivers the feedback information delivered from the second digital device to allow the transmission processing unit to perform region-wise differentiated transmission processing. For example, the transmitting side feedback processing unit may deliver the viewport information delivered from the receiving side to the transmission processing unit. The transmission processing unit may perform transmission processing for the regions including the area indicated by the corresponding viewport information so as to have higher robustness than other regions.

The internal/external elements of the first digital device according to the method may be hardware elements implemented as hardware. According to the embodiment, the internal/external elements may be changed and omitted or may be replaced with and integrated into other elements. According to the embodiment, additional elements may be added to the first digital device.

Figure 22:
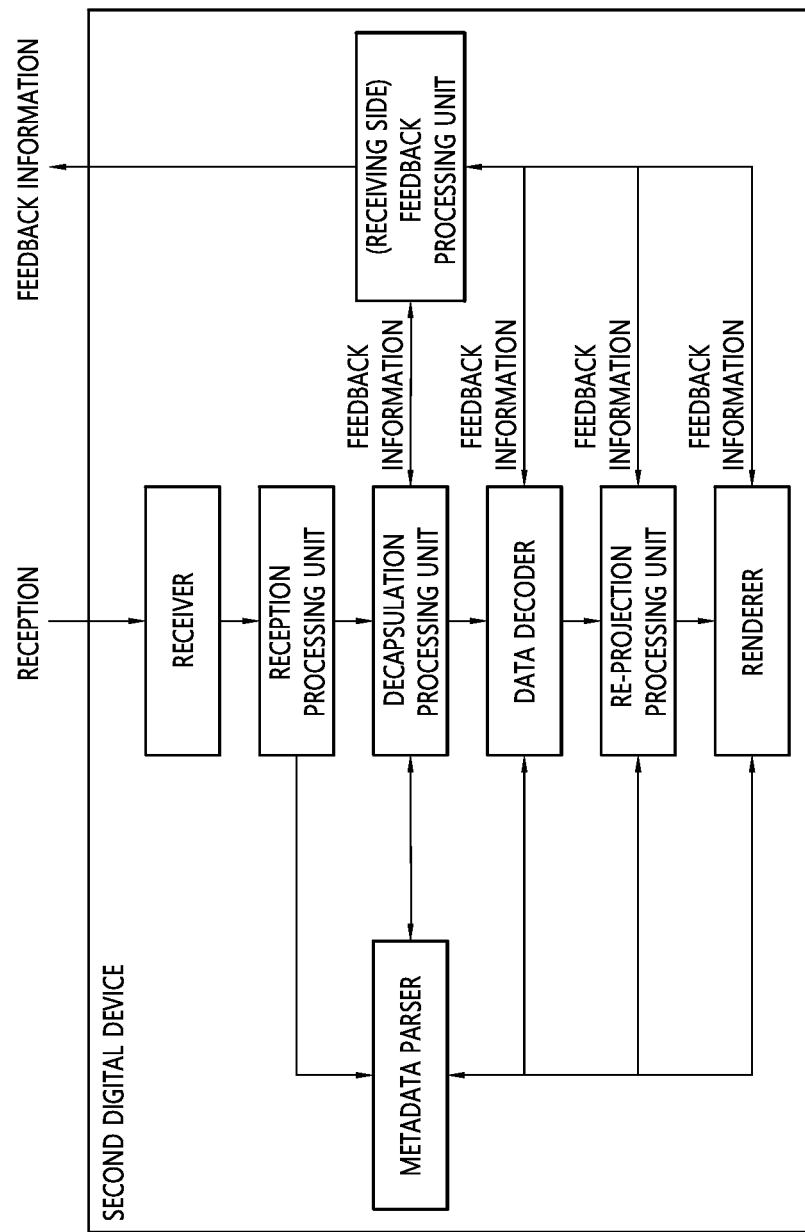
FIG. 22 is a diagram for schematically describing a configuration of a second digital device to which the method may be applied.

FIG. 22 is a diagram for schematically describing a configuration of a second digital device to which the method may be applied. The second digital device may correspond to a receiving side for providing a 3D image/video service such as the VR/AR contents. The second digital device may include the decoding apparatus described above in the present disclosure. The decoding apparatus may be included in or may correspond to the data decoder.

The second digital device according to the method may perform the operations related to the processing process and/or rendering process. The second digital device may include a receiving unit, a reception processing unit, a decapsulation processing unit, a data encoder, the metadata parser, a (receiving side) feedback processing unit, a re-projection processing unit, and/or a renderer as the internal/external element. Meanwhile, the signaling parser may be referred to as a metadata parser.

The receiving unit may receive the 360° video data transmitted by the first digital device according to the method. The receiving unit may receive the 360° video data through the broadcasting network according to the transmitted channel and receive the 360° video data through the communication network such as the broadband.

The reception processing unit may perform the processing depending on the transmission protocol for the received 360° video data. The reception processing unit may perform a reverse process of the transmission processing unit to correspond to the process in which the processing for transmission at the transmitting side. The reception processing unit may deliver the obtained 360° video data to the decapsulation processing unit and deliver the obtained 360° video related metadata to the metadata parser. The 360° video related metadata obtained by the reception processing unit may be the form of the signaling table.

The decapsulation processing unit may decapsulate the file-form 360° video data delivered from the reception processing unit. The decapsulation processing unit decapsulates the files depending on the ISOBMFF to obtain the 360° video data or the 360° video related metadata. The obtained 360° video data may be delivered to the data decoder and deliver the obtained 360° video related metadata may be delivered to the metadata parser. The 360° video related metadata obtained by the decapsulation processing unit may be a box or track form in the file format. The decapsulation processing unit may receive the metadata required for decapsulation from the metadata from the metadata parser if necessary.

The data decoder may perform decoding for the 360° video data. The data decoder obtains an image/video related bitstream from the 360° video data and decodes the bitstream to decode/reconstruct one or a series of (2D) pictures.

The data decoder may receive the metadata required for decoding from the metadata parser. The 360° video related metadata obtained during the data decoding process may be delivered to the metadata parser.

The metadata parser may perform parsing/decoding for the 360° video related metadata. The metadata parser may deliver the obtained metadata to the data decapsulation processing unit, the data decoder, the re-projection processing unit, and/or the renderer.

The re-projection processing unit may perform re-projection for the decoded/reconstructed 2D picture(s) for the 360° video data. The re-projection processing unit may re-project the 2D picture(s) to the 3D space. The 3D space may have a different from according to the 3D model. The re-projection processing unit may receive the metadata required for re-projection from the metadata parser. For example, the re-projection processing unit may receive a type of used 3D model and information on detailed information thereof from the metadata parser. According to the embodiment, the re-projection processing unit may re-project only (an area of the decoded/reconstructed picture for) 360° video data corresponding to a specific area in the 3D space to the 3D space by using the metadata required for re-projection.

The renderer may render the re-projected 360° video (or image). As described above, it may be expressed that the 360° video is rendered to the 3D space and as such, when two processes occur at once, the re-projection processing unit and the renderer are incorporated and the renderer may perform all of the processes. According to the embodiment, the renderer may render only a part viewed by the user according to the viewpoint information of the user.

The user may view a partial area of the rendered 360° video through the VR display, etc. The VR display as a device that reproduces the 360° video may be included in the second digital device (tethered) and as a separate device may be connected to the second digital device (un-tethered).

By an embodiment of the second digital device according to the method, the second digital device may further include the (receiving side) feedback processing unit and/or a network interface (not illustrated) as the internal/external element. The receiving side feedback processing unit may obtain and process the feedback information from the renderer, the re-projection processing unit, the data decoder, the decapsulation processing unit, and/or the VR display. The feedback information may include the viewport information, the head orientation information, gaze information, etc. The network interface may receive the feedback information from the receiving side feedback processing unit and transmit the received feedback information to the first digital device.

As described above, the feedback information may be delivered to the transmitting side and consumed by the receiving side. The receiving side feedback processing unit may deliver the obtained feedback information to the internal elements of the second digital device and reflect the delivered feedback information to the process such as rendering, etc. The receiving side feedback processing unit may deliver the feedback information to the renderer, the re-projection processing unit, the data decoder, and/or the decapsulation processing unit. For example, the renderer may preferentially render the area viewed by the user by using the feedback information. Further, the decapsulation processing unit, the data decoder, etc., may preferentially decapsulate and decode the area viewed by the user or an area to be viewed by the user.

The internal/external elements of the second digital device according to the method may be hardware elements implemented as hardware. According to the embodiment, the internal/external elements may be changed and omitted or may be replaced with and integrated into other elements. According to the embodiment, additional elements may be added to the second digital device.

The XR device generates positional data and attribute data for 3D points by analyzing 3D point cloud data or image data obtained through various sensors or from an external device to obtain information on a surrounding space or a real object and render and output an XR object to be output. For example, the XR device may output an XR object including additional information on a recognized object to correspond to the corresponding recognized object.

The XR device may remotely access and/or remotely adjust the autonomous vehicle through network. In this case, the autonomous vehicle shares a view or a screen with a user who uses the XR device and controls a driver based on control/interaction of the user to perform the operation or be driven. In this case, the autonomous vehicle obtains intention information of the interaction depending on a motion or voice uttering of the user and determines a response based on the obtained intention information to perform the operation.

The autonomous vehicle to which the XR technology is applied may mean an autonomous vehicle having a means for providing an XR image or an autonomous vehicle which becomes a target of the control/interaction in the XR image. In particular, the autonomous vehicle which becomes the target of the control/interaction in the XR image may be distinguished from the XR device and the autonomous vehicle and the XR device may interlock with each other.

The autonomous vehicle having the means for providing the XR image may obtain sensor information from sensors including a camera and output the XR image generated based on the obtained sensor information. For example, the autonomous vehicle includes an HUD and outputs the XR image to provide an XR object corresponding to the real object or an object in the screen to a passenger.

In this case, when the XR object is output to the HUD, at least a part of the XR object may be output to be overlapped with an actual object at which the user gazes. On the contrary, when the XR object is output to the display provided in the autonomous vehicle, at least a part of the XR object may be output to be overlapped with the object in the screen. For example, the autonomous vehicle may output XR objects corresponding to objects such as a traffic line, other vehicles, traffic lights, traffic signs, two-wheelers, pedestrians, buildings, etc.

When the autonomous vehicle which becomes the target of the control/interaction in the XR image obtains sensor information from the sensors including the camera, the autonomous vehicle or the XR device may generate the XR image based on the sensor information and the XR device may output the generated XR image. In addition, the autonomous vehicle may operate based on a control signal input through an external device such as the XR device or the interaction of the user.

The XR device is provided in the autonomous vehicle to provide separate XR contents to the user or provide an internal/external image of the autonomous vehicle to the user.

Besides, the XR device may be used for various services including entertainment, exercise, education, transportation, medical service, e-commerce, manufacturing, defense, and the like. For example, movies, theme parks, sports, etc., may be experienced and/or viewed through the XR device and medical practice, training in hazardous environments such as fire sites, etc., may be supported. Further, a direction service such as AR ways using simultaneous localization and mapping (SLAM) technology may be provided through the XR device and goods may be shopped and purchased by accessing a virtual shopping mall.

What is claimed is:

1. An apparatus for video decoding, the apparatus comprising one or more processors configured to execute instructions that cause the apparatus to perform operations comprising:
    deriving an L0 motion vector and an L1 motion vector for a current block;
    deriving a refined L0 motion vector and a refined L1 motion vector based on the L0 motion vector and the L1 motion vector, by applying Decoder-side Motion Vector Refinement (DMVR) to the current block based on DMVR flag information for representing whether to apply the DMVR to the current block;
    deriving L0 prediction samples of the current block based on the refined L0 motion vector and L1 prediction samples of the current block based on the refined L1 motion vector;
    deriving prediction samples for the current block based on the L0 prediction samples and the L1 prediction samples, by applying Bi-directional optical flow (BDOF) to the current block based on BDOF flag information for representing whether to apply the BDOF to the current block; and
    generating reconstruction samples for the current block based on the prediction samples,
    wherein the DMVR flag information is derived based on a predetermined DMVR application condition,
    wherein the BDOF flag information is derived based on a predetermined BDOF application condition,
    wherein the predetermined DMVR application condition is based on L0 luma weight prediction flag information, L1 luma weight prediction flag information, L0 chroma weight prediction flag information and L1 chroma weight prediction flag information,
    wherein based on both the L0 luma weight prediction flag information and the L1 luma weight prediction flag information being equal to 0 and both the L0 chroma weight prediction flag information and the L1 chroma weight prediction flag information being equal to 0, the DMVR flag information has the value for applying the DMVR to the current block,
    wherein the predetermined BDOF application condition is based on L0 luma weight prediction flag information, L1 luma weight prediction flag information, L0 chroma weight prediction flag information and L1 chroma weight prediction flag information, and
    wherein based on both the L0 luma weight prediction flag information and the L1 luma weight prediction flag information being equal to 0 and both the L0 chroma weight prediction flag information and the L1 chroma weight prediction flag information being equal to 0, the BDOF flag information has the value for applying the BDOF to the current block.

2. The apparatus of claim 1,
    wherein based on a value of the L0 luma weight prediction flag information being 1, it represents that weight factor for a luma component of L0 prediction is present,
    wherein based on a value of the L1 luma weight prediction flag information being 0, it represents that weight factor for a luma component of L1 prediction is not present,
    wherein based on a value of the L0 chroma weight prediction flag information being 1, it represents that weight factor for a chroma component of L0 prediction is present,
    wherein based on a value of the L1 chroma weight prediction flag information being 0, it represents that weight factor for a chroma component of L1 prediction is not present,
    wherein based on the L0 luma weight prediction flag information being equal to 1, the DMVR is not applied to the current block,
    wherein based on the L1 luma weight prediction flag information being equal to 1, the DMVR is not applied to the current block,
    wherein based on the L0 chroma weight prediction flag information being equal to 1, the DMVR is not applied to the current block, and
    wherein based on the L1 chroma weight prediction flag information being equal to 1, the DMVR is not applied to the current block.

3. The apparatus of claim 1,
    wherein the predetermined DMVR application condition includes a condition in which the value of bi-prediction weight index information of the current block is 0,
    wherein based on the value of the bi-prediction weight index information being 0, it represents a default case in which different weights are not applied to L0 prediction and L1 prediction, and
    wherein the DMVR flag information is derived as a value representing that DMVR is applied to the current block based on the value of the bi-prediction weight index information being 0.

4. The apparatus of claim 1,
    wherein the predetermined DMVR application condition includes a condition in which a prediction mode in which inter prediction and intra prediction are combined is not applied to the current block, and
    wherein the DMVR flag information is derived as a value representing that the DMVR is applied to the current block based on the prediction mode in which the inter prediction and the intra prediction are combined not applying to the current block.

5. The apparatus of claim 1,
    wherein based on a value of the L0 luma weight prediction flag information being 1, it represents that weight factor for a luma component of L0 prediction is present,
    wherein based on a value of the L1 luma weight prediction flag information being 0, it represents that weight factor for a luma component of L1 prediction is not present,
    wherein based on a value of the L0 chroma weight prediction flag information being 1, it represents that weight factor for a chroma component of L0 prediction is present,
    wherein based on a value of the L1 chroma weight prediction flag information being 0, it represents that weight factor for a chroma component of L1 prediction is not present,
    wherein based on the L0 luma weight prediction flag information being equal to 1, the BDOF is not applied to the current block,
    wherein based on the L1 luma weight prediction flag information being equal to 1, the BDOF is not applied to the current block,
    wherein based on the L0 chroma weight prediction flag information being equal to 1, the BDOF is not applied to the current block, and
    wherein based on the L1 chroma weight prediction flag information being equal to 1, the BDOF is not applied to the current block.

6. The apparatus of claim 1,
wherein the predetermined BDOF application condition includes a condition in which a case in which a first picture order count (POC) between a current picture and an L0 reference picture and a second POC difference between the current picture and an L1 reference picture are the same as each other, and
wherein the BDOF flag information is derived as the value representing that BDOF is applied to the current block based on the first POC difference and the second POC difference being the same as each other.

7. The apparatus of claim 1,
wherein the predetermined BDOF application condition includes a condition in which the prediction mode in which the inter prediction and the intra prediction are combined is not applied to the current block, and
wherein the BDOF flag information is derived as the value representing that the BDOF is applied to the current block based on the prediction mode in which the inter prediction and the intra prediction are combined not applying to the current block.

8. The apparatus of claim 1, wherein the deriving of the refined L0 motion vector and the refined L1 motion vector comprises:
deriving a minimum sum of absolute differences (SAD) by using reference samples in an L0 reference picture derived based on the L0 motion vector and reference samples in an L1 reference picture derived based on the L1 motion vector; and
deriving the refined L0 motion vector for the L0 motion vector and the refined L1 motion vector for the L1 motion vector, based on a sample position corresponding to the minimum SAD.

9. The apparatus of claim 1, wherein the deriving of the prediction samples comprises:
calculating a first gradient for the L0 prediction samples and a second gradient for the L1 prediction samples; and
deriving the prediction samples based on the L0 prediction samples, the L1 prediction samples, the first gradient, and the second gradient.

10. The apparatus of claim 1, wherein the deriving of the L0 motion vector and the L1 motion vector comprises:
determining whether a merge mode is applied to the current block;
configuring a merge candidate list based on neighboring blocks of the current block based on the merge mode being applied to the current block; and
deriving the L0 motion vector and the L1 motion vector based on a motion vector of a neighboring block indicated by merge index information among the neighboring blocks included in the merge candidate list.

11. An apparatus for video encoding, the apparatus comprising one or more processors configured to execute instructions that cause the apparatus to perform operations comprising:
deriving an L0 motion vector and an L1 motion vector for a current block;
deriving a refined L0 motion vector and a refined L1 motion vector based on the L0 motion vector and the L1 motion vector, by applying Decoder-side Motion Vector Refinement (DMVR) to the current block based on DMVR flag information for representing whether to apply the DMVR to the current block;
deriving L0 prediction samples of the current block based on the refined L0 motion vector and L1 prediction samples of the current block based on the refined L1 motion vector;
deriving prediction samples for the current block based on the L0 prediction samples and the L1 prediction samples, by applying Bi-directional optical flow (BDOF) to the current block based on BDOF flag information for representing whether to apply the BDOF to the current block;
deriving residual samples based on the prediction samples; and
encoding video information including information on the residual samples,
wherein the DMVR flag information is derived based on a predetermined DMVR application condition,
wherein the predetermined DMVR application condition is based on L0 luma weight prediction flag information, L1 luma weight prediction flag information, L0 chroma weight prediction flag information and L1 chroma weight prediction flag information,
wherein based on both the L0 luma weight prediction flag information and the L1 luma weight prediction flag information being equal to 0 and both the L0 chroma weight prediction flag information and the L1 chroma weight prediction flag information being equal to 0, the DMVR flag information has the value for applying the DMVR to the current block,
wherein the predetermined BDOF application condition is based on L0 luma weight prediction flag information, L1 luma weight prediction flag information, L0 chroma weight prediction flag information and L1 chroma weight prediction flag information, and
wherein based on both the L0 luma weight prediction flag information and the L1 luma weight prediction flag information being equal to 0 and both the L0 chroma weight prediction flag information and the L1 chroma weight prediction flag information being equal to 0, the BDOF flag information has the value for applying the BDOF to the current block.

12. The apparatus of claim 11,
wherein based on a value of the L0 luma weight prediction flag information being 1, it represents that weight factor for a luma component of L0 prediction is present,
wherein based on a value of the L1 luma weight prediction flag information being 0, it represents that weight factor for a luma component of L1 prediction is not present,
wherein based on a value of the L0 chroma weight prediction flag information being 1, it represents that weight factor for a chroma component of L0 prediction is present,
wherein based on a value of the L1 chroma weight prediction flag information being 0, it represents that weight factor for a chroma component of L1 prediction is not present,
wherein based on the L0 luma weight prediction flag information being equal to 1, the DMVR is not applied to the current block,
wherein based on the L1 luma weight prediction flag information being equal to 1, the DMVR is not applied to the current block,
wherein based on the L0 chroma weight prediction flag information being equal to 1, the DMVR is not applied to the current block, and wherein based on the L1 chroma weight prediction flag information being equal to 1, the DMVR is not applied to the current block.

13. The apparatus of claim 11,
wherein the predetermined DMVR application condition includes a condition in which a value of bi-prediction weight index information of the current block is 0,
wherein based on the value of the bi-prediction weight index information being 0, it represents a default case in which different weights are not applied to L0 prediction and L1 prediction, and
wherein the DMVR flag information is derived as a value representing that DMVR is applied to the current block based on the value of the bi-prediction weight index information being 0.

14. The apparatus of claim 11,
wherein the predetermined DMVR application condition includes a condition in which a prediction mode in which inter prediction and intra prediction are combined is not applied to the current block, and
wherein the DMVR flag information is derived as a value representing that the DMVR is applied to the current block based on the prediction mode in which the inter prediction and the intra prediction are combined not applying to the current block.

15. The apparatus of claim 11,
wherein based on a value of the L0 luma weight prediction flag information being 1, it represents that weight factor for a luma component of L0 prediction is present,
wherein based on a value of the L1 luma weight prediction flag information being 0, it represents that weight factor for a luma component of L1 prediction is not present,
wherein based on a value of the L0 chroma weight prediction flag information being 1, it represents that weight factor for a chroma component of L0 prediction is present,
wherein based on a value of the L1 chroma weight prediction flag information being 0, it represents that weight factor for a chroma component of L1 prediction is not present,
wherein based on the L0 luma weight prediction flag information being equal to 1, the BDOF is not applied to the current block,
wherein based on the L1 luma weight prediction flag information being equal to 1, the BDOF is not applied to the current block,
wherein based on the L0 chroma weight prediction flag information being equal to 1, the BDOF is not applied to the current block, and
wherein based on the L1 chroma weight prediction flag information being equal to 1, the BDOF is not applied to the current block.

16. The apparatus of claim 11,
wherein the predetermined BDOF application condition includes a condition in which a case in which a first picture order count (POC) between a current picture and an L0 reference picture and a second POC difference between the current picture and an L1 reference picture are the same as each other, and
wherein the BDOF flag information is derived as the value representing that BDOF is applied to the current block based on the first POC difference and the second POC difference being the same as each other.

17. The apparatus of claim 11,
wherein the predetermined BDOF application condition includes a condition in which the prediction mode in which the inter prediction and the intra prediction are combined is not applied to the current block, and
wherein the BDOF flag information is derived as the value representing that the BDOF is applied to the current block based on the prediction mode in which the inter prediction and the intra prediction are combined not applying to the current block.

18. The apparatus of claim 11, wherein the deriving of the refined L0 motion vector and the refined L1 motion vector comprises:
deriving a minimum sum of absolute differences (SAD) by using reference samples in an L0 reference picture derived based on the L0 motion vector and reference samples in an L1 reference picture derived based on the L1 motion vector; and
deriving the refined L0 motion vector for the L0 motion vector and the refined L1 motion vector for the L1 motion vector, based on a sample position corresponding to the minimum SAD.

19. The apparatus of claim 11, wherein the deriving of the prediction samples comprises:
calculating a first gradient for the L0 prediction samples and a second gradient for the L1 prediction samples; and
deriving the prediction samples based on the L0 prediction samples, the L1 prediction samples, the first gradient, and the second gradient.

20. The apparatus of claim 11, wherein the deriving of the L0 motion vector and the L1 motion vector comprises:
determining whether a merge mode is applied to the current block;
configuring a merge candidate list based on neighboring blocks of the current block based on the merge mode being applied to the current block; and
deriving the L0 motion vector and the L1 motion vector based on a motion vector of a neighboring block indicated by merge index information among the neighboring blocks included in the merge candidate list.

* * * * *

UNITED STATES PATENT AND TRADEMARK OFFICE
CERTIFICATE OF CORRECTION

PATENT NO. : 12,132,926 B2  
APPLICATION NO. : 18/107985  
DATED : October 29, 2024  
INVENTOR(S) : Naeri Park, Junghak Nam and Hyeongmoon Jang Page 1 of 1

It is certified that error appears in the above-identified patent and that said Letters Patent is hereby corrected as shown below:

On the Title Page

Column 2, Line 1, In Item (57) Abstract, Delete "LO" and insert -- L0 --;

Column 2, Line 2, In Item (57) Abstract, Delete "LI" and insert -- L1 --;

Column 2, Line 3, In Item (57) Abstract, Delete "LO" and insert -- L0 --;

Column 2, Line 5, In Item (57) Abstract, Delete "LO" and insert -- L0 --;

Column 2, Line 6, In Item (57) Abstract, Delete "LO" and insert -- L0 --;

Column 2, Line 6, In Item (57) Abstract, Delete "LI" and insert -- L1 --;

Column 2, Line 9, In Item (57) Abstract, Delete "LO" and insert -- L0 --.

Signed and Sealed this  
Thirty-first Day of December, 2024

Derrick Brent  
*Acting Director of the United States Patent and Trademark Office*